US011614672B2

(12) United States Patent
Yap et al.

(10) Patent No.: US 11,614,672 B2
(45) Date of Patent: Mar. 28, 2023

(54) OPTICAL WAVEGUIDE STRUCTURE WITH TRIPLE PARTIALLY OVERLAPPING LOOPS

(71) Applicant: The Boeing Company, Chicago, IL (US)

(72) Inventors: Daniel Yap, Newbury Park, CA (US); Shuoqin Wang, Oak Park, CA (US); Ivan Alvarado, Santa Monica, CA (US); Biqin Huang, Rancho Palos Verdes, CA (US); Thaddeus Ladd, Woodland Hills, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/450,031

(22) Filed: Oct. 5, 2021

(65) Prior Publication Data
US 2022/0107545 A1 Apr. 7, 2022

Related U.S. Application Data

(60) Provisional application No. 63/201,664, filed on May 7, 2021, provisional application No. 63/201,661, filed
(Continued)

(51) Int. Cl.
G02F 1/365 (2006.01)
G02F 1/35 (2006.01)
(Continued)

(52) U.S. Cl.
CPC ............ G02F 1/365 (2013.01); G02F 1/3501 (2013.01); G02F 1/3534 (2013.01);
(Continued)

(58) Field of Classification Search
None
See application file for complete search history.

(56) References Cited

U.S. PATENT DOCUMENTS 3,842,289 A 10/1974 Yariv et al.
5,002,349 A 3/1991 Cheung et al.
(Continued)

FOREIGN PATENT DOCUMENTS

CN 110333637 A 10/2019
JP H01134309 A 5/1989
(Continued)

OTHER PUBLICATIONS

Philip Chak, J. E. Sipe, and Suresh Pereira, "Depositing light in a photonic stop gap by use of Kerr nonlinear microresonators," Opt. Lett. 28, 1966-1968 (2003). (Year: 2003).*
(Continued)

Primary Examiner — Rhonda S Peace
(74) Attorney, Agent, or Firm — Yee & Associates, P.C.

(57) ABSTRACT

A method, apparatus, and system for non-linear optical process. A first light of a first wavelength is routed in a first loop in a main nonlinear optical waveguide. The first loop has a first length for the first light of the first wavelength. A second light of a second wavelength is routed in a second loop that includes portions of the main nonlinear optical waveguide and a first extension optical waveguide. The second loop has a second length for the second light of the second wavelength. A third light of a third wavelength is routed in a third loop that include portions of the main nonlinear optical waveguide and a second extension optical waveguide. The third loop has a third length for the third light of the third wavelength.

40 Claims, 18 Drawing Sheets

Related U.S. Application Data on May 7, 2021, provisional application No. 63/088,220, filed on Oct. 6, 2020.

(51) Int. Cl.
  *G02F 1/39* (2006.01)
  *G02F 1/377* (2006.01)
  *G02F 1/37* (2006.01)

(52) U.S. Cl.
  CPC ............. *G02F 1/3536* (2013.01); *G02F 1/37* (2013.01); *G02F 1/377* (2013.01); *G02F 1/39* (2013.01); *G02F 1/395* (2013.01); *G02F 1/392* (2021.01)

(56) References Cited

U.S. PATENT DOCUMENTS

| | | | |
|---|---|---|---|
| 5,206,868 | A | 4/1993 | Deacon |
| 5,295,218 | A | 3/1994 | Agostinelli et al. |
| 5,875,272 | A | 2/1999 | Kewitsch et al. |
| 5,999,548 | A | 2/1999 | Mori |
| 6,078,717 | A | 6/2000 | Nashimoto et al. |
| 6,081,632 | A | 6/2000 | Yoshimura et al. |
| 6,269,205 | B1 | 7/2001 | Peral et al. |
| 6,438,291 | B1 | 8/2002 | Duck et al. |
| 6,445,848 | B1 | 9/2002 | Islam et al. |
| 6,483,953 | B1 | 11/2002 | McBrien et al. |
| 6,721,481 | B2 | 4/2004 | Terahara et al. |
| 7,262,902 | B2 | 8/2007 | Burns et al. |
| 7,266,258 | B2 | 9/2007 | Liu et al. |
| 7,495,823 | B2 | 2/2009 | Kanner et al. |
| 8,173,982 | B2 | 5/2012 | Edamatsu et al. |
| 9,291,837 | B1 | 3/2016 | Yap |
| 9,798,219 | B2 * | 10/2017 | Pant .......................... G02F 1/39 |
| 10,372,014 | B1 | 8/2019 | Vidrighin et al. |
| 10,451,951 | B1 | 10/2019 | Yap et al. |
| 10,698,292 | B1 | 6/2020 | Nagano |
| 11,003,046 | B2 * | 5/2021 | Liscidini ............... G02F 1/3503 |
| 11,092,875 | B2 * | 8/2021 | Xu ........................... G02F 1/365 |
| 11,221,540 | B2 * | 1/2022 | Srinivasan ............ G02F 1/3501 |
| 2005/0047702 | A1 | 3/2005 | Parker et al. |
| 2006/0132901 | A1 | 6/2006 | Miller |
| 2012/0093459 | A1 | 4/2012 | Mathai et al. |
| 2014/0193155 | A1 * | 7/2014 | Popovic ................... H04J 14/02 |
| | | | 29/428 |
| 2018/0031949 | A1 | 2/2018 | Mookherjea et al. |
| 2019/0361315 | A1 | 11/2019 | Zhou |
| 2020/0256722 | A1 | 8/2020 | Najafi et al. |
| 2021/0026222 | A1 | 1/2021 | Nagano |
| 2022/0107548 | A1 * | 4/2022 | Yap ......................... G02F 1/395 |

FOREIGN PATENT DOCUMENTS

| | | |
|---|---|---|
| JP | H01134310 A | 5/1989 |
| JP | H05107577 A | 4/1993 |
| JP | H05216079 A | 8/1993 |
| JP | H10319444 A | 12/1998 |
| JP | 2017078786 A | 4/2017 |
| WO | 2019208582 A1 | 5/2021 |

OTHER PUBLICATIONS

Bosshard, "Cascading of second-order nonlinearities in polar materials," Advanced Materials, vol. 8, No. 5, May 1, 1996, pp. 385-397.

Boyd, "Nonlinear Optics," Third Edition, Academic Press, Mar. 28, 2008, pp. 69-133.

Cai et al., "Integrated optics on single-crystal lithium niobate thin film: some recent progress," 18th International Conference on Transparent Optical Networks ICTON, Jul. 2016, paper Tu.D5.5, pp. 1-4.

Chen et al., "Modal phase matched lithium niobate nanocircuits for integrated nonlinear photonics," OSA Continuum, vol. 1, No. 1, Sep. 2018, pp. 229-242.

Doerr, "Planar Lightwave Devices for WDM," Optical Fiber Telecommunications, vol. IVA, Jan. 1, 2002, pp. 405-476.

Fan et al., "290 Hz intrinsic linewidth from an integrated optical chip-based widely tunable InP-Si3N4 hybrid laser," Digest 2017 Conference on Lasers and Electro-Optics CLEO, May 2017, paper JTh5C.9, pp. 1-2.

Fejer et al., "Quasi-phase-matched second harmonic generation tuning and tolerances," IEEE Journal of Quantum Electronics, vol. 28, No. 11, Nov. 1992, pp. 2631-2654.

Gad et al., "Compound ring resonator circuit for integrated optics applications," Journal Optical Society America A, vol. 26, No. 9, Sep. 9, 2009, pp. 2023-2032.

Halir et al., "Compact High-Performance Multimode Interference Couplers in Silicon-on-Insulator," IEEE Photonics Technology Letters, vol. 21, No. 21, Nov. 1, 2009, pp. 1600-1602.

Helt et al., "How does it scale? Comparing quantum and classical nonlinear optical processes in integrated devices," Journal of the Optical Society of America B, vol. 29, No. 8, Aug. 1, 2012, pp. 2199-2212.

Lin et al., "Broadband Quasi-Phase-Matched Harmonic Generation in an On-Chip Monocrystalline Lithium Niobate Microdisk Resonator," Phys. Rev. Lett., vol. 122, No. 17, May 3, 2019, p. 173903, 5 pages.

Lin et al., "Characterization of hybrid InP-TriPleX photonic integrate tunable lasers based on silicon nitride (Si3N4/SiO2) microring resonators for optical coherent systems," IEEE Photonics Journal, vol. 10, No. 3, Jun. 2018, pp. 1400108, 9 pages.

Luo et al., "On-chip second-harmonic generation and broadband parametric down-conversion in a lithium niobate microresonator," Optics Express, vol. 25, No. 20, Oct. 2, 2017, pp. 24531-24539.

Luo et al., "Semi-nonlinear nanophotonic waveguides for highly efficient second-harmonic generation," Sep. 17, 2018, 8 pages, accessed Mar. 30, 2022, available at https://arxiv.org/abs/1809.06476.

Lu et al., "Chip-integrated visible-telecom entangled photon pair source for quantum communication," Nature Physics, vol. 15, Jan. 21, 2019, pp. 373-381, available at https://doi.org/10.1038/s41567-018-0394-3.

Matsushita et al., "Quasi-phase-matched parametric fluorescence in a periodically inverted GaP waveguide," Applied Physics Express, vol. 2, No. 6, May 22, 2009, pp. 061101.

May et al., "Second-harmonic generation in AlGaAs-on-insulator waveguides," Optics Letters, vol. 44, No. 6, Mar. 15, 2019, pp. 1339-1342.

Pasiskevicius et al., "Quasi-phase matched nonlinear media: Progress towards nonlinear optical engineering," Optical Materials, vol. 34, No. 3, Jul. 22, 2011, pp. 513-523.

Pernice et al., "Second harmonic generation in phase matched aluminum nitride waveguides and micro-ring resonators," Applied Physics Letters, vol. 100, No. 22, May 30, 2012, pp. 223501.

Rao et al., "Second-harmonic generation in periodically-poled thin film lithium niobate wafer-bonded on silicon," Optics Express, vol. 24, No. 26, Dec. 26, 2016, pp. 29941-29947.

Rao et al., "Second-harmonic generation in single-mode integrated waveguides based on mode-shape modulation," Applied Physics Letters, vol. 110, No. 11, Jan. 19, 2017, pp. 111109.

Schunemann et al., "Optical parametric oscillation in quasi-phase-matched GaP," Proc SPIE, Nonlinear Frequency Generation and Conversion: Materials, Devices, and Applications XIV, vol. 9347, Mar. 24, 2015, pp. 93470J.

Spencer et al., "Low kappa, narrow bandwidth Si3N4 Bragg gratings," Optics Express, vol. 23, No. 23, Nov. 16, 2015, pp. 30329-30336.

Thomson et al., "Low Loss MMI Couplers for High Performance MZI Modulators," IEEE Photonics Technology Letters, vol. 22, No. 20, Oct. 15, 2010, pp. 1485-1487.

Tison et al., "Path to increasing the coincidence efficiency of integrated resonant photon sources," Optics Express, vol. 25, No. 26, Dec. 25, 2017, pp. 33088-33096.

Wang et al., "Ultrahigh-efficiency wavelength conversion in nanophotonic periodically poled lithium niobate waveguides," Optica, vol. 5, No. 11, Nov. 7, 2018, pp. 1438-1441.

(56) References Cited

OTHER PUBLICATIONS

Wang et al., "Second harmonic generation in nano-structured thin-film lithium niobate waveguides," Optics Express, vol. 25, No. 6, Mar. 2017, pp. 6963-6973.

Yang et al., "Realization of controllable photonic molecule based on three ultrahigh-Q microtoroid cavities", Laser & Photonics Reviews, vol. 11, No. 2, Jan. 16, 2017, paper 1600178, 8 pages.

Yoo et al., "Wavelength conversion by difference frequency generation in AlGaAs waveguides with periodic domain inversion achieved by wafer bonding," Applied Physics Letters, vol. 68, No. 19, May 6, 1996, pp. 2609-2611.

Yu et al., "Efficient continuous wave second harmonic generation pumped at 1.55 μm in quasi-phasematched AlGaAs waveguides," Optics Express, vol. 13, No. 26, Dec. 26, 2005, pp. 10742-10748.

International Search Report dated Jan. 11, 2022, regarding application No. PCT/US2021/071721, 4 pages.

Written Opinion of the International Searching Authority dated Jan. 11, 2022, regarding application No. PCT/US2021/071721, 7 pages.

International Search Report dated Jan. 14, 2022, regarding application No. PCT/US2021/071722, 5 pages.

Written Opinion of the International Searching Authority dated Jan. 14, 2022, regarding application No. PCT/US2021/071722, 6 pages.

International Search Report dated Feb. 8, 2022, regarding application No. PCT/US2021/071723, 5 pages.

Written Opinion of the International Searching Authority dated Feb. 8, 2022, regarding application No. PCT/US2021/071723, 8 pages.

International Search Report and Written Opinion of the International Searching Authority dated Feb. 9, 2022, regarding application No. PCT/US2021/071725, 24 pages.

Non-Final Office Action dated Jul. 8, 2022, regarding U.S. Appl. No. 17/450,046, 23 pages.

Lumerical, "Lithium Niobate Nonlinear Thermal Waveguide," ANSYS, available at https://optics.ansys.com/hc/en-us/articles/360047509134-Lithium-Niobate-Nonlinear-Thermal-Waveguide, last accessed on Dec. 5, 2022, 19 pages.

Notice of Allowance, dated Nov. 23, 2022, regarding U.S. Appl. No. 17/450,046, 10 pages.

* cited by examiner

OPTICAL WAVEGUIDE STRUCTURE WITH TRIPLE PARTIALLY OVERLAPPING LOOPS

CROSS-REFERENCE TO RELATED APPLICATIONS

This application is related to and claims the benefit of priority of provisional U.S. Patent Application Ser. No. 63/088,220, entitled "Directional Phase Matching (DPM) Optical Waveguide", filed on Oct. 6, 2020; provisional U.S. Patent Application Ser. No. 63/201,661, entitled "Directional Phase Matching Optical Waveguide", filed on May 7, 2021; and provisional U.S. Patent Application Ser. No. 63/201,664, entitled "Nonlinear Optical Waveguide Structures for Light Generation and Conversion", filed on May 7, 2021, all of which are hereby incorporated by reference.

This application is related to the following patent application: entitled "OPTICAL WAVEGUIDE STRUCTURE WITH PARTIALLY OVERLAPPING LOOPS IN DIRECTION DEPENDENT MATERIAL", Ser. No. 17/450,038, filed Oct. 5, 2021, assigned to the same assignee, and incorporated herein by reference in its entirety.

BACKGROUND INFORMATION

1. Field

The present disclosure relates generally to optical waveguide structures and, in particular, to phase matching optical waveguide structures with partially overlapping loops to generate light using non-linear optical processes.

2. Background

Optical waveguides are physical structures that guide electromagnetic waves in an optical spectrum. Optical waveguides can be used as components in integrated optical circuits. With respect to quantum communications and processing, nonlinear optical material structures can be used to create photon transmitters, repeaters, and other quantum devices for communications. Nonlinear optical structures can be used to change the light passing through them depending on factors such as orientation, temperature, wavelength of light, polarization of light, and other factors. For example, a waveguide with light of a blue wavelength passing through the waveguide can generate one or more photons of light that has a longer wavelength, such as green or red, and a correspondingly lower photon energy. This type of conversion can be performed using waveguides that incorporate a material having a second order nonlinear optical susceptibility or a third order nonlinear optical susceptibility.

Current waveguides and structures that implement second order or third order nonlinear optical processes are not as efficient as desired. Therefore, it would be desirable to have a method and apparatus that take into account at least some of the issues discussed above, as well as other possible issues. For example, it would be desirable to have a method and apparatus that overcome a technical problem with increasing efficiency in generating light in nonlinear optical waveguide structures.

SUMMARY

An embodiment of the present disclosure provides an optical waveguide structure that comprises a main nonlinear optical waveguide, a first extension optical waveguide, a second extension optical waveguide, a first wavelength selective optical coupler, and a second wavelength selective optical coupler. A first light of a first wavelength travels in a first loop that extends through the main nonlinear optical waveguide. The first wavelength selective coupler couples the main nonlinear optical waveguide and the first extension optical waveguide to each other such that a second light of a second wavelength is coupled between the main nonlinear optical waveguide and the first extension optical waveguide. The second light of the second wavelength travels in a second loop that extends through the main nonlinear optical waveguide and the first extension optical waveguide. The second loop has a second length for the second light of the second wavelength. The second wavelength selective coupler couples the main nonlinear optical waveguide and the second extension optical waveguide to each other such a third light of a third wavelength is coupled between the main nonlinear optical waveguide and the second extension optical waveguide. The third light of the third wavelength travels in a third loop that extends through the main nonlinear optical waveguide and the second extension optical waveguide. The third loop has a third length for the third light of the third wavelength.

Another embodiment of the present disclosure provides an optical waveguide structure comprising a main nonlinear optical waveguide, an extension optical waveguide, and a wavelength selective coupler. A first light of a first wavelength travels in a first loop that extends through the main nonlinear optical waveguide and the wavelength selective coupler, in which the first loop has a first length for the first light of the first wavelength. The wavelength selective coupler couples a second light of a second wavelength between the main nonlinear optical waveguide and the extension nonlinear optical waveguide. The second light of the second wavelength travels in a second loop that extends through the main nonlinear optical waveguide and the extension nonlinear optical waveguide, in which the second loop has a second length for the second light of the second wavelength.

Yet another embodiment of the present disclosure provides a method for a non-linear optical process. A first light of a first wavelength is routed in a first loop that extends through a main nonlinear optical waveguide. The first loop has a first length for the first light of the first wavelength. A second light of a second wavelength is routed in a second loop that extends through portions of the main nonlinear optical waveguide and a first extension optical waveguide, wherein the second loop has a second length for the second light of the second wavelength. A third light of a third wavelength is routed in a third loop that extends through portions of the main nonlinear optical waveguide and a second extension optical waveguide, wherein the third loop has a third length for the third light of the third wavelength.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
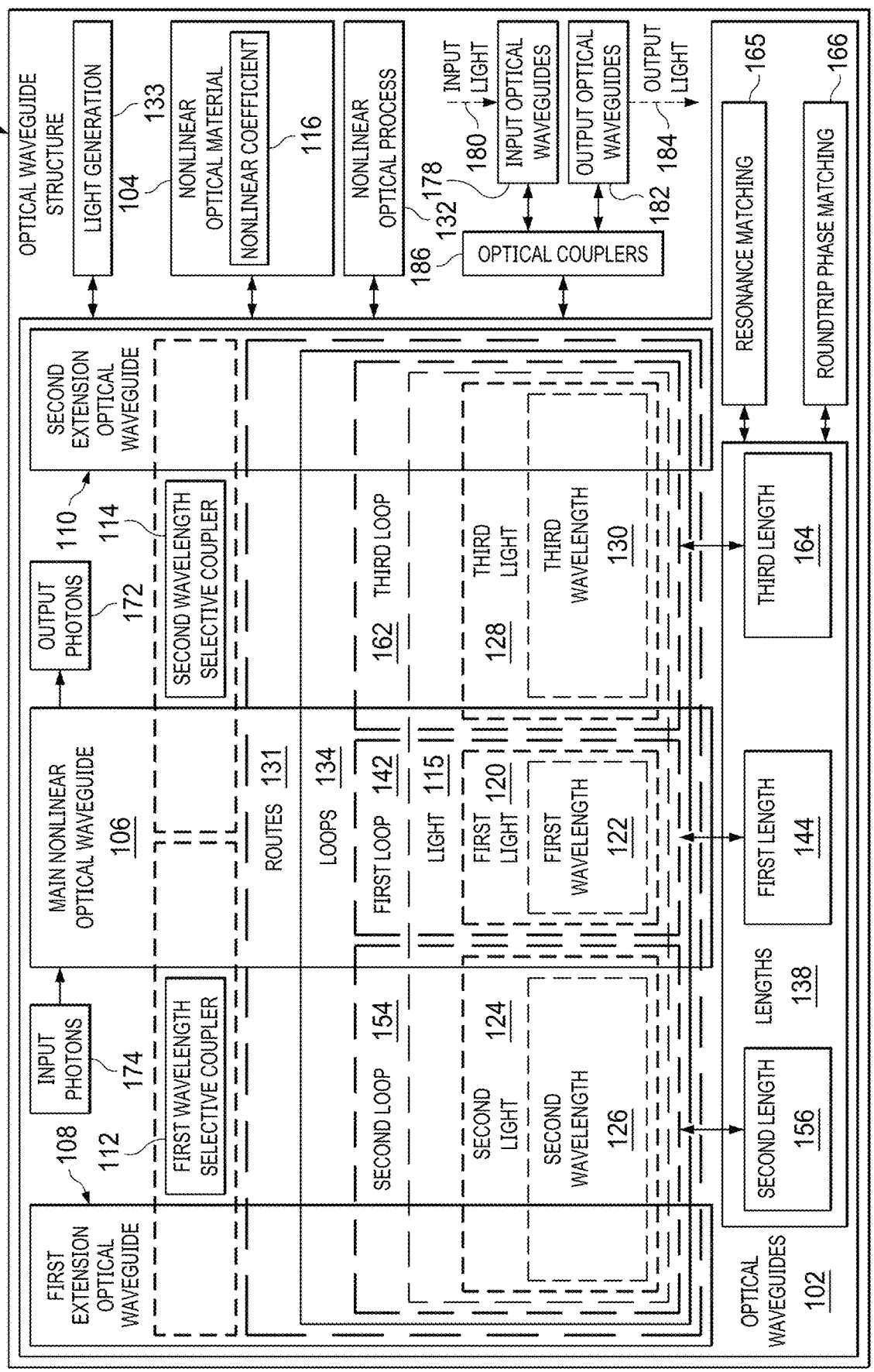
FIG. 1 is an illustration of a block diagram of an optical waveguide structure in accordance with an illustrative embodiment.

The illustrative embodiments recognize and take into account one or more different considerations. For example, the illustrative embodiments recognize and take into account that a nonlinear optical structure can function as a resonator such that a light of a particular wavelength in resonance with the resonator can travel over a longer distance in a nonlinear optical waveguide of the nonlinear optical structure as compared to other light of other wavelengths that are not in resonance with the resonator.

The illustrative embodiments recognize and take into account that the loss of light from a resonator occurs when the light exits the resonator instead of continuing to travel in the resonator. The resonator selects certain wavelengths of light to travel in the resonator. The illustrative embodiments recognize and take into account that different resonators can have different resonances that match to different wavelengths of light. The illustrative embodiments recognize and take into account that the same resonator can have multiple resonances, with different resonances matching to different wavelengths of the light.

The illustrative embodiments recognize and take into account that currently used nonlinear optical waveguide structures employ a resonator that implements three-wave mixing and four-wave mixing processes to generate light. The illustrative embodiments recognize and take into account that spontaneous parametric down conversion (SPDC) and spontaneous four-wave mixing (SFWM) are examples of three-wave mixing and four-wave mixing processes, respectively, for generating light, such as a signal light and an idler light, in response to the introduction of source light, such as a pump light, into the nonlinear optical waveguide structure. The illustrative embodiments recognize and take into account that spontaneous parametric down conversion and spontaneous four-wave mixing can generate a pair of photons, such as a signal photon and an idler photon, from one or more pump photons. Spontaneous parametric down conversion generates the signal and idler photons from a single pump photon. Spontaneous four-wave mixing generates the signal photon and idler photon from two pump photons having the same wavelength.

The illustrative embodiments recognize and take into account that the nonlinear optical waveguide structure, in having a ring shape, can employ a nonlinear optical waveguide in which light of three wavelengths involved in spontaneous parametric down conversion and spontaneous four-wave mixing propagates within the nonlinear optical waveguide structure. The illustrative embodiments recognize and take into account that the nonlinear optical waveguide structure has a ring resonator with a closed path. The illustrative embodiments recognize and take into account that for current nonlinear optical waveguides structures, different wavelengths for the light must match resonances of the same resonator. The illustrative embodiments recognize and take into account that this requirement results in severe limitation on allowable wavelengths for the signal light and the idler light that are generated.

The illustrative embodiments recognize and take into account that current optical waveguide structures can have optical structures to input and output light from the ring resonator. The illustrative embodiments recognize and take into account that the addition of these input and output optical structures is unhelpful for achieving the resonance match because the three wavelengths for the pump light, the signal light, and the idler light propagate through the ring resonator and are constrained to match the modes of the same ring resonator.

The illustrative embodiments recognize and take into account that current nonlinear optical waveguide structures can employ two ring resonators having different values for their circumferences. The illustrative embodiments recognize and take into account that these different values can result in different sets of resonance modes. The illustrative embodiments recognize and take into account that a first resonator can have all three wavelengths for the pump light, the signal light, and the idler light matched to the modes for the first resonator. The illustrative embodiments recognize and take into account that the second resonator can have modes matched to the wavelengths of the signal light and the idler light. The illustrative embodiments recognize and take into account that these two resonators still have the same limitations on resonance matching as a single ring resonator. The illustrative embodiments recognize and take into account that the use of three coupled ring resonators may provide some improvement, but still have limitations because at least some of the light from all of the three wavelengths travels through all three rings in the current nonlinear optical waveguide structure.

The illustrative embodiments recognize and take into account that current nonlinear optical waveguide structures employ multiple resonators that are coupled together directly through common wavelengths and not through a nonlinear optical process. The illustrative embodiments recognize and take into account that at least some light for all of the wavelengths travel through all of the resonators. In other words, the illustrative embodiments recognize and take into account that the light with different wavelengths and traveling through all of the resonators in current nonlinear optical waveguide structures is resonant with each of the individual resonators that are coupled together. The optical waveguide structures in the illustrative examples are configured such that light of different wavelengths do not travel through all of the resonators. Instead, in the illustrative examples, the different wavelengths of light travel through different resonators.

In an illustrative example, the optical waveguide structure is configured such that each light of a particular wavelength can travel on a particular loop within the optical waveguide structure in which the loop is present for that particular light. In the illustrative examples, the loops are partially overlapping such that two different types of light of two different wavelengths are not required to travel along the same exact loop.

In one illustrative example, an optical waveguide structure comprises a main nonlinear optical waveguide, a first extension optical waveguide, a second extension optical waveguide, a first wavelength selective optical coupler, and a second wavelength selective optical coupler. A first loop in which a first light of a first wavelength travels extends through the main nonlinear optical waveguide, the first wavelength selective coupler and the second wavelength selective coupler. The first loop is a closed route in which the first light travels, forming a first resonator, and has a first length that is resonant for the first light of the first wavelength. In the illustrative example, a closed route is a route for which a starting point and ending point are common or for which there is no distinct starting point that is separate from an ending point. The first wavelength selective coupler couples the main nonlinear optical waveguide and the first extension optical waveguide to each other such that a second light of a second wavelength is coupled between the main nonlinear optical waveguide and the first extension optical waveguide. The second light of the second wavelength travels in a second loop that extends through the main nonlinear optical waveguide, the second wavelength selective coupler, the first wavelength selective coupler, and the first extension optical waveguide. The second loop is a closed route, forming a second resonator, and has a second length that is resonant for the second light of the second wavelength. The second wavelength selective coupler couples the main nonlinear optical waveguide and the second extension optical waveguide to each other such that a third light of a third wavelength is coupled between the main nonlinear optical waveguide and the second extension optical waveguide. The third light of the third wavelength travels in a third loop that extends through the main nonlinear optical waveguide, the first wavelength selective coupler, the second wavelength selective coupler and the second extension optical waveguide. The third route has a closed route, forming a third resonator, and has a third length that is resonant for the third light of the third wavelength.

In the illustrative example, with this optical waveguide structure, the routes for the different lights of different wavelengths in the optical waveguides can have lengths that are selected such that at least one of resonance or round-trip phase matching is present for the different lights of different wavelengths traveling on the different routes.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In other words, the length can be selected for a loop such that resonance is achieved for the light traveling in a loop. This type of selection of the length can be made for each loop independently of the lengths for other loops in the optical waveguide structure. In the illustrative example, resonance occurs for each wavelength of the light separately from the other wavelengths of the light.

Round trip phase matching can be achieved for the combination of all three loops. Round trip phase matching involves all three wavelengths of the light. In the illustrative example, the lengths of all three loops are selected jointly such that round trip phase matching is achieved for the nonlinear optical interaction between the three wavelengths of the light.

In the illustrative example, an optical waveguide structure can be a resonator-enhanced structure for nonlinear optical (NLO) three-wave mixing processes. These nonlinear optical three-wave mixing processes can include difference frequency generation, sum frequency generation, and spontaneous parametric down conversion (SPDC). The optical structure can also be a resonator-enhanced structure for degenerately pumped or degenerate output nonlinear optical (NLO) four-wave mixing processes. These degenerate output nonlinear optical four-wave mixing processes can be, for example, difference frequency generation, sum frequency generation, and spontaneous four-wave mixing (SFWM). In this illustrative example, degenerate means at least two of the waves participating in the nonlinear optical process have the same wavelength. Further, a degenerate three-wave mixing process, such as second harmonic generation, can be used.

In the illustrative example, the nonlinear optical processes can involve three distinct wavelengths of light, a first wavelength, a second wavelength, and a third wavelength. The nonlinear optical waveguide structure in the different illustrative examples comprises triple partially overlapping loops for entanglement (TriPOLE). This optical waveguide structure comprises a main nonlinear optical waveguide, a first extension optical waveguide, a first wavelength selective coupler, a second extension optical waveguide, and a second wavelength selective coupler in which light of different wavelengths travels in loops that extend through different combinations of these different optical waveguides. A first loop extends through the main nonlinear optical waveguide. This first loop is overlapped by parts of two other loops, which are a second loop and a third loop. The second loop extends through the main nonlinear optical waveguide and a first extension optical waveguide. The third loop extends through the main nonlinear optical waveguide and the second extension optical waveguide. These loops can be closed routes that define optical resonators having resonances at specific sets of wavelengths.

The parts of the first loop, the second loop and the third loop that are in common with or that extend through the main nonlinear optical waveguide in the optical waveguide structure are the portions of the optical waveguide structure in which the nonlinear optical three-wave mixing or four-wave mixing processes can occur. In the illustrative examples, the first extension optical waveguide is physically separate from the main nonlinear optical waveguide and is connected to the main nonlinear optical waveguide by a first wavelength selective optical coupler that selectively couples only the second light of the second wavelength into that first extension optical waveguide, but does not couple the first light of the first wavelength or the third light of the third wavelength into that first extension optical waveguide. In other words, the first wavelength selective optical coupler optically connects the first extension optical waveguide to the main nonlinear optical waveguide.

In this illustrative example, the second extension optical waveguide is separate from the main nonlinear optical waveguide and is connected to the main nonlinear optical waveguide by a second wavelength selective optical coupler that selectively couples the third light of the third wavelength into that second extension optical waveguide, but does not couple the first light of the first wavelength or the second light of the second wavelength into that second extension optical waveguide. In other words, the second wavelength selective optical coupler optically connects the second extension optical waveguide to the main nonlinear optical waveguide.

The first light of the first wavelength travels in a first loop that includes the main nonlinear optical waveguide. In this example, the first loop also can include the first wavelength selective coupler and the second wavelength selective coupler. The second light of the second wavelength light travels in a loop that includes the main nonlinear optical waveguide and the first extension optical waveguide. The third wavelength of light travels in a third loop that includes the main nonlinear optical waveguide and the second extension optical waveguide. Each of the three loops has a length that is designed to be resonant for the light that travels in the loop. The three loops can have different lengths.

The first wavelength selective optical coupler couples the second light of the second wavelength between the main nonlinear optical waveguide and the first extension optical waveguide to travel in a second loop but does not couple light of the first or third wavelengths between the main nonlinear optical waveguide and the first extension optical waveguide. Likewise, the second selective optical coupler couples the light of the third wavelength between the main nonlinear optical waveguide and the second extension optical waveguide to travel in a third loop but does not couple the light of the first or second wavelengths between the main nonlinear optical waveguide and the second extension optical waveguide. Thus, only the second light of the second wavelength travels a second length through the entire second loop. Also, only the third light of the third wavelength travels a third length through the entire third loop. The first light of the first wavelength travels only a first length through the first loop that includes the main nonlinear optical waveguide but does not include the first extension optical waveguide or the second extension optical waveguide.

The length of the first loop for the first light of the first wavelength can be selected such that the first light of the first wavelength is at a resonance of a first resonator comprising the main nonlinear optical waveguide.

The length of the second loop for the second light of the second wavelength can be selected such that that second light of the second wavelength is at a resonance of a second resonator comprising the main nonlinear optical waveguide and the first extension optical waveguide. The length of the third loop for the third light of the third wavelength can be selected so that the third light of the third wavelength is at a resonance of a third resonator formed by the main nonlinear optical waveguide and the second extension nonlinear optical waveguide.

In the illustrative example, a loop may traverse one or more of these optical waveguides. The loops through these optical waveguides can partially overlap with each other. In other words, the different loops are not identical to each other but may have overlaps within the optical waveguide structures.

Thus, although the propagation constants or wave vectors for the three wavelengths may be different from each other, the light at the three different wavelengths can still be at resonances when propagating on their respective loops in the optical waveguide structure. The propagation can occur such that the light of the three wavelengths can propagate constructively over many cycles through loops within the optical waveguide structure. This type of propagation can occur because the three loops have different lengths. Furthermore, the relative lengths of the three loops can be selected to meet the phase-matching requirement to sustain the nonlinear optical process over an interaction distance that is greater than the circumference of the main nonlinear optical waveguide in the optical waveguide structure.

The phase matching can be a feature distinct from the resonance that occurs for a resonator in the optical waveguide structure. Thus, 5 constraints may be applied to the nonlinear optical interaction that occurs in the optical waveguide structure. One constraint is on "energy conservation" which constrains the relationship between the 3 wavelengths. The other four constraints related to the propagation constants or wave vectors of the light of the 3 different wavelengths.

The phase-matching condition for the nonlinear optical process occurring in the main nonlinear optical waveguide can be described by a phase walk-off and by a coherent interaction distance. The coherent interaction distance is the distance at which a phase walk-off for the nonlinear optical interaction between the light of the three wavelengths equals 180 degrees or n radians.

In some illustrative examples, the length of the main nonlinear optical waveguide, in which all three wavelengths travel, can be set to be no greater than the coherent interaction distance. This length of the main nonlinear optical waveguide can be the length of multiple separate segments.

The length of the first extension optical waveguide and the length of the second extension optical waveguide can be set such that that the roundtrip phase walk-off for the nonlinear optical interaction between the light of the three wavelengths is a specified value. This round-trip phase walk-off can be set equal to zero or as close to being zero as possible, or can be set as close as possible to being a multiple of 2π radians or 360 degrees.

In some examples, tuning electrodes can be located with optical waveguides. For example, the main nonlinear optical waveguide can have a set of tuning electrodes that operate to adjust the roundtrip phase of the light of the first wavelength. The first extension optical waveguide can have a set of tuning electrodes that operates to adjust the roundtrip phase of the light of the second wavelength. The second extension optical waveguide can have a set of tuning electrodes that operate to adjust the roundtrip phase of the light of the third wavelength. Thus, these tuning electrodes can enable adjusting the resonance conditions to compensate for changes in at least one of the wavelengths of the light, the cross-sectional dimensions of the optical waveguides, and environmental conditions, such as temperature, or other factors. These tuning electrodes can also allow the optical waveguide structure to adjust the phase walk-off for the nonlinear optical interaction occurring in the main nonlinear optical waveguide.

In an illustrative example, the shortest wavelength of light involved in the nonlinear optical process can be the first light of the first wavelength. The next shortest wavelength of light involved in the nonlinear optical process can be the second light of the second wavelength, and the longest wavelength of light involved in that nonlinear optical process can be the third light of the third wavelength.

For example, a structure for spontaneous parametric down conversion can have the light with the shortest wavelength, the pump light, supplied to the main nonlinear optical waveguide through an input optical coupler and travel in the first loop. The optical coupler can be connected to an input optical waveguide that receives the pump light. The signal light and the idler light generated by the spontaneous parametric down conversion process would travel in the second loop and the third loop, respectively.

In another illustrative example, an optical waveguide structure that implements spontaneous four-wave mixing can have the pump light, whose frequency is intermediate between that of the generated light at the other wavelengths, supplied to the second loop through an additional optical coupler coupled to the first extension optical waveguide or coupled to the main nonlinear optical waveguide. The signal light generated by the spontaneous four-wave mixing process can travel through the main nonlinear optical waveguide and be coupled out of the waveguide structure through a first optical output coupler. The idler light generated by the spontaneous four-wave mixing process can travel in the third loop and can be coupled out of the optical waveguide structure through an additional, second, optical output coupler coupled to the second extension optical waveguide or coupled to the main nonlinear optical waveguide. These output optical couplers can be connected to output optical waveguides.

This optical waveguide structure can be a TriPOLE optical waveguide structure that is used in the illustrative examples to produce entangled photon pairs by nonlinear optical (NLO) processes. These nonlinear optical processes can be, for example, spontaneous parametric down conversion and spontaneous four-wave mixing. The two entangled photons produced by spontaneous parametric down conversion can be entangled when those photons are produced from the same pump photon. In a similar fashion, the two entangled photons produced by spontaneous four-wave mixing can be entangled when those photons are produced from the same two degenerate pump photons.

In this illustrative example, nonlinear optical waveguides in the form of ring resonators can be used to increase the generation rate of these entangled photon pairs, comprising a signal photon and an idler photon. In a high-Q ring resonator, light can travel many times around the circumference of the ring resonator. Thus, the interaction length of a ring resonator can be many times greater than its physical size. In implementing spontaneous parametric down conversion or spontaneous four-wave mixing with a ring resonator as currently used, all three wavelengths of light involved in the nonlinear optical process correspond to resonances of that resonator. For a resonator with high-Q, the allowable amount that a wavelength can depart from the resonant condition and still be supported by the resonator can be smaller than desired.

Thus, with currently used spontaneous parametric down conversion or spontaneous four-wave mixing, all three wavelengths involved in the nonlinear optical process are adjusted to match resonances of the ring. However, this type of adjustment of the wavelengths may not be possible if the entangled photon pairs are to be used in quantum photonic circuits that also contain other sources of such photon pairs. The need in quantum photonics to perform optical interference functions involving photons produced by different sources of entangled photons may require those photons to have the same wavelength, so that photons can be indistinguishable.

As a result, adjusting the wavelengths associated with a first ring resonator whose output photons are involved in an optical interference function would impose a need to also adjust the wavelengths associated with a second ring resonator whose output photons are interfered with the photons from the first micro-ring resonator. However, if those two ring resonators are not identical, such adjustment may be beyond what is permitted by the spectral width of the resonances of the two ring resonators.

For example, a departure of a dimension of the fabricated waveguide, such as the waveguide width, by only 1-2 nm would shift the resonance wavelength beyond the spectral width associated with a quality factor or Q of $10^3$. Resonators with a higher Q have resonances with narrow spectral width, thereby making them impractical for use in quantum photonic circuits. Thus, if multiple currently available ring resonators are used in a quantum photonic circuit, those resonators would need to have a low Q. As a result, the nonlinear optical interaction distance for producing the entangled photon pairs by spontaneous parametric down conversion or spontaneous four-wave mixing would be much shorter and the photon-pair generation rates would be much lower.

The optical waveguide structure in the illustrative examples provides design flexibility to enable three loops through the waveguides to have resonances that correspond to three pre-specified wavelengths. Also, if multiple optical waveguide structures are used together in a quantum photonic circuit, these optical waveguide structures can be adjusted to make resonances of the optical waveguide structures correspond to specified wavelengths. This type of adjustment is in contrast to having all of the wavelengths adjusted to correspond to one resonator. Thus, the loops in the optical waveguide structures in a quantum photonic circuit can have a higher Q, enabling those optical waveguide structures to generate photon pairs at higher generation rates.

With reference now to the figures and, in particular, with reference to FIG. 1, an illustration of a block diagram of an optical waveguide structure is depicted in accordance with an illustrative embodiment. In this illustrative example, optical waveguide structure 100 comprises optical waveguides 102 in which at least one of optical waveguides 102 is comprised of nonlinear optical material 104.

In this illustrative example, optical waveguides 102 comprise main nonlinear optical waveguide 106, first extension optical waveguide 108, and second extension optical waveguide 110.

As depicted, main nonlinear optical waveguide 106 is comprised of nonlinear optical material 104. First extension optical waveguide 108 and second extension optical waveguide 110 can be comprised of nonlinear optical material 104. In other words, in one illustrative example, first extension optical waveguide 108 and second extension optical waveguide 110 are not constructed using nonlinear optical material 104. In other illustrative examples, at least one of first extension optical waveguide 108 or second extension optical waveguide 110 can be constructed using nonlinear optical material 104.

In this illustrative example, optical waveguide structure 100 also comprises wavelength selective couplers such as first wavelength selective coupler 112 and second wavelength selective coupler 114. These wavelength selective couplers can selectively direct light 115 from one optical waveguide to another optical waveguide in optical waveguides 102. In this example, first wavelength selective coupler 112 and second wavelength selective coupler 114 can be selected from at least one of a two-waveguide coupler, a multi-mode interference coupler, a pulley coupler, a Mach-Zehnder interferometer, a 4-port micro-ring resonator coupler, or some other suitable wavelength selective coupler that can couple light and determine which wavelengths of light are directed through coupling from one optical waveguide to another optical waveguide.

As depicted in this example, light 115 can comprise at least one of first light 120 having first wavelength 122, second light 124 having second wavelength 126, or third light 128 having third wavelength 130.

In this particular example, first light 120, second light 124, and third light 128 can refer to a pump light, a signal light, and an idler light, but not necessarily in any particular order. For example, first light 120 can also be the signal light, second light 124 can be the pump light, and third light 128 can be the idler light. As another example, first light 120 can also be the pump light, second light 124 can be the signal light, and third light 128 can be the idler light.

In this illustrative example, optical waveguides 102 in optical waveguide structure 100 can support the propagation of light 115 through routes 131 in the form of loops 134, which are closed routes. Light 115 travels within optical waveguides 102 along routes 131. In the illustrative example, a closed route is a route for which a starting point and ending point are common or for which there is no distinct starting point that is separate from an ending point. The closed route is also referred to as a loop.

In this illustrative example, loops 134 can be triple partially overlapping loops for entanglement (TriPOLE) in which the loops overlap each other in portions of optical waveguides 102 in optical waveguide structure 100. In other words, overlap is present between portions of loops 134 for the different wavelengths of light 115 traveling though optical waveguides 102.

As depicted, wavelength selective couplers, such as first wavelength selective coupler 112 and second wavelength selective coupler 114, can operate to produce different routes in routes 131 for the different wavelengths of light to have different lengths.

As depicted in this illustrative example, nonlinear optical material 104 has nonlinear coefficient 116. In the illustrative example, nonlinear coefficient 116 can be a second order nonlinear coefficient or a third order nonlinear coefficient depending on the type of optical process implemented in optical waveguide structure 100.

Nonlinear polarization can occur in nonlinear optical material 104 in which the material polarization no longer varies linearly with the electric field amplitude. This nonlinear relationship can be expressed as follows:

$$P = \chi^{(1)}E + \chi^{(2)}EE + \chi^{(3)}EEE + \cdots$$

where E is the electric field, $\chi(1)$ is the linear optical susceptibility, $\chi(2)$ is the second order nonlinear optical susceptibility, etc. The nonlinear susceptibilities, such as $\chi(2)$ and $\chi(3)$, represent the nonlinear parts of the material dipolar characteristics.

In this example, the electric field amplitude is the electric field amplitude of the light wave, which is an electromagnetic field. An electromagnetic field has a traveling (or propagating) electric field and a traveling (or propagating) magnetic field.

In this illustrative example, nonlinear optical process 132 can be nonlinear optical mixing processes that can occur within optical waveguide structure 100. These nonlinear optical mixing processes can be used to generate light 115. For example, the propagation of first light 120 can result in the generation of at least one of second light 124 or third light 128 using one or more nonlinear optical waveguides employing nonlinear optical mixing processes in optical waveguides 102.

In the illustrative example, nonlinear optical mixing processes can include nonlinear optical three-wave mixing processes and nonlinear optical four-wave mixing processes. In this illustrative example, the nonlinear optical three-wave mixing processes and the nonlinear optical four-wave mixing processes can include difference frequency generation (DFG) and sum frequency generation (SFG). The nonlinear optical three-wave mixing processes can also include spontaneous parametric down conversion (SPDC). The nonlinear optical four-wave mixing can also include spontaneous four-wave mixing (SFWM).

In this illustrative example, nonlinear optical wave-mixing processes can include three types of light with three distinct wavelengths such as first light 120 having first wavelength 122, second light 124 having second wavelength 126, and third light 128 having third wavelength 130.

For example, nonlinear optical process 132 such as spontaneous four-wave mixing is a third order nonlinear optical process that can occur in main nonlinear optical waveguide 106. In this process, a pair of output photons 172 is generated from a pair of input photons 174 in main nonlinear optical waveguide 106. The pair of output photons 172 have different wavelengths from each other and have the different wavelengths from a pair of input photons 174.

In another illustrative example, nonlinear optical process 132, such as a spontaneous parametric down conversion, is a second order nonlinear optical process that can occur in main nonlinear optical waveguide 106 in which a pair of output photons 172 is generated from an input photon in input photons 174. In this example, the pair of output photons 172 can have different wavelengths from each other and have different wavelengths from the input photon in input photons 174.

In another example, spontaneous four-wave mixing occurs can in main nonlinear optical waveguide 106 in which a pair of output photons 172 is generated from a pair of input photons 174. The pair of output photons 172 have different wavelengths from each other and have the different wavelengths from the pair of input photons 174.

In this illustrative example, light generation 133 can be improved for optical waveguide structure 100 using optical waveguides 102 with loops 134 through optical waveguides 102. In the illustrative example, loops 134 are defined as the course of travel of light 115 within one or more of optical waveguides 102. In other words, loops 134 are defined as where light 115 travels within optical waveguides 102.

The manner in which optical waveguides 102 are coupled to each other through mechanisms such as first wavelength selective coupler 112 and second wavelength selective coupler 114 can be used to define loops 134 along which light 115 can travel. In the illustrative example, loops 134 can use different portions of optical waveguides 102 and wavelength selective couplers in optical waveguide structure 100. In this illustrative example, lengths 138 for loops 134 can be selected such that at least one of resonance matching 165 or roundtrip phase matching 166 is present for different wavelengths of light 115.

In this illustrative example, "resonance matching" means a given wavelength is matched to a resonance of a resonator. A resonator can have many resonances. Also, a resonator can be designed such that different lengths can still produce resonance matching for a particular wavelength of light. Resonance is achieved every time the round-trip phase is a multiple of $2\pi$.

In this illustrative example, first light 120 of first wavelength 122 travels in first loop 142 extending through main nonlinear optical waveguide 106 first wavelength selective coupler 112 and second wavelength selective coupler 114, in which first loop 142 has first length 144 in lengths 138 that is resonant for first light of 120 of first wavelength 122.

As depicted, first wavelength selective coupler 112 couples main nonlinear optical waveguide 106 and first extension optical waveguide 108 to each other such that second light 124 of second wavelength 126 is coupled between main nonlinear optical waveguide 106 and first extension optical waveguide 108. Second light 124 of second wavelength 126 travels in second loop 154 in loops 134, with second loop 154 extending through main nonlinear optical waveguide 106 and first extension optical waveguide 108. In a depicted example, second loop 154 is a closed route, in which second loop 154 has second length 156 in lengths 138 that is resonant for second light 124 of second wavelength 126.

In this illustrative example, second wavelength selective coupler 114 couples main nonlinear optical waveguide 106 and second extension optical waveguide 110 to each other such that third light 128 of third wavelength 130 is coupled between main nonlinear optical waveguide 106 and second extension optical waveguide 110. Third light 128 of third wavelength 130 travels in third loop 162 in loops 134 extending through main nonlinear optical waveguide 106 and second extension optical waveguide 110 in which third loop 162 is a closed route and has third length 164 in lengths 138 that is resonant for third light 128 of third wavelength 130.

In this illustrative example, loops 134 extending through optical waveguides 102 are closed routes in routes 131. These loops 134 can have a shape selected from at least one of a ring, a FIG. 8, a circle, an oval, a racetrack, an irregular ring, or some other suitable shape.

In this illustrative example, loops 134 for different light in light 115, such as first light 120, second light 124, and third light 128, can have loops 134 with different lengths in lengths 138. For example, first length 144 for first loop 142, second length 156 for second loop 154, and third length 164 for third loop 162 can have different lengths in lengths 138 for loops 134.

First loop 142, second loop 154, and third loop 162 are loops 134 that have lengths 138 selected to cause at least one of resonance matching 165 or roundtrip phase matching 166. In other words, the length of each loop can be selected such that resonance matching 165 is present, roundtrip phase matching 166 is present, or both resonance matching 165 and roundtrip phase matching 166 are obtained. The resonance in a loop can be matched to the wavelength of the light traveling in the loop in these examples.

For example, in optical waveguide structure 100, first length 144 of first loop 142 can be selected such that resonance matching 165 is present for first light 120 of first wavelength 122 As another example, in optical waveguide structure 100, second length 156 of second loop 154 can be selected such that resonance matching 165 is obtained for second light 124 of second wavelength 126. As yet another example, in optical waveguide structure 100, third length 164 of third loop 162 can be selected such that resonance matching 165 is obtained for third light 128 of third wavelength 130.

Thus, the length of each loop can be selected to obtain resonance matching 165 for that loop and that wavelength. Multiple lengths can be selected for a given loop that will result in resonance matching 165.

When roundtrip phase matching 166 is present, a generation of photons for at least one of first light 120, second light 124, or third light 128 continues along a set of loops 134 selected from at least one of first loop 142, second loop 154, or third loop 162 as travel distance increases for first light 120, second light 124, and third light 128 along the set of loops 134.

As depicted, optical waveguide structure 100 can also include a set of input optical waveguides 178 that provides input light 180 to one or more of optical waveguides 102. Optical waveguide structure 100 can also include a set of output optical waveguides 182 that emits output light 184 from one or more of the set of optical waveguides 102. In one illustrative example, an input optical waveguide in the set of input optical waveguides 178 can operate to provide input light 180 to one of main nonlinear optical waveguide 106, first extension optical waveguide 108, and second extension optical waveguide 110. As another example, an output optical waveguide in the set of output optical waveguides 182 can operate to emit output light 184 from one of main nonlinear optical waveguide 106, first extension optical waveguide 108, and second extension optical waveguide 110.

In this illustrative example, a set of optical couplers 186 can couple input light 180 from the set of input optical waveguides 178 to one or more of optical waveguides 102. A set of optical couplers 186 can also couple output light 184 from one or more of optical waveguides 102 to the set of output optical waveguides 182. Routes for light traveling through these optical couplers can also be part of a loop in some illustrative examples.

In one illustrative example, an output optical coupler in the set of optical couplers 186 can couple light 115 to an output optical waveguide in the set of output optical waveguides 182. A first output optical coupler in the set of optical couplers 186 can have a configuration that results in a desired Q factor for second loop 154 and a second output optical coupler in the set of optical couplers 186 can have a configuration that results in a desired Q factor for third loop 162. In this example, the Q factor equals $2\pi$ times the number of oscillation periods of a light wave required for the stored energy of that light wave in the resonator to decay to 1/e (≈37%) of its initial value.

Additionally, first loop 142, second loop 154, and third loop 162 are loops 134 that have lengths 138 that can be selected to cause roundtrip phase matching 166 in which a generation of photons for at least one of first light 120, second light 124, or third light 128 continues along a set of loops 134. In this example, the set of loops 134 is selected from at least one of first loop 142, second loop 154, or third loop 162 as for first light 120, second light 124, and third light 128 in the set of loops 134.

Figure 2:
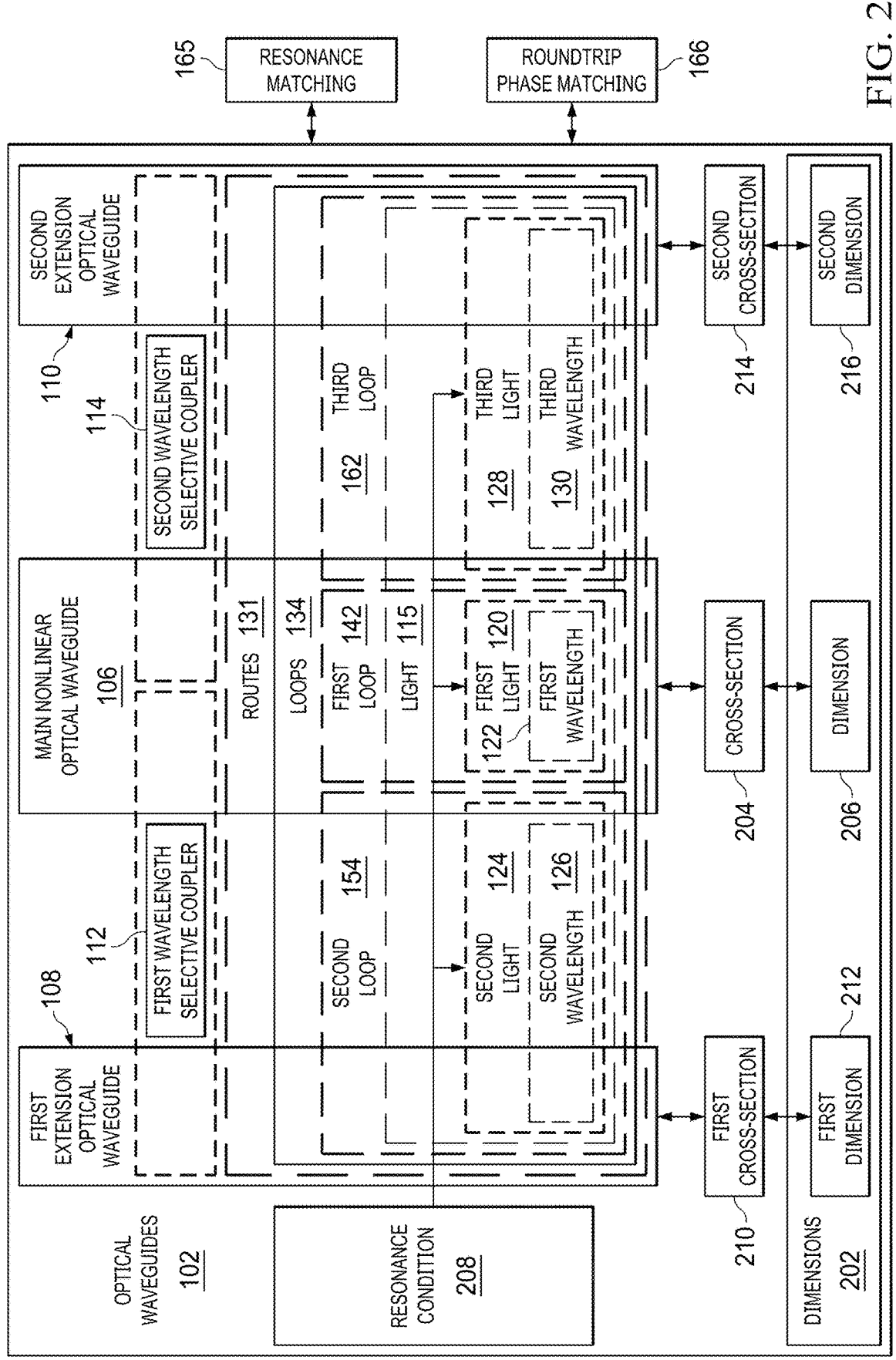
FIG. 2 is an illustration of a block diagram of a configuration for nonlinear optical waveguides in accordance with an illustrative embodiment.

With reference next to FIG. 2, an illustration of a block diagram of a configuration for nonlinear optical waveguides is depicted in accordance with an illustrative embodiment. In the illustrative examples, the same reference numeral may be used in more than one figure. This reuse of a reference numeral in different figures represents the same element in the different figures.

In illustrative example, at least one of resonance matching 165 or roundtrip phase matching 166 for optical waveguides 102 can be achieved through the selection of dimensions 202 for optical waveguides 102. This selection of dimensions 202 can be made in addition to the selection of lengths 138 in FIG. 1 for loops 134 in optical waveguides 102 to achieve at least one of resonance matching 165 or roundtrip phase matching 166 for optical waveguides 102.

For example, main nonlinear optical waveguide 106 can have cross-section 204 with dimensions 206 selected to achieve resonance condition 208 for first light 120 of first wavelength 122 traveling in main nonlinear optical waveguide 106. As another example, first extension optical waveguide 108 can have first cross-section 210 with first dimension 212 selected to achieve resonance condition 208 for second light 124 of second wavelength 126 traveling in first extension optical waveguide 108. Further, second extension optical waveguide 110 can have second cross-section 214 with second dimension 216 selected to achieve resonance condition 208 for third light 128 of third wavelength 130 traveling in second extension optical waveguide 110**.

Figure 3:
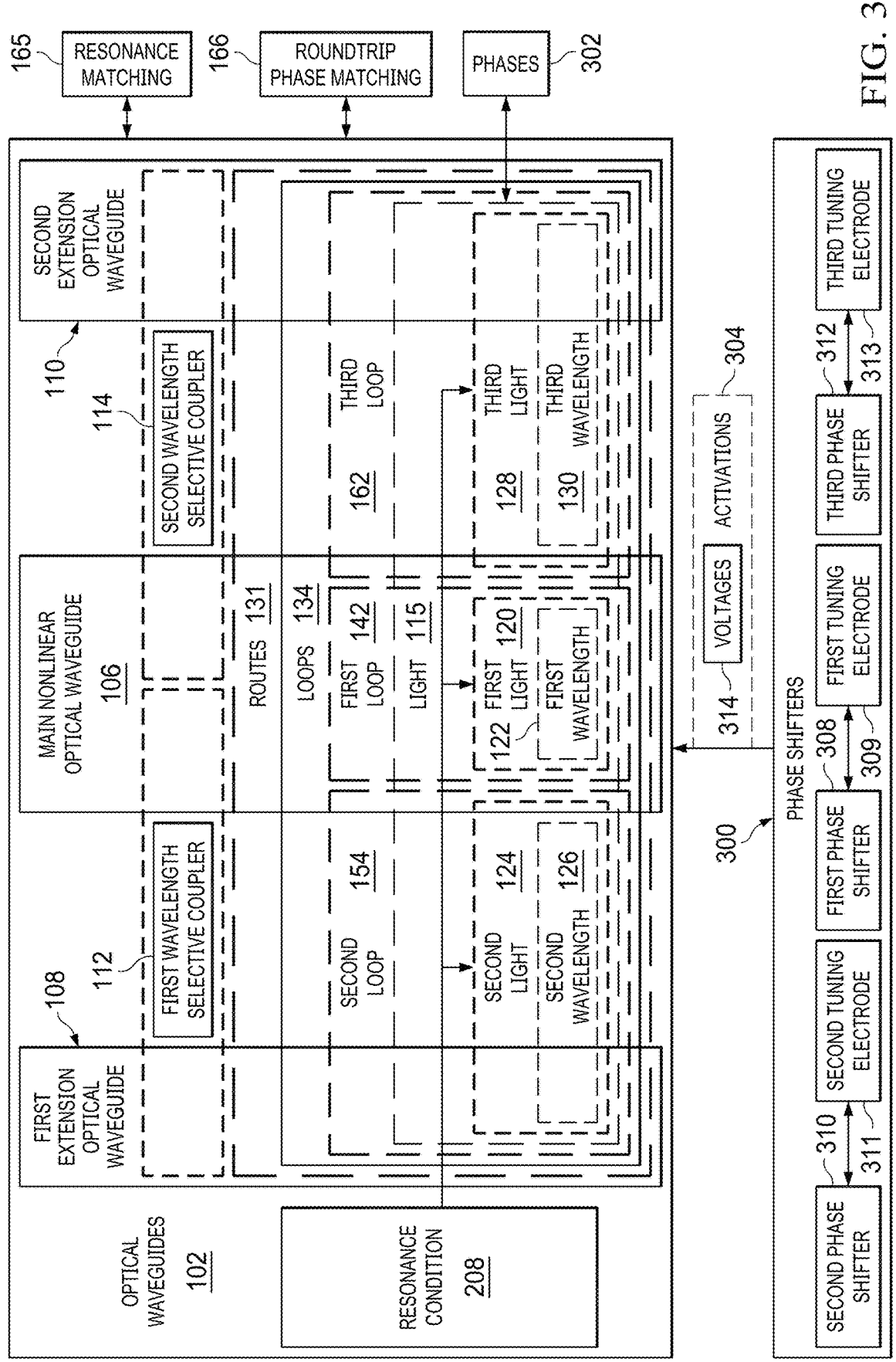
FIG. 3 is an illustration of phase shifters used to obtain at least one of a resonance or roundtrip phase matching in accordance with an illustrative embodiment.

With reference now to FIG. 3, an illustration of phase shifters used to obtain at least one of a resonance matching or roundtrip phase matching is depicted in accordance with an illustrative embodiment. At least one of manufacturing deviations from specifications, environmental factors, or other influences can affect whether resonance condition 208 is present during the operation of optical waveguide structure 100 in FIG. 1.

When roundtrip phase matching 166 is not present during operation of optical waveguide structure 100, a set of phase shifters 300 can be used to adjust a set of phases 302 for light 115 propagating within optical waveguides 102. In one illustrative example, the set of phase shifters 300 can be structures that are located adjacent to one or more of optical waveguides 102; connected to one or more of optical waveguides 102; include part of one or more of optical waveguides 102; or a combination thereof.

The set of phase shifters 300 can operate to ensure a desired level of roundtrip phase matching 166 is achieved for light 115 that is generated within optical waveguides 102 in optical waveguide structure 100. As depicted, light 115 can be generated in an optical waveguide in optical waveguides 102 that is comprised of nonlinear optical material 104 in FIG. 1. In the illustrative example, main nonlinear optical waveguide 106 is comprised of nonlinear optical material 104. Optionally, first extension optical waveguide 108 and second extension optical waveguide 110 can be comprised of nonlinear optical material 104.

In one illustrative example, a set of phase shifters 300 can be connected to a set of optical waveguides 102 comprising at least one of main nonlinear optical waveguide 106, first extension optical waveguide 108, or second extension optical waveguide 110. The set of phase shifters 300 can apply a set of activations 304 such that a set of phases 302 in at least one of first light 120 of first wavelength 122, second light 124 of second wavelength 126, or third light 128 of third wavelength 130 changes in light 115 traveling in the set of optical waveguides 102 to which the set of activations 304 is applied.

In one illustrative example, the set of phase shifters 300 comprises a set of elements that can be located adjacent to a waveguide. The set of phase shifters 300 can take a number of different forms. For example, the set of phase shifters 300 can be selected from at least one of a tuning electrode, a thermal element, shape memory alloy element, piezo electric element, or some other element that can change the phase of a light particular wavelength propagating through the optical waveguide. These elements for the set of phase shifters 300 can be at least one of adjacent to part an optical waveguide, connected to part an optical waveguide, or include part an optical waveguide.

The set of activations 304 can take a number of different forms. For example, the set of activations 304 can be selected from at least one of a voltage, a current, a thermal energy, an electrically induced strain, or some other type of energy that can be applied to an optical waveguide to affect the manner in which light 115 propagates through the optical waveguide. In particular, the energy can be used to affect the phase of a light of the particular wavelength propagating through the optical waveguide.

In other words, the set of phase shifters 300 can selectively apply the set of activations 304 to adjust the phase for a particular wavelength of light 115 traveling within loops 134 and optical waveguides 102. This adjustment can be made by applying the activations 304 using a particular phase shifter located adjacent to an optical waveguide in the set of optical waveguides 102 in a loop in loops 134 for a particular wavelength of light to maintain or reach resonance matching 165 for that particular wavelength of light.

For example, when the set of phase shifters 300 is a set of tuning electrodes that apply a set of activations 304 as a set of voltages 314, first phase shifter 308 in the set of phase shifters 300 can be first tuning electrode 309 located adjacent to a portion of main nonlinear optical waveguide 106. Second phase shifter 310 in the set of phase shifters 300 can be second tuning electrode 311 located adjacent to a portion of first extension optical waveguide 108, and third phase shifter 312 in the set of phase shifters 300 can be third tuning electrode 313 located adjacent to a portion of second extension optical waveguide 110. First tuning electrode 309, second tuning electrode 311, and third tuning electrode 313 can apply the set of activations 304 in the form of a set of voltages 314 to adjust the set of phases 302 in first light 120 of first wavelength 122, second light 124 of second wavelength 126, or third light 128 of third wavelength 130 traveling on a set of loops 134 through optical waveguides 102. This shift in the set of phases 302 can be made to maintain or reach resonance matching 165 for one or more of the wavelengths of light 115, such as one or more of first light 120 of first wavelength 122, second light 124 of second wavelength 126, or third light 128 of third wavelength 130.

In the illustrative example, when an optical waveguide in the set of optical waveguides 102 comprises an electro-optic material, the activation can take the form of a voltage. When the optical waveguide does not comprise an electro-optic material, other forms of energy such as, for example, thermal energy, such as heat or strain, can be used as the set of activations 304. In this illustrative example, heat can be generated by applying electrical current to a resistor that forms a phase shifter in the set of phase shifters 300 such that heat is generated. As another example, a voltage can be applied to a piezo electric element for phase shifter in the set of phase shifters 300 to change the dimensions of the tuning electrode to cause strain in the portion of the optical waveguide adjacent to the phase shifter in the set of phase shifters 300.

The illustration of optical waveguide structure 100 in the different components in FIGS. 1-3 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, optical waveguide structure 100 can include additional waveguides selected to provide additional flexibility selecting a desired length in lengths 138 for a loop in loops 134. As another example, more than one nonlinear process can operate at the same time in optical waveguide structure 100.

As another example, first wavelength selective coupler 112 can couple two portions of main nonlinear optical waveguide 106 to each other such that first light 120 is coupled from a first portion of main nonlinear optical waveguide 106 to a second portion of main nonlinear optical waveguide 106. In yet another example, second wavelength selective coupler 114 can couple two portions of main nonlinear optical waveguide 106 to each other such that first light 120 is coupled from the second portion of main nonlinear optical waveguide 106 to the first portion of main nonlinear optical waveguide 106.

The set of phase shifters 300 are shown as separate functional blocks from optical waveguides 102. The physical structures forming a phase shifter in the set of phase shifters 300 can also include a portion of the structure in a waveguide in optical waveguides 102.

Figure 4:
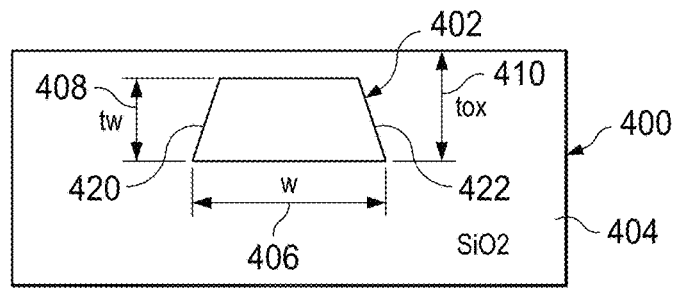
FIG. 4 is an illustration of a cross-section of an optical waveguide in accordance with an illustrative embodiment.

With reference now to FIG. 4, an illustration of a cross-section of an optical waveguide is depicted in accordance with an illustrative embodiment. In this illustrative example, waveguide 400 is shown in a cross-sectional view. This cross-section can be used in the optical waveguides in optical waveguide structure 100 in FIG. 1.

As depicted, waveguide 400 comprises core region 402 and cladding region 404. Core region 402 can be comprised of a material such as silicon nitride ($Si_3N_4$), silicon (Si) or silicon carbide (SiC) for optical processes based on four-wave mixing. Core region 402 can be comprised of a material such as lithium niobate ($LiNbO_3$), gallium phosphide (GaP), aluminum nitride (AlN) or silicon carbide (SiC) for optical processes based on three-wave mixing. Cladding region 404 is comprised of silicon dioxide ($SiO_2$) or other material whose refractive index is lower than the refractive index of the material comprising core region 402. The particular material used in waveguide 400 can vary in other illustrative examples depending on the optical process used.

In this illustrative example, core region 402 has width w 406 and height tw 408. Cladding region 404 has height tox 410.

Waveguide 400 can achieve a phase matching condition by adjusting the effective refractive indices ($n_{eff}$). The effective refractive indices can be adjusted through the selection of the material refractive index at a specific wavelength and varying the waveguide dimensions such as width w 406 and height tw 408, and top oxide thickness, height tox 410.

The selection of at least one of the material and dimensions for waveguide 400 can be based on the conditions for momentum conservation and phase matching. In the illustrative example, momentum conservation 165 in FIG. 1 is an automatic consequence of the nonlinear optical interaction. Whether the phase matching associated with the particular waveguide structure is consistent with momentum conservation 165 determines the degree of phase walk-off that results as the light travels in the waveguide over some distance.

For example, an effective refractive index can be a function of the height and width of core region 402. The coherence length is the propagation length at which the phase walk-off equals n radians. The coherence length is inversely proportional to the phase mismatch. In an illustrative example, the length of the main nonlinear optical waveguide should be no larger than the coherence length that can be achieved for the main nonlinear optical waveguide. This constraint can be used when the length of the loop in which the nonlinear optical interaction occurs is the main loop for the example described in FIG. 5 below.

Additionally, the cross-section shown for waveguide 400 is provided as an example and is not meant to limit the manner in which other illustrative examples can implement cross-sections for waveguides. For example, waveguide 400 is shown with side 420 and side 422 that are angled. In other illustrative examples, these two sides can be perpendicular rather than angled. As another example, other components may be present in this cross-section such as side regions that may be located adjacent to side 420 and side 422. In yet another illustrative example, the cross-section of waveguide 400 may also include a phase shifter such as a tuning electrode. As another example, waveguide 400 can include a second core region in addition to core region 402 when waveguide 400 is used to implement a two-waveguide optical coupler.

Figure 5:
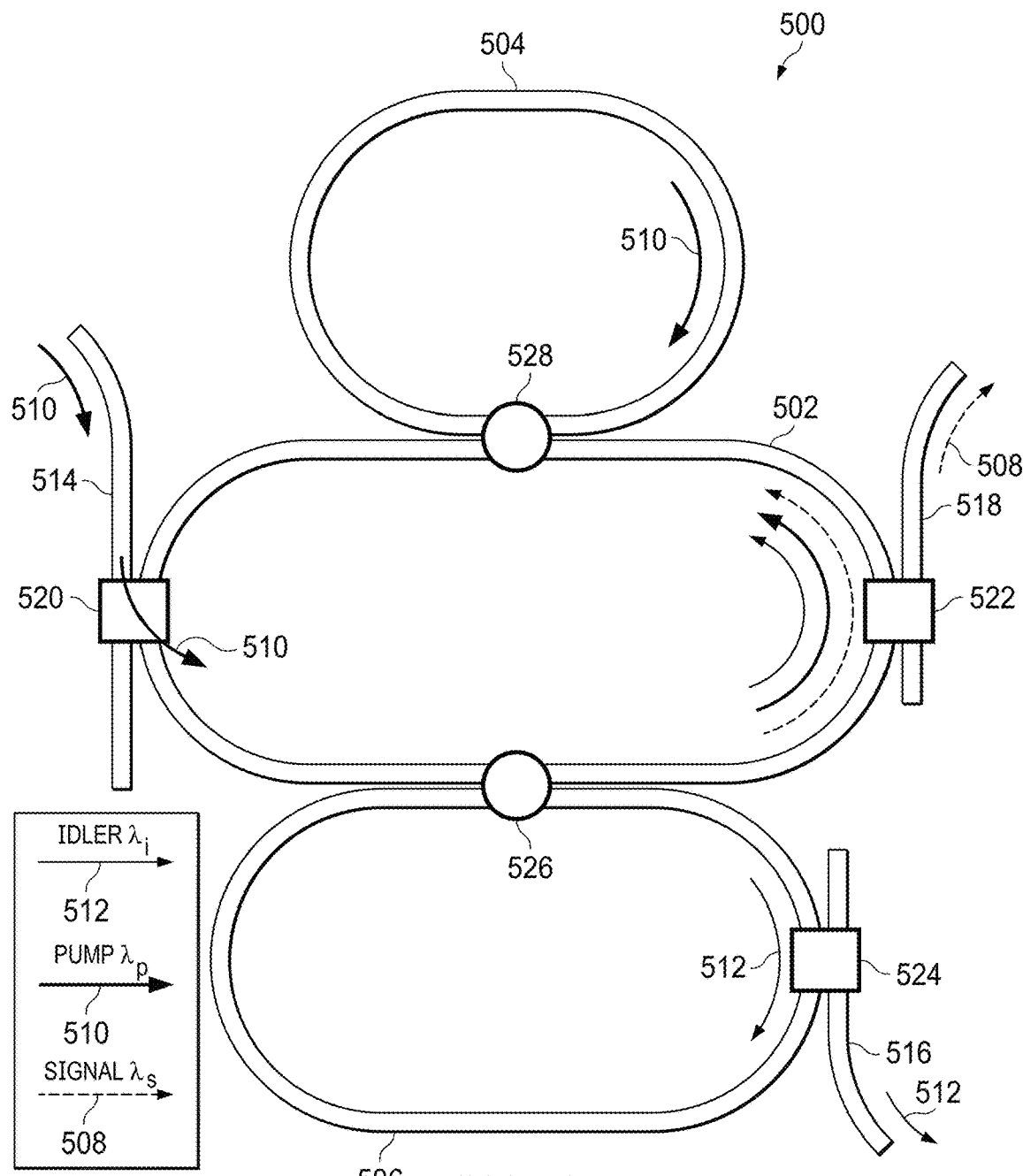
FIG. 5 is an illustration of an optical waveguide structure with three optical waveguides in accordance with an illustrative embodiment.

With reference to FIG. 5, an illustration of an optical waveguide structure with three optical waveguides is depicted in accordance with an illustrative embodiment. In this illustrative example, optical waveguide structure 500 is an example of one implementation for optical waveguide structure 100 shown in block form in FIG. 1.

As depicted, optical waveguide structure 500 comprises optical waveguides in the form of main nonlinear optical waveguide 502, first extension optical waveguide 504, and second extension optical waveguide 506. As depicted, these optical waveguides in optical waveguide structure 500 have a racetrack shape. In this illustrative example, main nonlinear optical waveguide 502 is an example of main nonlinear optical waveguide 106; first extension optical waveguide 504 is an example of first extension optical waveguide 108; and second extension optical waveguide 506 is an example of second extension optical waveguide 110 in FIGS. 1-3.

In this example, first extension optical waveguide 504, and second extension optical waveguide 506 may or may not be nonlinear optical waveguides.

In this illustrative example, light can travel within optical waveguide structure 500. In this illustrative example, first light 508, second light 510, and third light 512. First light 508 has the shortest wavelength in this example. In other words, first light 508 has the highest photon energy. Further, third light 512 as the longest wavelength, meaning that third light 512 has the lowest photon energy. Second light 510 has an intermediate wavelength between first light 508 and third light 512. In this example, second light 510 has an intermediate wavelength, meaning that second light 510 has an intermediate photon energy.

In this illustrative example, optical waveguide structure 500 can operate to implement a third order nonlinear optical process such as spontaneous four-wave mixing (SFWM). In this example, for spontaneous four-wave mixing with a degenerate pump light, pump photons in the pump light are for second light 510 having an intermediate wavelength with respect to the wavelengths of the photons for other lights in optical waveguide structure 500. In this illustrative example, first light 508 is a signal light and third light 512 is an idler light.

As depicted, the pump light, which is second light 510, can be supplied to main nonlinear optical waveguide 502 through input optical waveguide 514. Output optical waveguide 516 emits the idler light, which is third light 512 in this example. Output optical waveguide 518 can emit the signal light, which is first light 508 in this example.

In this illustrative example, the pump light can be supplied to main nonlinear optical waveguide 502 from input optical waveguide 514 using optical coupler 520. As depicted, the signal light can be coupled to output optical waveguide 518 from main nonlinear optical waveguide 502 using optical coupler 522 to be emitted as output light from output optical waveguide 518. The idler light, third light 512, can be coupled to output optical waveguide 516 from main nonlinear optical waveguide 502 using output optical coupler 524 to be emitted as output light from output optical waveguide 516.

In this illustrative example, photons for the three types of light, first light 508, second light 510, and third light 512, can travel on different routes through main nonlinear optical waveguide 502, first extension optical waveguide 504, and second extension optical waveguide 506 through wavelength selective coupler 526 and wavelength selective coupler 528. These wavelength selected couplers can direct light of a particular wavelength from between a first optical waveguide and a second optical waveguide while other wavelengths of light are not directed between these two optical waveguides. These wavelength selective couplers can direct or couple light based on the wavelengths of the light.

For example, wavelength selective coupler 528 can couple second light 510 between main nonlinear optical waveguide 502 and first extension optical waveguide 504. First light 508 and third light 512 are not directed between these two optical waveguides by wavelength selective coupler 528. As another example, wavelength selective coupler 526 can couple third light 512 between main nonlinear optical waveguide 502 and second extension optical waveguide 506. However, first light 508 and second light 510 are not coupled between these two optical waveguides by wavelength selective coupler 526.

Figure 6:
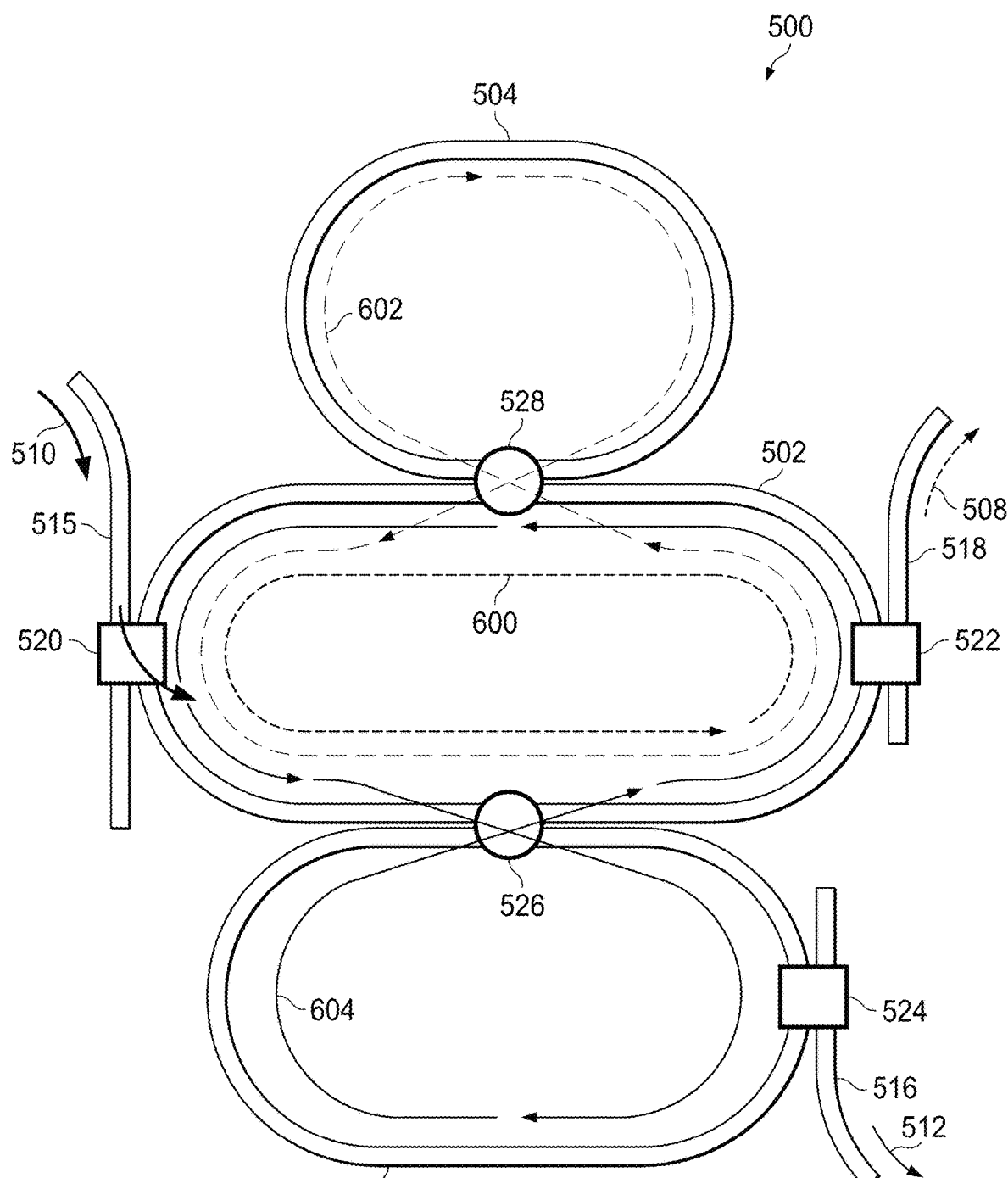
FIG. 6 is an illustration of loops for light in an optical waveguide structure with three optical waveguides in accordance with an illustrative embodiment.

Turning next to FIG. 6, an illustration of loops for light in an optical waveguide structure with three optical waveguides is depicted in accordance with an illustrative embodiment. Photons for the three types of light having these three wavelengths travel through optical waveguide structure 500 through three different loops. In other words, the three loops traveled by the three types of light can have partially overlapping portions and can also have portions that do not overlap.

In the illustrative example, the photons for first light 508, second light 510, and third light 512 travel through loops that extend through the main nonlinear optical waveguide 502. In this illustrative example, each of the loops has a length. As depicted, main nonlinear optical waveguide 502 has a length L, first extension optical waveguide 504 has a length $L_1$, and second extension optical waveguide 506 has a length $L_2$.

As depicted, first light 508, a signal light, travels along first loop 600. In this example, first loop 600 is only located in main nonlinear optical waveguide 502 and has a length $L_{L1}$, which is the length of the path through main nonlinear optical waveguide 502 and optical coupler 520, optical coupler 522, wavelength selective coupler 526, and wavelength selective coupler 528 connected to the main nonlinear optical waveguide 502 if those couplers are distinct from the main nonlinear optical waveguide 502. If the optical couplers are assumed to have negligible length, the length of first loop 600 equals the length L of the main nonlinear optical waveguide 502.

In this illustrative example, second loop 602 for second light 510, a pump light, travels through main nonlinear optical waveguide 502 and first extension optical waveguide 504, as well as through optical coupler 520, optical coupler 522, wavelength selective coupler 526, and wavelength selective coupler 528 if those couplers are distinct from the optical waveguides. Second loop 602 has a "figure 8" shape. The length of second loop 602 includes the lengths of the main nonlinear optical waveguide 502 and first extension optical waveguide 504, assuming one can neglect the lengths of the optical couplers. As a result, the length of second loop 602 is $L+L_1$.

As shown in this figure, third loop 604 is for third light 512, which is the idler light in this example. In this example, third loop 604 includes main nonlinear optical waveguide 502 and second extension optical waveguide 506, as well as through optical coupler 520, optical coupler 522, wavelength selective coupler 526, and wavelength selective coupler 528 if those optical couplers are distinct from the optical waveguides. The length of second loop 602 includes the lengths of the main nonlinear optical waveguide 502 and second extension optical waveguide 506, assuming one can neglect the lengths of the optical couplers. Third loop 604 also has a "figure 8" shape and has a length $L+L_2$.

Including the two extension optical waveguides, first extension optical waveguide 504 and second extension optical waveguide 506, with main nonlinear optical waveguide 502 enables mode resonance conditions for the three wavelengths for first light 508, second light 510, and third light 512 to be achieved separately by adjusting the values for L, $L_1$, and $L_2$. As depicted, first loop 600 for first light 508 has length L, second loop 602 for second light 510 has length $L+L_1$, and third loop 604 for third light 512 has length $L+L_2$, assuming the lengths of the optical couplers are sufficiently short such that those lengths do not need to be taken into account. These loops can be selected to provide resonance conditions for each of the three types of light having different wavelengths in a manner that is more flexible than current configurations.

Besides the mode resonance conditions for the three wavelengths, optical waveguide structure 500 also can satisfy the energy conservation condition and the momentum conservation condition for the nonlinear optical process. In degenerately pumped third order nonlinear parametric scattering such as spontaneous four-wave mixing (SFWM) can be implemented in optical waveguide structure 500. With degenerate light, two photons can have the same wavelength. These two photons can be either input or output photons. For degenerately pumped spontaneous four-wave mixing, the two input photons involved in the four-wave mixing process have the same wavelength.

In this illustrative example of degenerately pumped spontaneous four-wave mixing (SFWM), the energy conservation condition is:

$$\frac{2}{\lambda_p} = \left(\frac{1}{\lambda_s} + \frac{1}{\lambda_i}\right)$$

and the momentum conservation condition is:

$$\frac{2n_p}{\lambda_p} = \left(\frac{n_s}{\lambda_s} + \frac{n_i}{\lambda_i}\right),$$

where $n_p$ is the effective refractive index at the wavelength of the pump light, second light 510; $n_s$ is the effective refractive index at the wavelength of the signal light, first light 508; $n_i$ is the effective refractive index at the wavelength of the idler light, third light 512; $\lambda_p$ is the wavelength of the pump light, second light 510; $\lambda_s$ is the wavelength of the signal light, first light 508; and $\lambda_i$ is the wavelength of the idler light, third light 512.

These two conditions can be satisfied by a suitable selection of the transverse (or cross-sectional) profiles in the optical waveguides for at least one of main nonlinear optical waveguide 502, first extension optical waveguide 504, or second extension optical waveguide 506.

In this simplified illustrative example that neglects the effects of the optical couplers on the resonance matching and the phase matching, the nonlinear optical interaction takes place in main nonlinear optical waveguide 502. Main nonlinear optical waveguide 502 is a nonlinear optical waveguide designed to achieve a phase matching condition. For optical waveguide structure 500, the mode resonance conditions for the three wavelengths of light can be approximately described by $L+L_1=m_p\lambda_p/n_{\text{eff},p}$, $L=m_s\lambda_s/n_{\text{eff},s}$, $L+L_2=m_i\lambda_i/n_{\text{eff},i}$, where $m_p$, $m_s$ and $m_i$ are integer numbers. These simplified expressions do not take into account the effects of the wavelength selective couplers and the phase of the light traveling through those couplers. With optical waveguide structure 500, the resonance conditions are now not as restrictive as in the case of a single ring without extension optical waveguides and wavelength selective couplers. The length L of main nonlinear optical waveguide 502 can be selected to achieve the resonance condition for the signal wavelength. The length $L_1$ of first extension optical waveguide 504 for the pump photons in second light 510 can be selected to achieve the resonance condition for the pump wavelength.

Additionally, the length $L_2$ of second extension optical waveguide 506 for the idler photons in third light 512 can be selected to achieve the resonance condition for the idler wavelength $\lambda_i$.

In this depicted example, the optical waveguides in each of the extension optical waveguides can have electrodes that enable a bias voltage or other type of activation to be applied for electro optical tuning of the optical-phase shift that occurs in those extension optical waveguides. These additional adjustments can facilitate independent compensation of dimensional variations in the waveguide structure caused by fabrication inaccuracies.

Figure 7:
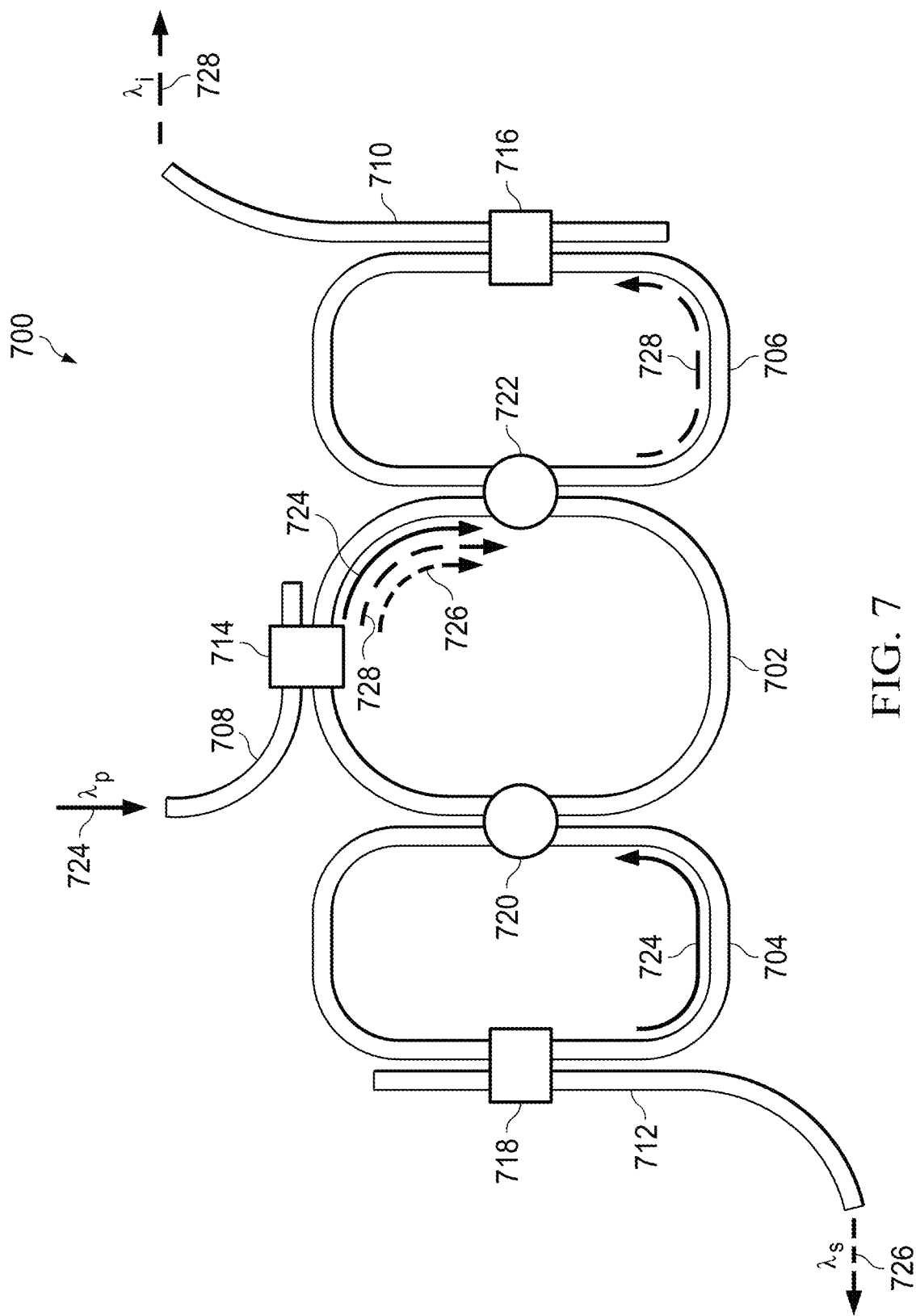
FIG. 7 is an illustration of an optical waveguide structure with three optical waveguides in accordance with an illustrative embodiment.

Turning now to FIG. 7, an illustration of an optical waveguide structure with three optical waveguides is depicted in accordance with an illustrative embodiment. In this illustrative example, optical waveguide structure 700 is an example of one implementation for optical waveguide structure 100 shown in block form in FIG. 1.

As depicted, optical waveguide structure 700 comprises nonlinear optical waveguides in the form of main nonlinear optical waveguide 702, signal extension optical waveguide 704, and idler extension optical waveguide 706. As depicted in this example, the optical waveguides in optical waveguide structure 700 have a racetrack shape. In this illustrative example, main nonlinear optical waveguide 702 is an example of main nonlinear optical waveguide 106; signal extension optical waveguide 704 is an example of first extension optical waveguide 108; and idler extension optical waveguide 706 is an example of second extension optical waveguide 110 respectively in FIGS. 1-3.

Additionally, optical waveguide structure 700 includes input optical waveguide 708, output optical waveguide 710, and output optical waveguide 712. Further, input optical coupler 714, output optical coupler 716, and output optical coupler 718 are present. Input optical coupler 714 couples pump light 724 from input optical waveguide 708 to main nonlinear optical waveguide 702. Output optical coupler 718 couples signal light 726 from signal extension optical waveguide 704 to output optical waveguide 712. Output optical coupler 716 couples idler light 728 from idler extension optical waveguide 706 to output optical waveguide 710.

In this illustrative example, pump light 724 has the shortest wavelength and idler light 728 has the longest wavelength. Signal light 726 has an intermediate wavelength that is between the wavelength of pump light 724 and the wavelength of idler light 728.

Additionally, signal wavelength selective coupler 720 and idler wavelength selective coupler 722 are present and are wavelength selective couplers in optical waveguide structure 700. In this illustrative example, signal wavelength selective coupler 720 can couple signal light 726 between main nonlinear optical waveguide 702 and signal extension optical waveguide 704. Idler wavelength selective coupler 722 can couple idler light 728 between main nonlinear optical waveguide 702 and idler extension optical waveguide 706.

In this illustrative example, optical waveguide structure 700 can implement a second order nonlinear optical process such as spontaneous parametric down conversion (SPDC). The three optical waveguides in optical waveguide structure 700 can define three partially overlapping loops for the light at the three wavelengths involved in the nonlinear optical process of spontaneous parametric down conversion.

As depicted, signal wavelength selective coupler 720 can be designed to maximize the coupling of light at the wavelength of signal light 726 between main nonlinear optical waveguide 702 and signal extension optical waveguide 704. Signal wavelength selective coupler 720 can be designed to minimize the coupling of light at the pump wavelength for pump light 724 and the idler wavelength for idler light 728 between main nonlinear optical waveguide 702 and signal extension optical waveguide 704. Instead, signal wavelength selective coupler 720 can be designed to maximize the coupling of light at the pump wavelength for pump light 724 and the idler wavelength for idler light 728 between a first portion of main nonlinear optical waveguide 702 and a second portion of main nonlinear optical waveguide 702.

In this illustrative example, idler wavelength selective coupler 722 can be designed to maximize the coupling of light at the idler wavelength for idler light 728 between main nonlinear optical waveguide 702 and idler extension optical waveguide 706. Idler wavelength selective coupler 722 can minimize the coupling of light at the pump wavelength for pump light 724 and the signal wavelength for signal light 726. Instead, idler wavelength selective coupler 722 can maximize the coupling of light at the pump wavelength for pump light 724 and the signal wavelength for signal light 726 between a second portion of main nonlinear optical waveguide 702 and a first portion of main nonlinear optical waveguide 702.

Figure 8:
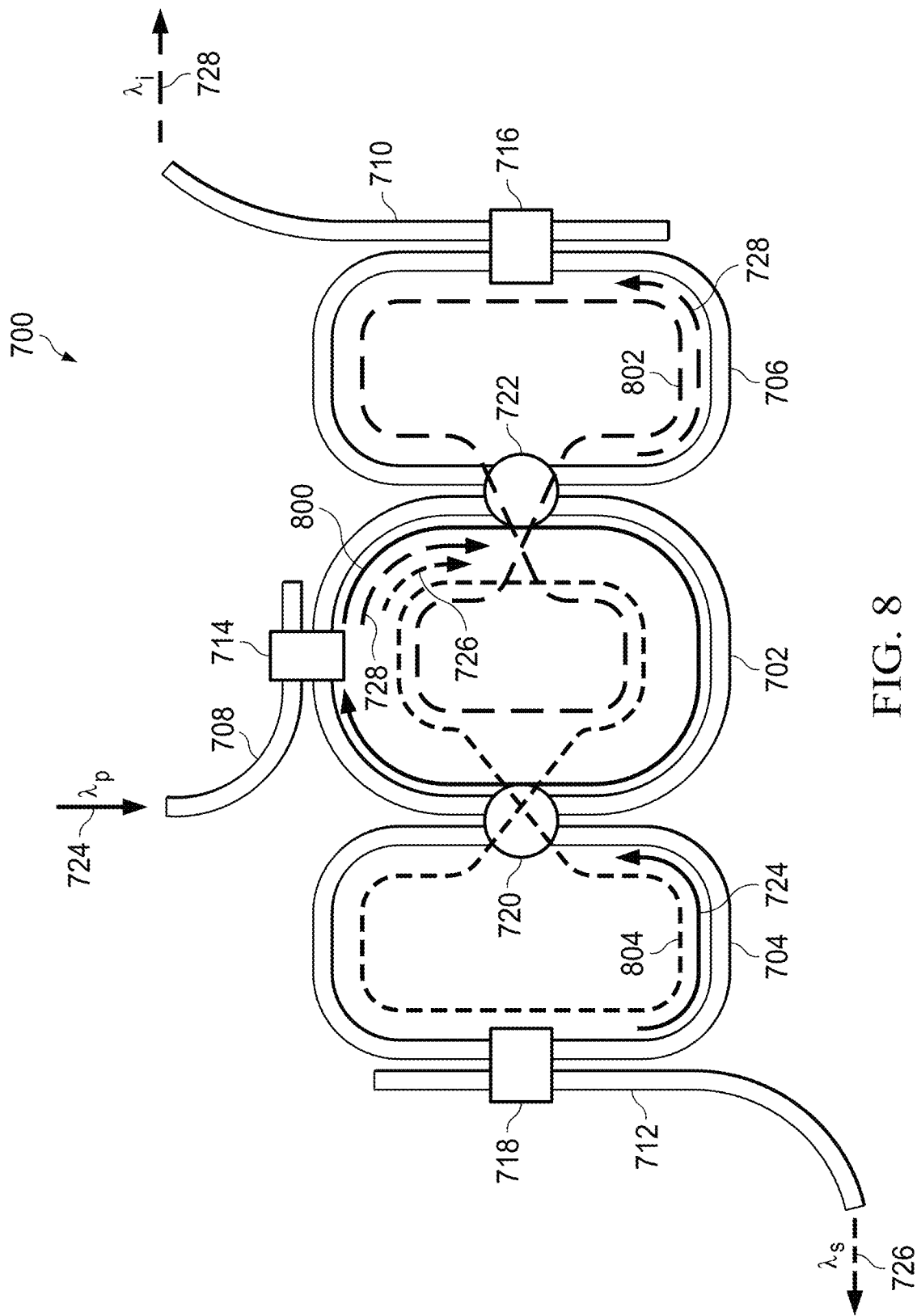
FIG. 8 is an illustration of loops for light in an optical waveguide structure with three optical waveguides in accordance with an illustrative embodiment.

Turning next to FIG. 8, an illustration of loops for light in an optical waveguide structure with three optical waveguides is depicted in accordance with an illustrative embodiment. With this configuration of optical waveguide structure 700, the photons for pump light 724, signal light 726, and idler light 728 can travel in different loops within optical waveguide structure 700. These loops can be selected to obtain desired propagation characteristics for pump light 724, signal light 726, and idler light 728.

With the configuration of signal wavelength selective coupler 720 and idler wavelength selective coupler 722, pump light 724 travels in loop 800 having an oval shape or race-track shape only through main nonlinear optical waveguide 702 and does not travel through signal extension optical waveguide 704 and idler extension optical waveguide 706. With this configuration, signal light 726 travels in loop 804 having a "figure 8" shape through main nonlinear optical waveguide 702 and signal extension optical waveguide 704. In this example, idler light 728 travels in loop 802 having a "figure 8" shape around main nonlinear optical waveguide 702 and idler extension optical waveguide 706.

Tuning electrodes (not shown in this figure) for thermal or electro-optic (E-O) tuning can be implemented on signal extension optical waveguide 704 and idler extension optical waveguide 706. These tuning electrodes (not shown) can also be used with main nonlinear optical waveguide 702.

For a second order nonlinear optical parametric scattering process such as spontaneous parametric down conversion, energy conservation can be described by the expression:

$$\frac{1}{\lambda_p} = \left(\frac{1}{\lambda_s} + \frac{1}{\lambda_i}\right),$$

where $\lambda_p$ is the wavelength of pump light 724; $\lambda_s$ is the wavelength of signal light 726; and $\lambda_i$ is the wavelength of idler light 728.

This energy-conservation condition constrains the wavelengths for pump light 724, signal light 726, and idler light 728. In some examples, optical waveguide structure 700 can implement a nonlinear optical process such as spontaneous parametric down conversion. This process can operate to generate a photon pair comprising one signal photon and one idler photon in a node of a quantum network. The signal and idler wavelengths can be determined by additional constraints imposed by the node and the network. Thus, the pump wavelength also can be determined, as constrained by the energy-conservation condition. The momentum conservation condition for the spontaneous parametric down conversion process can be described b the expression:

$$\frac{n_p}{\lambda_p} = \left(\frac{n_s}{\lambda_s} + \frac{n_i}{\lambda_i}\right),$$

where $n_p$ is the effective refractive index at the wavelength of pump light 724, $n_s$ is the effective refractive index at the wavelength of signal light 726, and $n_i$ is the effective refractive index at the wavelength of idler light 728 for the wave-guided modes at the pump, signal, and idler wavelengths, respectively. In this expression, $\lambda_p$ is the wavelength of pump light 724; $\lambda_s$ is the wavelength of signal light 726; and $\lambda_i$ is idler light 728.

In some illustrative examples, the cross-sectional structure of the waveguide in main nonlinear optical waveguide 702 can be designed to achieve the momentum-conservation condition.

In a simplified illustrative example, the lengths of the optical waveguides in optical waveguide structure 700 can be selected to achieve resonance matching 165 or roundtrip phase matching 166. This simplified example ignores the effects of the lengths of the wavelength selective couplers and the input and output couplers on the resonance matching or the round trip phase matching. The length L of main nonlinear optical waveguide 702 can be selected to satisfy the resonance-mode condition:

$$L = \frac{m_p \lambda_p}{n_p},$$

where mp is an integer value and represents the azimuthal mode number of the light at the pump wavelength that propagates in loop 800 extending through main nonlinear optical waveguide 702; $\lambda_p$ is the wavelength of pump light 724; and $n_p$ is the effective refractive index at the wavelength of pump light 724.

The signal-loop extension can have a length $L_s$ that is selected to satisfy the resonance-mode condition:

$$L_s = \frac{m_s \lambda_s}{n_s} - L,$$

where $m_s$ is an integer value and represents the resonance-mode number of signal light 726 at the signal wavelength that propagates around loop 804 extending through main nonlinear optical waveguide 702, signal wavelength selective coupler 720, and signal extension optical waveguide 704; $\lambda_s$ is the wavelength of signal light 726; $n_s$ is the effective refractive index at the wavelength of signal light 726; and L is the length of main nonlinear optical waveguide 702. The idler-loop extension can have a length $L_i$ that is selected to satisfy the resonance-mode condition:

$$L_i = \frac{m_i \lambda_i}{n_i} - L,$$

where $m_i$ is an integer value and represents the resonance-mode number of idler light 728 at the idler wavelength that propagates around loop 802 extending through main nonlinear optical waveguide 702, idler wavelength selective coupler 722, and idler extension optical waveguide 706; $\lambda_i$ is the wavelength of idler light 728; $n_i$ is the effective refractive index at the wavelength of idler light 728; and L is the length of main nonlinear optical waveguide 702.

With respect to the wavelength selective optical couplers used in optical waveguide structure 100 in FIG. 1, optical waveguide structure 500 in FIG. 5 and optical waveguide structure 700 in FIG. 7 can be configured to direct light between waveguides in the structures for selected wavelengths.

In one illustrative example, each of the two wavelength selective couplers in an optical waveguide structure can be designed to direct as close as possible to 100 percent of the light at the selected wavelength from the main nonlinear optical waveguide 702 into an extension optical waveguide for that wavelength. The wavelength selective coupler can also be designed to direct as close as possible to zero percent of the light at the other two wavelengths into that extension optical waveguide, such that the light at the other two wavelengths is directed to continue traveling in the main nonlinear optical waveguide 702.

Additionally, each of those two wavelength selective couplers can be designed to direct as close as possible to 100 percent of the light at the selected wavelength back from the extension optical waveguide for that wavelength into the main nonlinear optical waveguide 702 after the light has propagated through the extension optical waveguide. As a result, the light of the selected wavelength can travel in a "figure 8" shaped loop through the combination of main nonlinear optical waveguide 702 and the extension optical waveguide using the wavelength selective coupler.

In an illustrative example, the shortest wavelength $\lambda_1$ of the three wavelengths involved in a nonlinear optical process remains in the main nonlinear optical waveguide. A first wavelength selective coupler selects the second longest wavelength $\lambda_2$ of the wavelengths involved in the nonlinear optical process for coupling between the main nonlinear optical waveguide and the first extension optical waveguide which extends the route for light of that wavelength $\lambda_2$. A second wavelength selective coupler selects the longest wavelength $\lambda_3$ of the wavelengths involved in the nonlinear optical process for coupling between the main nonlinear optical waveguide and the second extension optical waveguide which extends the route for light of that wavelength $\lambda_3$.

For example, in optical waveguide structure 700 in FIG. 7 and FIG. 8, signal extension optical waveguide 704 is located to the left side of main nonlinear optical waveguide 702 and extends the length of loop 804 for signal light 726. As another example, in optical waveguide structure 500 in FIG. 5, first extension optical waveguide 504 is shown as being above main nonlinear optical waveguide 502 and extends second loop 602 in FIG. 6 for pump light 724, which is second light 510 in FIG. 5. In optical waveguide structure 700 in FIG. 7, the loop extension path, idler extension optical waveguide 706, is located to the right side of main nonlinear optical waveguide 702 and extends the length of the loop for idler light 728 beyond the length provided by just main nonlinear optical waveguide 702. For the example depicted in FIG. 5, this loop extension path provided by second extension optical waveguide 506 is located below main nonlinear optical waveguide 502 and extends the length of the loop for idler light 728, which is third light 512 in FIG. 5.

The first wavelength selective coupler is configured to selectively couple light of wavelength $\lambda_2$ between the main nonlinear optical waveguide and the first extension optical waveguide and to not couple light of wavelengths $\lambda_1$, $\lambda_3$. The second wavelength selective coupler is configured to selectively couple light of wavelength $\lambda_3$ between the main nonlinear optical waveguide and the second extension optical waveguide and to not couple light of wavelengths $\lambda_1$, $\lambda_2$. The first wavelength selective coupler and the second wavelength selective coupler can be selected from at least one of a two-waveguide coupler, a multi-mode interference coupler, a pulley coupler, a Mach-Zehnder interferometer, and a 4-port micro-optical waveguide resonator coupler.

In an illustrative example, the first wavelength selective coupler and the second wavelength selective coupler are implemented as two-guide couplers or directional couplers. For this example, the first wavelength selective coupler can be described by a coupling coefficient $\kappa_1(\lambda)$ and by a coupling distance $d_1$. The parentheses in the expression for $\kappa_1$ indicates that the coupling coefficient is a function of a wavelength $\lambda$. The value of coupling coefficient $\kappa_1$ that applies for wavelength $\lambda_1$ is different from the value of $\kappa_1$ that applies for the other wavelengths $\lambda_2$ or $\lambda_3$. The width of the two waveguide-core regions in a two-guide coupler and the gap between those two core regions can be designed to achieve relative values for $\kappa_1(\lambda_1)$, $\kappa_1(\lambda_2)$ and $\kappa_1(\lambda_3)$ that together with a selected value for the coupling distance $d_1$ can achieve transfer between the main nonlinear optical waveguide 702 and the first extension optical waveguide 704 for light of wavelength $\lambda_2$ and no or minimal transfer for light of wavelengths A, and $\lambda_3$. For example, the following relations can be satisfied: $\kappa_1(\lambda_2) \cdot d_1 = \pi$, $\kappa_1(\lambda_3) \cdot d_1 = 2 \cdot N \cdot \pi$ and $\kappa_1(\lambda) \cdot d_1 \approx 0$.

In this illustrative example, the second wavelength selective coupler likewise can be described by a coupling distance $d_2$ and a coupling coefficient $\kappa_2(\lambda)$, with the coupling coefficient $\kappa_2$ being a function of a wavelength $\lambda$. The width of the two waveguide-core regions in a two-guide coupler and the gap between those two core regions can be designed to achieve relative values for $\kappa_2(\lambda_1)$, $\kappa_2(\lambda_2)$ and $\kappa_2(\lambda_3)$ that together with a selected value for the coupling distance $d_2$ can achieve transfer between the main nonlinear optical waveguide 702 and the second extension optical waveguide 706 for light of wavelength $\lambda_3$ and no or minimal transfer for light of wavelengths $\lambda_1$ and $\lambda_2$. For example, the following relations can be satisfied: $\kappa_2(\lambda_3) \cdot d_2 = \pi$, $\kappa_2(\lambda_1) \cdot d_2 \approx 0$ and $\kappa_2(\lambda_2) \cdot d_2 \approx 0$.

For example, the first coupler, signal wavelength selective coupler 720 can selectively couple signal light 726 at 1130 nm from main nonlinear optical waveguide 702 to signal extension optical waveguide 704. Minimal net coupling of idler light 728 at 1550 nm can occur. The second coupler, idler wavelength selective coupler 722, can selectively couple idler light 728 at 1550 nm but minimally couples signal light 726 at 1130 nm.

For example, in simulations, photons for signal light 726 at 1130 nm can be coupled from main nonlinear optical waveguide 702 to signal extension optical waveguide 704 with 96 percent efficiency, and the photons for idler light 728 at 1550 nm can be coupled from main nonlinear optical waveguide 702 to signal extension optical waveguide 704 with lower than 0.1 percent efficiency. In simulations, the photons for idler light 728 at 1550 nm can be coupled from main nonlinear optical waveguide 702 to idler extension optical waveguide 706 with 96 percent efficiency, and the photons for signal light 726 at 1130 nm can be coupled from main nonlinear optical waveguide 702 to idler extension optical waveguide 706 with 0.1 s efficiency.

Figure 9:
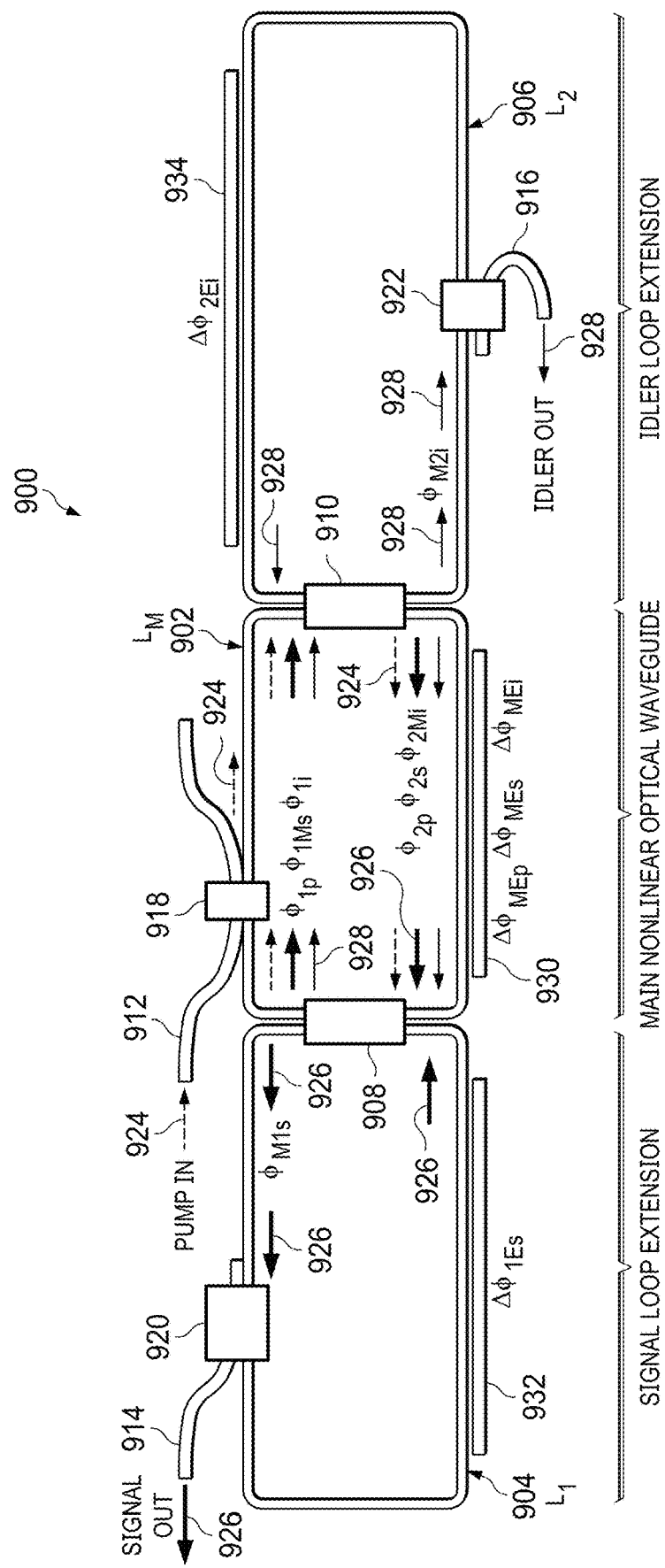
FIG. 9 is an illustration of an optical waveguide structure with tuning electrodes in accordance with an illustrative embodiment.

In FIG. 9, an illustration of an optical waveguide structure with tuning electrodes is depicted in accordance with an illustrative embodiment. In this illustrative example, optical waveguide structure 900 is an example of an implementation of optical waveguide structure 100 shown in block form in FIG. 1.

As depicted, optical waveguide structure 900 comprises main nonlinear optical waveguide 902, signal extension optical waveguide 904, and idler extension optical waveguide 906. In this illustrative example, main nonlinear optical waveguide 902, signal extension optical waveguide 904, and idler extension optical waveguide 906 have a racetrack shape. As depicted, optical waveguide structure 900 also includes signal wavelength selective coupler 908 and idler wavelength selective coupler 910.

In this illustrative example, optical waveguide structure 900 also includes pump input waveguide 912, signal output optical waveguide 914, and idler output optical waveguide 916. Input optical coupler 918 couples pump input waveguide 912 to main nonlinear optical waveguide 902. Output optical coupler 920 couples signal output waveguide 914 to signal extension optical waveguide 904, and output optical coupler 922 couples idler output waveguide 916 to idler extension optical waveguide 906.

As depicted, different wavelengths of light can travel within optical waveguide structure 900. In this example, pump light 924, signal light 926, and idler light 928 can travel in optical waveguide structure 900 along different loops in which the loops have different lengths selected to increase momentum conversation in phase matching conditions for the nonlinear optical process in optical waveguide structure 900.

Further, optical waveguide structural 900 can also include phase shifters such as tuning electrodes that can operate to shift the phase of at least one of pump light 924, signal light 926, or idler light 928. As depicted, optical waveguide structure 900 includes main tuning electrode 930, signal tuning electrode 932, and idler tuning electrode 934. Main tuning electrode 930 is located adjacent to main nonlinear optical waveguide 902. Signal tuning electrode 932 is located adjacent to signal extension optical waveguide 904, and idler tuning electrode 934 is located adjacent to idler extension optical waveguide 906.

In optical waveguide structure 900, pump light 924 travels in a loop that includes main nonlinear optical waveguide 902 but that does not include signal extension optical waveguide 904 or idler extension optical waveguide 906. For example, pump light 924 travels in a clockwise direction within main nonlinear optical waveguide 902.

In this illustrative example, signal light 926 travels in a "figure 8" shaped loop that includes main nonlinear optical waveguide 902 and signal extension optical waveguide 904. In this example, signal light 926 travels in a clockwise direction in main nonlinear optical waveguide 902 and in a counterclockwise direction in signal extension optical waveguide 904.

Idler light 928 travels in a "figure 8" shaped loop that includes main nonlinear optical waveguide 902 and idler extension optical waveguide 906. Idler light 928 travels in a clockwise direction within main nonlinear optical waveguide 902 and in a counterclockwise direction within idler extension optical waveguide 906.

The loops traveled by pump light 924, signal light 926, and idler light 928 have different lengths in this illustrative example. The lengths of these loops can be designed to increase at least one of efficiency in propagation or light generation in optical waveguide structure 900.

As depicted, signal wavelength selective coupler 908 is configured to be in a "through" state for wavelengths of pump light 924 and idler light 928. With this selectiveness, pump light 924 and idler light 928 remain in main nonlinear optical waveguide 902 without being directed to signal extension optical waveguide 904. In this illustrative example, signal wavelength selective coupler 908 is configured to be in a "cross" or "drop" state for wavelength of signal light 926. Thus, signal light 926 supplied to signal wavelength selective coupler 908 from main nonlinear optical waveguide 902 (lower right port) is coupled to signal extension optical waveguide 904 (upper left port). Likewise, signal light 926 supplied from signal extension optical waveguide 904 (lower left port) is coupled to main nonlinear optical waveguide 902 (upper right port).

In a similar fashion, idler wavelength selective coupler 910 is configured to be in a "through" state for wavelengths of pump light 924 and signal light 926. As a result, pump light 924 and signal light 926 remain in main nonlinear optical waveguide 902 when traveling by idler wavelength selective coupler 910. Idler wavelength selective coupler 910 is configured to be in a "cross" or "drop" state for the wavelength of idler light 928. Thus, idler light 928 supplied to idler wavelength selective coupler 910 from main nonlinear optical waveguide 902 (upper left portion) is coupled to idler extension optical waveguide 906 (lower right portion). Additionally, idler light 928 supplied from idler extension optical waveguide 906 (upper right portion) is coupled to main nonlinear optical waveguide 902 (lower left portion).

In this illustrative example, signal wavelength selective coupler 908 applies a phase shift of $\phi_{1p}$, $\phi_{1i}$ to the "through" coupled light, pump light 924 and idler light 928, respectively. Signal wavelength selective coupler 908 applies a phase shift of $\phi_{M1s}$ or $\phi_{1Ms}$ to the "cross" coupled light, signal light 926. Idler wavelength selective coupler 910 applies a phase shift of $\phi_{2p}$, $\phi_{2s}$ to the "through" coupled light, pump light 924 and signal light 926, respectively. Idler wavelength selective coupler 910 applies a phase shift of $\phi_{M2i}$ or $\phi_{2Mi}$ to the "cross" coupled light, idler light 928.

In this illustrative example, the tuning electrodes for main nonlinear optical waveguide 902, signal extension optical waveguide 904, and idler extension optical waveguide 906 can operate to add a phase shift to the light traveling through the portions of the structure with the tuning electrodes. For example, signal tuning electrode 932 for the signal-loop extension can add a phase shift of $\Delta\phi_{1Es}$ to signal light 926. This phase shift can be a positive or negative value.

In this example, tuning electrode 930 in main nonlinear optical waveguide 902 can add phase shifts to $\Delta\phi_{MEp}$, $\Delta\phi_{MEs}$ and $\Delta\phi_{MEi}$ to pump light 924, signal light 926, and idler light 928, respectively. These phase shifts can have a positive or negative value.

The roundtrip phase shift for the pump light, is given by:

$$\phi_{Mp} + \phi_{1p} + \phi_{2p} + \Delta\phi_{MEp}, \text{ where } \phi_{Mp} = 2\pi\, n_{Mp}\, L_M/\lambda$$

The parameter $n_{Mp}$ is the effective refractive index of the wave-guided pump light in main nonlinear optical waveguide 902 and $L_M$ is the length of the portions of main nonlinear optical waveguide 902 that are not part of signal wavelength selective coupler 908 or idler wavelength selective coupler 910.

In this illustrative example, pump light 924 only circulates within main nonlinear optical waveguide 902. For pump light 924 to remain circulating for many roundtrips in main nonlinear optical waveguide 902, the roundtrip phase shift should equal a multiple of $2\pi$. This condition can be met by designing optical waveguide structure 900 to have suitable values for the length $L_M$ and the effective refractive index $n_{Mp}$. The value for $n_{Mp}$ is determined by the detailed cross-sectional structure of the waveguide comprising the main nonlinear optical waveguide 902. This cross-section can be implemented using the cross-section shown for waveguide 400 in FIG. 4.

Signal light 926 propagates in a loop having a "figure 8" shape. This loop includes main nonlinear optical waveguide 902, signal wavelength selective coupler 908, idler wavelength selective coupler 910, and signal extension optical waveguide 904. For signal light 926, a roundtrip phase shift of signal light 926 traveling the entire loop is given by:

$$\phi_{Ms} + \Delta\phi_{MEs} + \phi_{M1s} + \phi_{1s} + \Delta\phi_{1Es} + \phi_{1Ms},$$

where $\phi_{Ms}=2\pi n_{Ms}L_M/\lambda_s$ and $n_{Ms}$ is the effective refractive index of the signal light 926 in main nonlinear optical waveguide 902 and $L_M$ is the length of the portions of main nonlinear optical waveguide 902 that are not part of signal wavelength selective coupler 908 or idler wavelength selective coupler 910. Also, $\phi_{1s}=2\pi r_{1s}L_1/\lambda_s$ and $n_{1s}$ is the effective refractive index of signal light 926 in signal extension optical waveguide 904 and $L_1$ is the length of the portion of signal extension optical waveguide 904 that is not part of signal wavelength selective coupler 908.

For signal light 926 to remain circulating many roundtrips in the "figure 8" shaped loop, the roundtrip phase shift should equal a multiple of $2\pi$. This condition can be met by designing optical waveguide structure 900 to have suitable values for the length $L_1$ and the effective refractive index $n_{1s}$. The value for $n_{1s}$ is determined by the detailed cross-sectional structure of the waveguide comprising the signal-loop extension. The value for $n_{Ms}$ is determined by the detailed cross-sectional structure of the waveguide comprising the main nonlinear optical waveguide 902.

Idler light 928 propagates in a loop having a "figure 8" shape. This loop includes main nonlinear optical waveguide 902, signal wavelength selective coupler 908, idler wavelength selective coupler 910, and idler extension optical waveguide 906. The roundtrip phase shift of idler light 928 is given by:

$$\phi_{Mi} + \Delta\phi_{MEi} + \phi_{M2i} + \phi_{2i} + \Delta\phi_{2Ei} + \phi_{2Mi},$$

where $\phi_{Mi}=2\pi n_{Mi}L_M/\lambda_i$ and $n_{Mi}$ is the effective refractive index of the wave-guided idler light 928 in main nonlinear optical waveguide 902 and $L_M$ is the length of the portions of main nonlinear optical waveguide 902 that are not part of signal wavelength selective coupler 908 or idler wavelength selective coupler 910. Also, $\phi_{2i}=2\pi n_{2i}L_2/\lambda_i$ and $n_{2i}$ is the effective refractive index of signal light 926 in signal extension optical waveguide 904 and $L_2$ is the length of the portion of idler extension optical waveguide 906 that is not part of idler wavelength selective coupler 910.

For idler light 928 to remain circulating for many roundtrips in the "figure 8" shaped loop, the roundtrip phase shift should equal a multiple of $2\pi$. This requirement can be met by designing optical waveguide structure 900 to have suitable values for the length $L_2$ and the effective refractive index $n_{2i}$. The value for $n_{2i}$ is determined by the detailed cross-sectional structure of the waveguide comprising signal extension optical waveguide 904. The value for $n_{Mi}$ is determined by the detailed cross-sectional structure of waveguide comprising main nonlinear optical waveguide 902.

It is desirable to increase the interaction distance over which the nonlinear optical process, such as spontaneous parametric down conversion, occurs coherently. Increasing the interaction distance can increase generation rate or efficiency of the signal and idler photons from the pump photons. Additionally, the round trip phase shifts for the pump light, signal light and idler light should match the momentum conservation condition of the nonlinear optical process. The condition includes the roundtrip phase shift of pump light 924 from its travel in main nonlinear optical waveguide 902, the roundtrip phase shift of signal light 926 from its travel in its "figure 8" shaped loop, and the roundtrip phase shift of idler light 928 from its travel in its "figure 8" shaped loop. Thus:

$$\phi_{Mp} + \phi_{1p} + \phi_{2p} + \Delta\phi_{MEp} - (\phi_{Ms} + \Delta\phi_{MEs} + \phi_{M1s} + \phi_{1s} + \Delta\phi_{1Es} + \phi_{1Ms}) -$$
$$(\phi_{Mi} + \Delta\phi_{MEi} + \phi_{M2i} + \phi_{2i} + \Delta\phi_{2Ei} + \phi_{2Mi}) = 0.$$

The adjustable phase shifts can be achieved by applying activations such as bias voltages using at least one of main tuning electrode 930, signal tuning electrode 932, or idler tuning electrode 934. These electrodes depicted for optical waveguide structure 900 can be used to adjust the roundtrip phase shifts for pump light 924 by adjusting $\Delta\phi_{MEp}$, signal light 926 by adjusting $\Delta\phi_{1Es}$, and idler light 928 by adjusting $\Delta\phi_{2Ei}$.

These in-situ adjustments to the phase of at least one of pump light 924, signal light 926, or idler light 928 can be used to correct or compensate for departures of the other parameters from as-designed values for optical waveguide structure 900 in an actually fabricated and operating implementation of optical waveguide structure 900.

The phase shift that can be obtained for a given electric field in the electro-optic material (due to a voltage applied to a set of electrodes) can be described by the relation:

$$\Delta\phi_{Ej} = 2\pi \ r_j n_j^3 \ E \ \Gamma_j \ L_E/\lambda_j$$

where j=p, s, i representing pump light 924, signal light 926, and idler light 928, respectively. Other parameters in this expression are the electric field E, the electro-optic coefficient $r_j$, the effective refractive index $n_j$, the overlap of the optical field of pump light 924, signal light 926, or idler light 928 with the electro-optic material $\Gamma_j$, the electrode length (or electro-optic interaction distance) $L_E$, and the wavelength $\lambda_j$ of pump light 924, signal light 928, or idler light 928. For an electro-optic material such as lithium niobate and for an electric field applied across the waveguide of $10^6$ V/m, the electrode length needed to achieve a phase shift of $2\pi$ is about 3-10 mm.

As depicted, optical waveguide structure 900 includes input optical coupler 918 that supplies pump light 924; output optical coupler 920 extracts some of signal light 926; and output optical coupler 922 extracts some of idler light 928. As depicted, input optical coupler 918 for pump light 924 is coupled to main nonlinear optical waveguide 902. Output optical coupler 920 for signal light 926 is coupled to signal extension optical waveguide 904, and output optical coupler 922 for idler light 928 is coupled to idler extension optical waveguide 906.

In some examples, input optical coupler 918 can be operated in a condition of critical coupling. In this critical coupling condition, as much of pump light 924 is coupled into main nonlinear optical waveguide 902 as is lost from main nonlinear optical waveguide 902. The loss of pump light 924 can occur in main nonlinear optical waveguide 902 from conversion of the pump photons in pump light 924 into signal photons in signal light 926 and idler photons in idler light 928 through the nonlinear optical process. In the illustrative examples, output optical coupler 920 for signal light 926 can be operated in a condition that determines a desired value for the Q of the resonator for the signal wavelength for signal light 926. In some examples, output optical coupler 922 for idler light 928 can be operated in a condition that determines a desired value for the Q of the resonator for the idler wavelength for idler light 928.

Figure 10:
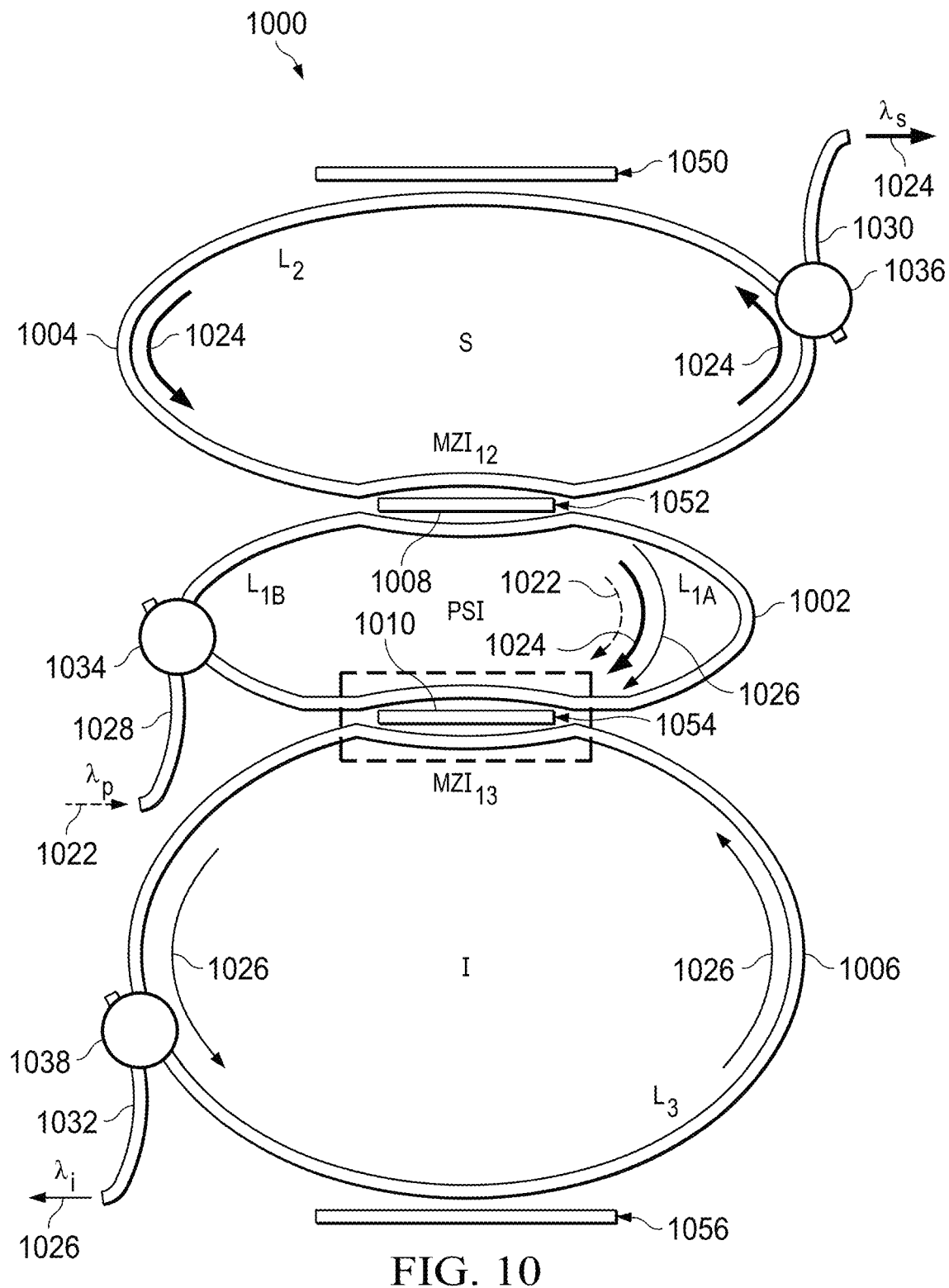
FIG. 10 is an illustration of an optical waveguide structure with wavelength selective couplers in accordance with an illustrative embodiment.

Turning next to FIG. 10, another illustration of an optical waveguide structure with wavelength selective couplers is depicted in accordance with an illustrative embodiment. In this illustrative example, optical waveguide structure 1000 is an example of an implementation of optical waveguide structure 100 shown in block form in FIG. 1. In this illustrative example, optical waveguide structure 1000 implements spontaneous parametric down conversion.

As depicted, optical waveguide structure 1000 comprises main nonlinear optical waveguide 1002, first extension optical waveguide 1004, and second extension optical waveguide 1006. In this illustrative example, main nonlinear optical waveguide 1002, first extension optical waveguide 1004, and second extension optical waveguide 1006 have irregular elongate shapes.

As depicted, optical waveguide structure 1000 also includes wavelength selective optical coupler 1008 and wavelength selective coupler 1010.

In this illustrative example, pump light 1022, signal light 1024, and idler light 1026 can travel within optical waveguide structure 1000. Additionally, optical waveguide structure 1000 also includes pump input waveguide 1028, signal output waveguide 1030, and idler output waveguide 1032. In this illustrative example, input optical coupler 1034 can couple pump light 1022 from pump input waveguide 1028 to main nonlinear optical waveguide 1002. Output optical coupler 1036 can couple signal light 1024 from first extension optical waveguide 1004 to signal output waveguide 1030, and output optical coupler 1038 can couple idler light 1026 from second extension optical waveguide 1006 to idler output optical waveguide 1032.

In this illustrative example, optical waveguide structure 1000 also includes tuning electrode 1050, and tuning electrode 1056. These tuning electrodes can be used to adjust the phase of light traveling through the optical waveguides in optical waveguide structure 1000. For example, tuning electrode 1050 can adjust the phase of signal light 1024 traveling through first extension optical waveguide 1004. In this illustrative example, tuning electrode 1056 adjusts the phase of idler light 1026 traveling through second extension optical waveguide 1006.

In this illustrative example, optical waveguide structure 1000 also includes tuning electrode 1052 and tuning electrode 1054. These tuning electrodes can be used to adjust the wavelength selective coupling of light between the optical waveguides in optical waveguide structure 1000. For example, tuning electrode 1052 can be used to adjust the coupling of signal light 1024 between main nonlinear optical waveguide 1002 and first extension optical waveguide 1004 and the retention of pump light 1022 and idler light 1026 in main nonlinear optical waveguide 1002. Also, tuning electrode 1054 can be used to adjust the coupling of idler light 1026 between main nonlinear optical waveguide 1002 and second extension optical waveguide 1006 and the retention of pump light 1022 and idler light 1026 in main nonlinear optical waveguide 1002.

Figure 11:
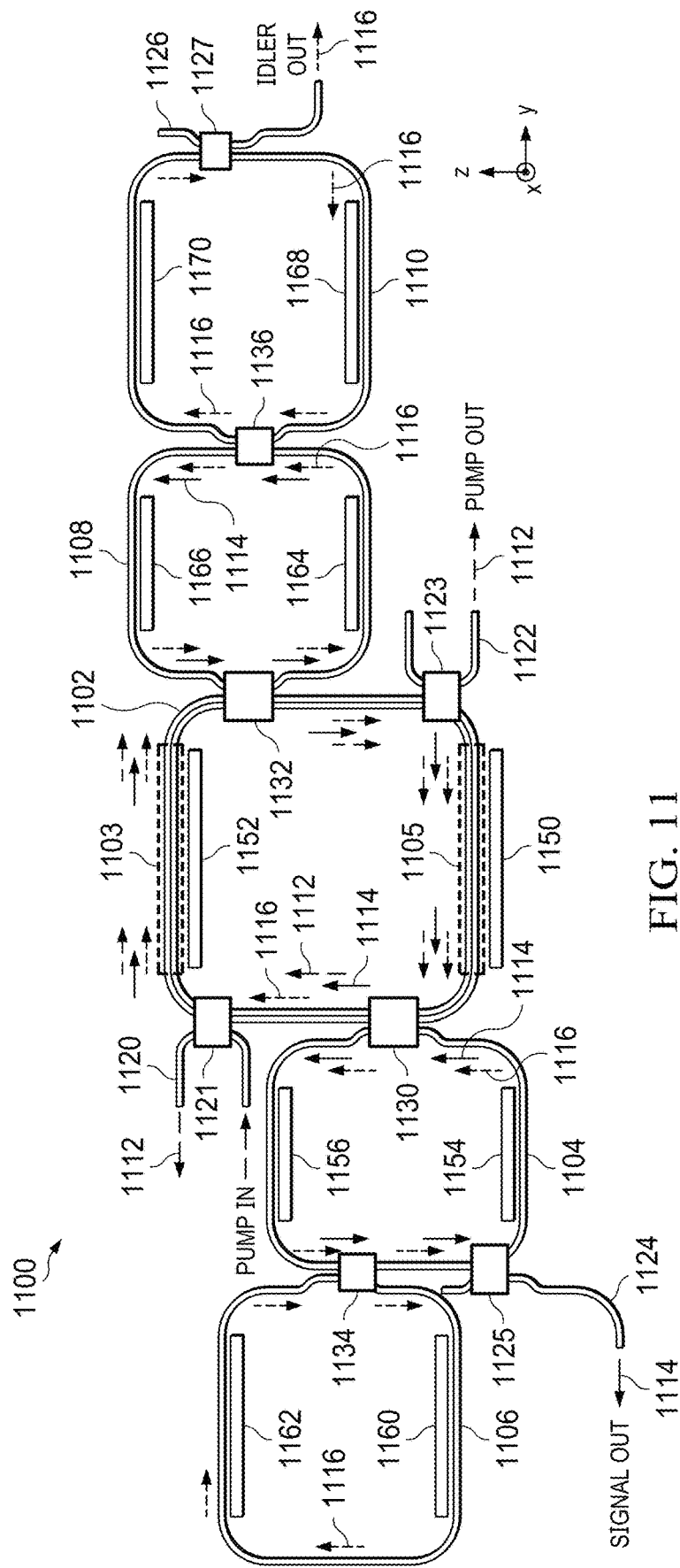
FIG. 11 is an illustration of an optical waveguide structure with multiple sets of wavelength selective couplers for extension loops in accordance with an illustrative embodiment.

With reference now to FIG. 11, an illustration of an optical waveguide structure with multiple sets of wavelength selective couplers for extension loops is depicted in accordance with an illustrative embodiment. In this illustrative example, optical waveguide structure 1100 is an example of an implementation of optical waveguide structure 100 shown in block form in FIG. 1. In this illustrative example, optical waveguide structure 1100 implements spontaneous parametric down conversion.

In this illustrative example, optical waveguide structure 1100 comprises a number of different optical waveguides. As depicted, optical waveguide structure 1100 comprises main nonlinear optical waveguide 1102, first inner extension optical waveguide 1104, first outer extension optical waveguide 1106, second inner extension optical waveguide 1108, and second outer extension optical waveguide 1110.

These optical waveguides in optical waveguide structure 1100 have a rounded rectangle shape. In this illustrative example, main nonlinear optical waveguide 1102 is an example of main nonlinear optical waveguide 106; first inner extension optical waveguide 1104 is an example of first extension optical waveguide 108; and first outer extension optical waveguide 1106 is an example of second extension optical waveguide 110 in FIGS. 1-3. Also, second inner extension optical waveguide 1108 is an example of first extension optical waveguide 108; and second outer extension optical waveguide 1110 is an example of second extension optical waveguide 110 in FIGS. 1-3.

In this illustrative example, light can travel within optical waveguide structure 1100. In this illustrative example, light traveling within optical waveguide structure 1100 comprises pump light 1112, signal light 1114, and idler light 1116. In this illustrative example, optical waveguide structure 1100 can operate to implement nonlinear optical processes than can generate photons. These nonlinear optical processes can be, for example, spontaneous parametric down conversion (SPDC) or spontaneous four-wave mixing (SFWM).

In this illustrative example, pump light 1112 can be supplied to main nonlinear optical waveguide 1102 from pump input optical waveguide 1120 using input optical coupler 1121. Pump light 1112 can be output from main nonlinear optical waveguide 1102 to pump output optical waveguide 1122 using output optical coupler 1123.

As depicted, signal output optical waveguide 1124 emits signal light 1114 in which signal light 1114 enters signal output optical waveguide 1124 from first inner extension optical waveguide 1104 using output optical coupler 1125. In this illustrative example, idler output optical waveguide 1126 outputs idler light 1116.

In this example, idler output optical waveguide 1126 emits idler light 1116 in which idler light 1116 enters idler output optical waveguide 1127 from second outer extension optical waveguide 1110 using output optical coupler 1127. In this illustrative example, idler output optical waveguide 1126 outputs idler light 1116.

In this illustrative example, photons for the three types of light, pump light 1112, signal light 1114, and idler light 1116, can travel on different routes through main nonlinear optical waveguide 1102, first inner extension optical waveguide 1104, first outer extension optical waveguide 1106, second inner extension optical waveguide 1108, and second outer extension optical waveguide 1110.

Wavelength selected couplers, such as wavelength selective optical coupler 1130, wavelength selective optical coupler 1132, wavelength selective optical coupler 1134, and wavelength selective optical coupler 1136, can direct light of a particular wavelength between a first optical waveguide and a second optical waveguide while other wavelengths of light are not directed between these two optical waveguides. These wavelength selective couplers can direct or couple light based on the wavelengths of the light. As depicted in this example, wavelength selective coupler 1130 and wavelength selective optical coupler 1132 are different locations on the opposite sides of main nonlinear optical waveguide 1102. In other words, the locations are not symmetric or a mirror image of each other.

In this illustrative example, wavelength selective coupler 1130 can couple both signal light 1114 and idler light 1116 between main nonlinear optical waveguide 1102 and first inner extension optical waveguide 1104. In this example, wavelength selective optical coupler 1130 does not couple pump light 1112.

As depicted, wavelength selective optical coupler 1134 can couple idler light 1116 between first inner extension optical waveguide 1104 and first outer extension optical waveguide 1106. Wavelength selective optical coupler 1134 does not couple signal light 1114.

As another example, wavelength selective optical coupler 1132 can couple signal light 1114 and idler light 1116 between main nonlinear optical waveguide 1102 and second inner extension optical waveguide 1108. Wavelength selective optical coupler 1132 does not couple pump light 1112.

In yet another example, wavelength selective optical coupler 1136 can couple idler light 1116 between second inner extension optical waveguide 1108 and second outer extension optical waveguide 1110. In this particular example, wavelength selective optical coupler 1136 does not couple signal light 1114.

In this depicted example, pump light 1112 travels along a loop in main nonlinear optical waveguide 1102, which is the resonator for pump light 1112. A signal loop is present for signal light 1114 and comprises the combination of two inner extension loops, first inner extension optical waveguide 1104 and second inner extension optical waveguide 1108, and main nonlinear optical waveguide 1102. The idler loop for idler light 1116 comprises the combination of main nonlinear optical waveguide 1102, first inner extension optical waveguide 1104, second inner extension optical waveguide 1108, and the two outer extension loops, first outer extension optical waveguide 1106 and second outer extension optical waveguide 1110.

As depicted, optical waveguide structure 1100 can combine the nonlinear optical generation from a first portion 1103 of main nonlinear optical waveguide 1102 ring that has one sign of the nonlinear optical coefficient with the nonlinear optical generation from a second portion 1105 of main nonlinear optical waveguide 1102 that has an opposite sign of the nonlinear optical coefficient. First portion 1103 can be referred to as an upper portion and second portion 1105 can be referred to as a lower portion in this depicted illustration of optical waveguide structure 1100.

In this illustrative example, the nonlinear optical generation occurs mainly in first portion 1103 and in second portion 1105 of main nonlinear optical waveguide 1102.

In this illustrative example, optical waveguide structure 1100 also includes tuning electrodes. As depicted, tuning electrode 1150 and tuning electrode 1152 are located adjacent to main nonlinear optical waveguide 1102. Tuning electrode 1154 and tuning electrode 1156 are located adjacent to first inner extension optical waveguide 1104, and tuning electrode 1160 and tuning electrode 1162 are located adjacent to first outer extension optical waveguide 1106.

As depicted, tuning electrode 1164 and tuning electrode 1166 are located adjacent to second inner extension optical waveguide 1108, and tuning electrode 1168 and tuning electrode 1170 are located adjacent to second outer extension optical waveguide 1110.

In this illustrative example, pump light 1112 travels in a first loop in a clockwise direction within main nonlinear optical waveguide 1102. Signal light 1114 travels in second loop in a counterclockwise direction within first inner extension optical waveguide 1104, in a clockwise direction within main nonlinear optical waveguide 1102, and in a counterclockwise direction within second inner extension optical waveguide 1108. In this example, idler light 1116 travels in a third loop that is clockwise in first outer extension optical waveguide 1106, counterclockwise within first inner extension optical waveguide 1104, clockwise direction within main nonlinear optical waveguide 1102, counterclockwise within second inner extension optical waveguide 1108, and clockwise within second outer extension optical waveguide 1110.

In FIG. 11, some of the wavelength selective couplers in optical waveguide structure 1100 are not connected directly to main nonlinear optical waveguide 1102. For example, wavelength selective optical coupler 1134 is connected between first inner extension optical waveguide 1104 and first outer extension optical waveguide 1106. As another example, wavelength selective optical coupler 1136 is connected between second inner extension optical waveguide 1108 and second outer extension optical waveguide 1110.

Figure 12:
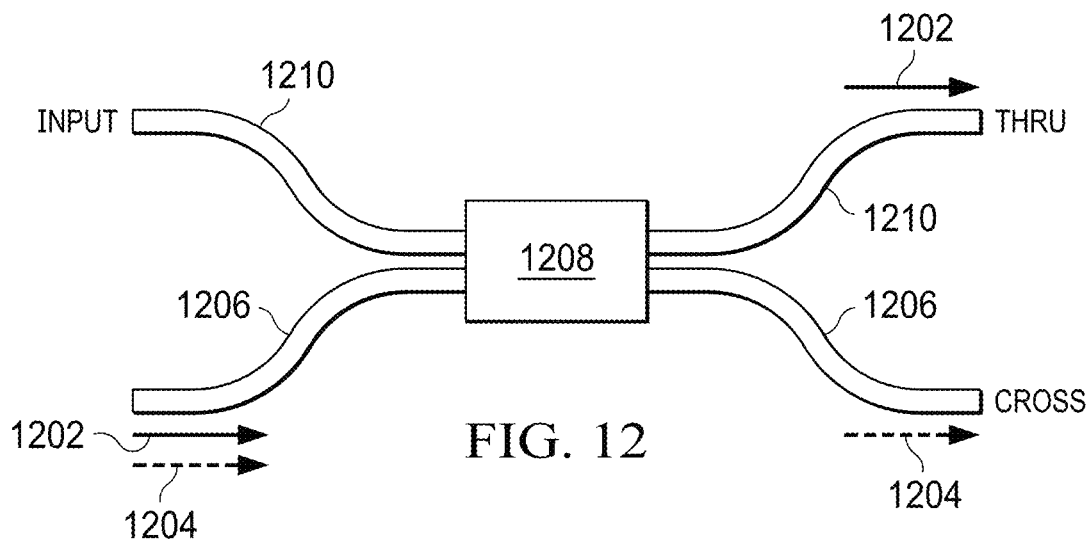
FIG. 12 is an illustration of light coupling by a wavelength selective coupler in accordance with an illustrative embodiment.

With reference to FIG. 12, an illustration of light coupling by a wavelength selective coupler is depicted in accordance with an illustrative embodiment. In this illustrative example, signal light 1202 and idler light 1204 travel though optical waveguide 1206 and are input into wavelength selective coupler 1208. As depicted, at the output of wavelength selective coupler 1208, idler light 1204 continues through optical waveguide 1206 and signal light 1202 crosses over to optical waveguide 1210.

This crossover of signal light 1202 is caused by the design of wavelength selective coupler 1208. In illustrative examples, wavelength selective coupler 1208 can be used for signal wavelength selective coupler 720 in optical waveguide structure 700 to selectively couple signal light 726 from main nonlinear optical waveguide 702 to signal extension optical waveguide 704 in FIG. 7. Wavelength selective coupler 1208 can also be used for signal wavelength selective coupler 908 in optical waveguide structure 900 to selectively couple signal light 926 from main nonlinear optical waveguide 902 to signal extension optical waveguide 904.

Figure 13:
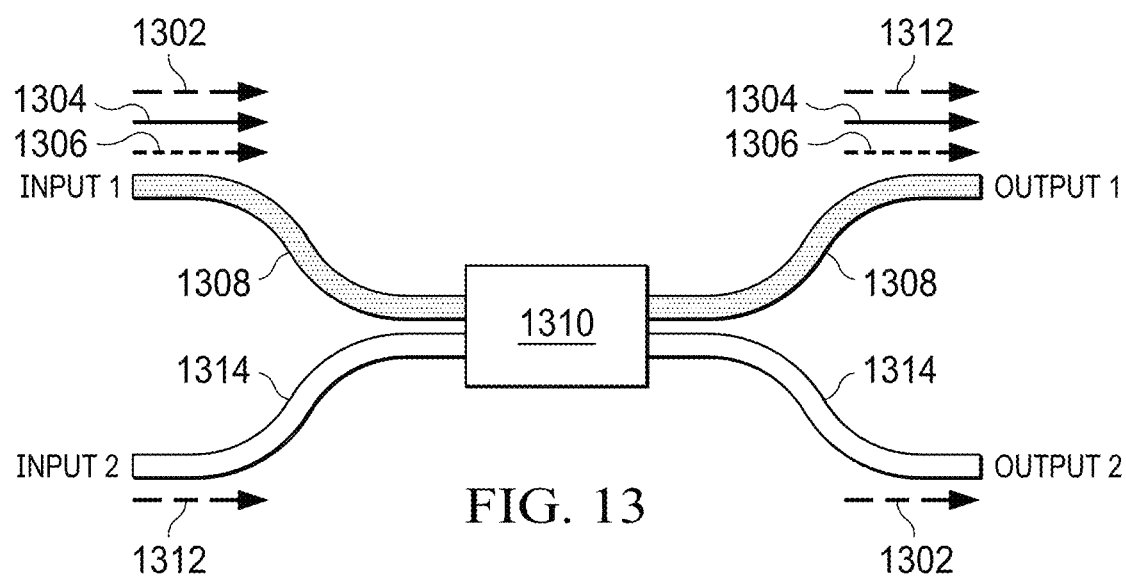
FIG. 13 is an illustration of light coupling by a wavelength selective coupler in accordance with an illustrative embodiment.

With reference next to FIG. 13, an illustration of light coupling by a wavelength selective coupler is depicted in accordance with an illustrative embodiment. In this illustrative example, pump light 1302, signal light 1304, and idler light 1306 travel though optical waveguide 1308 into wavelength selective optical coupler 1310. Pump light 1312 also travels through optical waveguide 1314 and is input into wavelength selective optical coupler 1310.

As depicted, at the output of wavelength selective optical coupler 1310, signal light 1304 and idler light 1306 continue to travel through optical waveguide 1308. Pump light 1302 traveling into wavelength selective optical coupler 1310 from optical waveguide 1308 crosses over to optical waveguide 1314 at the output of wavelength selective optical coupler 1310. In a similar fashion, pump light 1312 traveling through optical waveguide 1314 into wavelength selective optical coupler 1310 crosses over to optical waveguide 1308 at the output of wavelength selective optical coupler 1310. Wavelength selective optical coupler 1310 is illustrative example of input optical coupler 714 of optical waveguide structure 700 in FIG. 7 or input optical coupler 918 for optical waveguide structure 900 in FIG. 9. Wavelength selective optical coupler 1310 also is illustrative of input optical coupler 1121 and output optical coupler 1123 for optical waveguide structure 1100 in FIG. 11.

Figure 14:
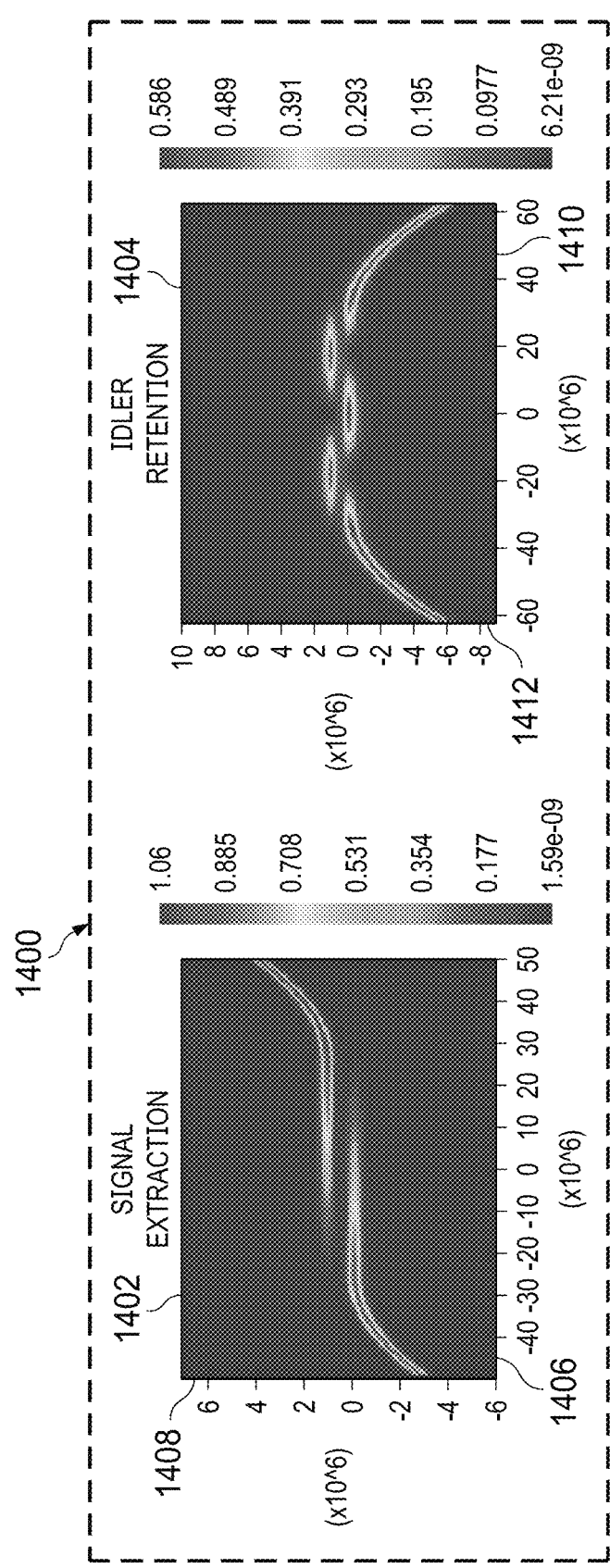
FIG. 14 is an illustration of simulation results of light coupling by a wavelength selective coupler in accordance with an illustrative embodiment.

In FIG. 14, an illustration of simulation results of light coupling by a wavelength selective coupler is depicted in accordance with an illustrative embodiment. As depicted, simulation results 1400 comprises plots for signal extraction plot 1402 and idler retention plot 1404. Simulation results 1400 are plots of the optical-field distributions for a signal light and an idler light having different wavelengths from each other.

Simulation results 1400 are generated using a wavelength selective coupler such as wavelength selective coupler 1208 in FIG. 12. This wavelength selective coupler can be as a two-waveguide coupler. In this illustrative example, simulation results 1400 are for a first light, signal light 1202, that is coupled and exits from the "cross" output of wavelength selective coupler 1208 has a larger guided-mode effective index of refraction $n_{eff}$ and is confined more strongly than the second light, idler light 1204, that exits from the "through" output of wavelength selective coupler 1208.

As depicted, signal extraction plot 1402 depicts the electric-field magnitude of the signal light 1202. Plot 1402 has x-axis 1406 that represents the longitudinal direction of the two-guide wavelength selective coupler structure and y axis 1408 that represents the transverse direction of the two-guide wavelength selective coupler structure. Signal extraction plot 1402 in simulation results 1400 shows that signal light 1202 is coupled from the lower left waveguide to the upper right waveguide.

In this illustrative example, idler retention plot 1404 depicts the electric-field magnitude of the idler light 1204. Plot 1404 has x-axis 1410 that represents the longitudinal direction of the two-guide wavelength selective coupler structure and y axis 1412 that represents the transverse direction of the two-guide wavelength selective coupler structure. As depicted, idler retention plot 1404 shows that the idler light 1204 couples from the lower waveguide to the upper waveguide in a few portions of the coupling region but eventually remains in the lower waveguide away from that coupling section.

In this example, these simulation results can be obtained using a wavelength selective coupler that comprises two curved waveguides that are coupled by a section of straight waveguide of a length and a gap for wavelength selective coupler that are selected to result in the coupling of the signal light from a first optical waveguide to a second optical waveguide when passing through the wavelength selective coupler.

Thus, if light of both signal light 1202 and idler light 1204 are supplied to wavelength selective coupler 1208 through optical waveguide 1206, signal light 1202 exits wavelength selective coupler 1208 via optical waveguide 1210 and idler light 1204 exits wavelength selective coupler 1208 via optical waveguide 1206.

For this example, an example length $d_{s|i}$ for the coupling section for wavelength selective coupler 1208 can be described by the following relation: $\kappa_{s|i}(\lambda_s) \cdot d_{s|i} = \pi$, where $\kappa_{s|i}$ is the coupling coefficient. To achieve the desired wavelength selectivity, wavelength selective coupler 1208 can also be constrained by another relation: $\kappa_{s|i}(\lambda_1) \cdot d_{s|i} = 2 \cdot \pi \cdot X$, where $\lambda_1$ is the longer wavelength and X is an integer. In the illustrative example, the value of X is 2, such that the photons of wavelength $\lambda_S$ have 100% coupling between the two waveguides being coupled, while the photons of wavelength $\lambda_1$ are coupled back again to the starting waveguide.

Figure 15:
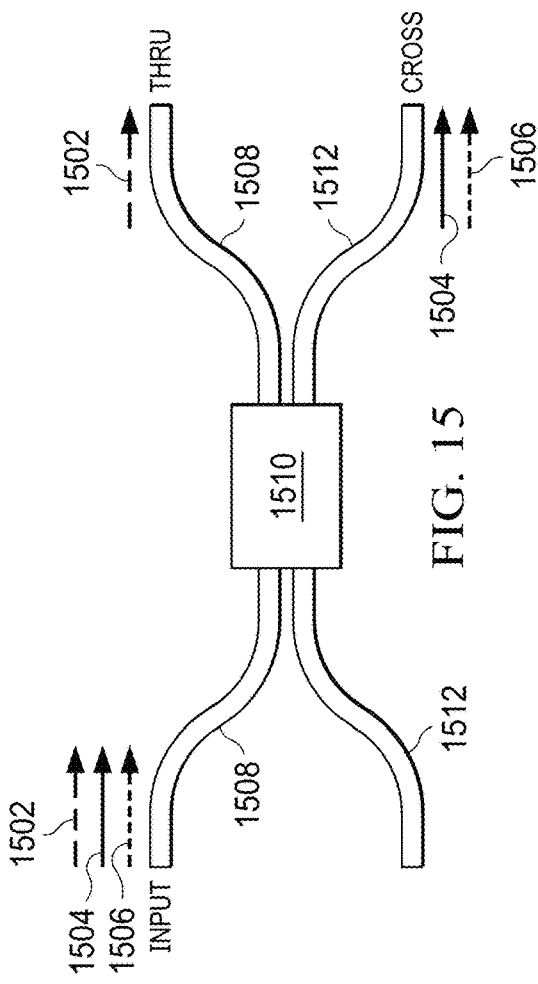
FIG. 15 is an illustration of light coupling by a wavelength selective coupler in accordance with an illustrative embodiment.

Turning to FIG. 15, an illustration of light coupling by a wavelength selective coupler is depicted in accordance with an illustrative embodiment. In this illustrative example, pump light 1502, signal light 1504, and idler light 1506 travel though optical waveguide 1508 and are input into wavelength selective coupler 1510. As depicted, at the output of wavelength selective coupler 1510, pump light 1502 continues through optical waveguide 1508. In this example, signal light 1504 and idler light 1506 cross over to optical waveguide 1512 at the output of wavelength selective coupler 1510. Wavelength selective coupler 1510 is an illustration of an implementation for of wavelength selective coupler 1130 and wavelength selective optical coupler 1132 in optical waveguide structure 1100 in FIG. 11.

Figure 16:
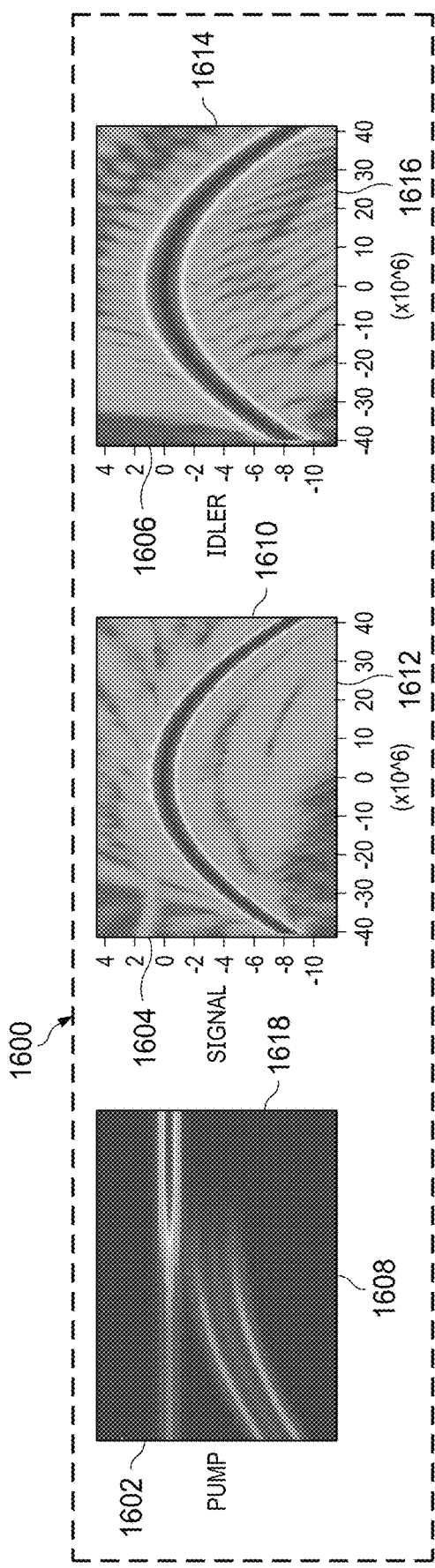
FIG. 16 is an illustration of simulation results of light coupling by a wavelength selective coupler is in accordance with an illustrative embodiment.

With reference now to FIG. 16, an illustration of simulation results of light coupling by a wavelength selective coupler is depicted in accordance with an illustrative embodiment. Simulation results 1600 comprise plots that illustrate light coupling using a wavelength selective coupler such as a two-waveguide coupler.

As depicted, simulation results 1600 are for pump light in pump plot 1602, signal light in signal plot 1604, and idler light in idler plot 1606. These simulation results are plots of the electric field magnitude distributions of light at the pump, signal and idler wavelengths. Pump plot 1602 is a plot for field magnitude distribution in linear scale. As depicted, pump plot 1602 has x-axis 1618 that represents the longitudinal direction of the two-guide wavelength selective coupler structure and y axis 1608 that represents the transverse direction of the two-guide wavelength selective coupler structure.

In this illustrative example, Signal plot 1604 and idler plot 1606 are plots for the signal and idler field magnitude distributions in a logarithmic scale. As depicted, signal plot 1604 has x-axis 1610 that represents the longitudinal direction of the two-guide wavelength selective coupler structure and y axis 1612 that represents the transverse direction of the two-guide wavelength selective coupler structure. Idler plot 1606 has x-axis 1614 that represents the longitudinal direction of the two-guide wavelength selective coupler structure and y axis 1616 that represents the transverse direction of the two-guide wavelength selective coupler structure.

In this depicted example, the optical waveguide at the lower portion of the plots for simulation results 1600 has a smaller radius of curvature than the optical waveguide at the upper portion of those plots. The light travels from left to right in these plots for simulation results 1600. Pump light enters in the upper guide from the upper left of pump plot 1602. Signal light and idler light enter in the lower, curved guide from the lower left of signal plot 1604 and idler plot 1606.

In this example, the pump light experiences primarily the "cross" state of this coupler and is coupled into the curved, lower guide and exits from the lower right of the plot. The signal and idler light experience the "through" state of this coupler and remain in the curved guide to also exit from the lower right of the plots. For this example, the pump light is carried by a higher-order transverse mode of the curved guide. Thus, the field magnitude distribution of the pump light in that curved guide has several brighter regions. The signal and idler light, however, are carried by the fundamental transverse modes at those wavelengths. Thus, the intensity distributions for the signal and idler light have just one bright region that is brighter near the center of the guide.

FIGS. 17-21 are some illustrative examples of implementations for wavelength selective couplers that can be used to couple light of selected wavelengths to travel in loops that include more than one optical waveguide. These example wavelength selective couplers can be used to couple light between a main nonlinear optical waveguide and an extension optical waveguide in an optical waveguide structure. In these illustrative examples, wavelength selective optical couplers in FIG. 17-21 are an implementation for first wavelength selective coupler 112 in FIG. 1, second wavelength selective coupler 114 in FIG. 1, wavelength selective coupler 526 in FIG. 5, wavelength selective coupler 528 in FIG. 5, signal wavelength selective coupler 720 in FIG. 7, idler wavelength selective coupler 722 in FIG. 7, signal wavelength selective coupler 908 in FIG. 9, idler wavelength selective coupler 910 in FIG. 9, wavelength selective optical coupler 1008 in FIG. 10, and wavelength selective coupler 1010 in FIG. 10.

Figure 17:
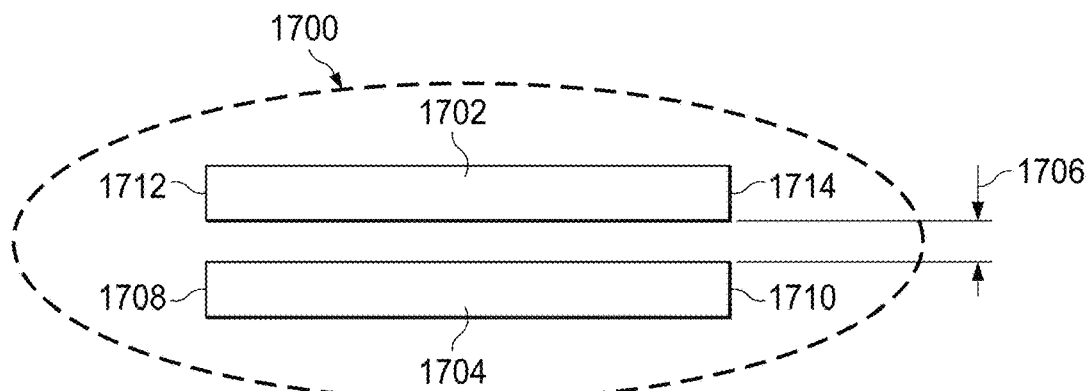
FIG. 17 is an illustration of a wavelength selective coupler in a form of a two-waveguide coupler in accordance with an illustrative embodiment.

Turning next to FIG. 17, an illustration of a wavelength selective coupler in a form of a two-waveguide coupler is depicted in accordance with an illustrative embodiment. As depicted, wavelength selective coupler 1700 is an example of a wavelength selective coupler in the form of a two-waveguide coupler that can be used to couple light between a main nonlinear optical waveguide and an extension optical waveguide in an optical waveguide structure. This two-waveguide coupler can also be referred to as a directional coupler.

In this example, wavelength selective coupler 1700 comprises optical waveguide 1702 and nonlinear optical waveguide 1704. These two waveguides are spaced apart from each other by a gap 1706. In FIG. 17, optical waveguide 1702 and nonlinear optical waveguide 1704 are denoted by their core regions, which have higher refractive index than the surrounding cladding region. Gap 1706 is the portion of the cladding region between optical waveguide 1702 and nonlinear optical waveguide 1704.

As depicted in FIG. 17, the distance of gap 1706 and the dimensions for optical waveguide 1702 and nonlinear optical waveguide 1704 can be selected to selectively couple light of a particular wavelength between the two waveguides.

In an illustrative example, a wavelength selective coupler has a coupling section that comprises two waveguide core regions that are separated by a gap. In this illustrative example, the coupling coefficient decays exponentially with the size of the gap. In other words, the coupling coefficient decays as the size of the gap increases. The coupling coefficient also depends on the effective index of the light of a particular wavelength.

In an illustrative example, the first wavelength selective coupler and the second wavelength selective coupler of nonlinear optical waveguide structure are implemented as two-guide couplers or directional couplers. The length $d_1$ of the coupling section of the first waveguide selective coupler for selectively coupling light of the second longest wavelength $\lambda_2$ can be described by the following relation:

$$\kappa_1(\lambda_2) \cdot d_1 = \pi,$$

where $\kappa_1$ is the coupling coefficient between the main nonlinear optical waveguide and the associated extension optical waveguide for wavelength $\lambda_2$. The parentheses in this expression indicates that $\kappa_1$ is a function of $\lambda_2$.

To achieve the desired wavelength selectivity, the first waveguide selective coupler also is constrained by another relation:

$$\kappa_1(\lambda_3) \cdot d_1 = 2 \cdot N \cdot \pi,$$

where $\kappa_1$ is the coupling coefficient between the main nonlinear optical waveguide and the associated extension optical waveguide; $\lambda_3$ is the longest wavelength of the three wavelengths involved in the nonlinear optical process; N is an integer; and d1 is the length of the coupling section of the first waveguide selective coupler. The value of coupling coefficient $\kappa_1$ that applies for the longest wavelength $\lambda_3$ is different from the value of $\kappa_1$ that applies for the other wavelengths $\lambda_2$ and $\lambda_1$.

In this illustrative example, when N is an integer, the photons of wavelength $\lambda_3$ are coupled back again to the starting waveguide. Furthermore, the gap of the first coupler is sufficiently large such that the shortest wavelength $\lambda_1$ is not coupled between the two waveguides, such as $\kappa_1(\lambda_1)$ which is small relative to the values for $\kappa_1(\lambda_2)$ and $\kappa_1(\lambda_3)$. In other words, this coupler is wavelength selective and can direct 100 percent of the light of wavelength $\lambda_2$ to transfer between the main nonlinear optical waveguide and the signal extension optical waveguide while directing the photons for the light having wavelength $\lambda_3$ or the light having wavelength $\lambda_1$ to not transfer between those two waveguides.

A second wavelength selective coupler in the optical waveguide structure can direct the light of the longest wavelength $\lambda_3$ of the three wavelengths involved in the nonlinear optical process. In one illustrative example, length $d_2$ of the coupling section for this second coupler is described by the following relation:

$$\kappa_2(\lambda_3) \cdot d_2 = \pi,$$

where $\kappa_2$ is the coupling coefficient between the main nonlinear optical waveguide and the second extension optical waveguide, the associated loop extension for light of wavelength $\lambda_3$. The value of the coupling coefficient $\kappa_2$ is a function of the value of the wavelength of the light.

Consider, for example, a second wavelength selective coupler with a coupling coefficient $\kappa_2$. Assume, for an illustrative example, that $n_1$, $n_2$ and $n_3$ are the effective indices for light of wavelengths $\lambda_1$, $\lambda_2$ and $\lambda_3$, respectively. Assume that the values of the effective indices are described by the relation $n_1$, $n_2 \gg n_3$. Assume, also, the coupling coefficient at the three wavelengths has values described the by relation $\kappa_2(\lambda_1)$, $\kappa_2(\lambda_2) \gg \kappa_2(\lambda_3)$. The coupling section of the second wavelength selective coupler has a length $d_2$ that is chosen to fulfill the condition: $\kappa_2(\lambda_3) \cdot d_2 = \pi$, so that the photons of the longest wavelength $\lambda_3$ have close to 100 percent coupling efficiency between the two waveguides being coupled. This choice of $d_2$ means that the condition for 100 percent coupling is not fulfilled for the other two wavelengths, $\lambda_1$ and $\lambda_2$. Very little of the light at these other two wavelengths is coupled between the two waveguides because the coupling efficiency for the other two wavelengths, with coupling coefficient values $\kappa_2(\lambda_2)$ and $\kappa_2(\lambda_1)$, are so much smaller than n radians.

The wavelength selective coupling can be performed to increase the length of a loop in which the light at the particular wavelength can travel. For example, nonlinear optical waveguide 1704 can be part of a main nonlinear optical waveguide, such as main nonlinear optical waveguide 106 in FIG. 1. Optical waveguide 1702 can be part of an extension optical waveguide, such as first extension optical waveguide 108 or second extension optical waveguide 110 in FIG. 1. In other illustrative examples, these waveguides can be considered separate components that are connected waveguides.

In another illustrative example, first end 1708 of nonlinear optical waveguide 1704 can be connected to one end of main nonlinear optical waveguide 106, and second end 1710 of nonlinear optical waveguide 1704 can be connected to a second end of main nonlinear optical waveguide 106. This connection can result in main nonlinear optical waveguide 106 having a closed path.

In this example, first end 1712 of optical waveguide 1702 can be connected to a first end of first extension optical waveguide 108 and second end 1714 of optical waveguide 1702 can be connected to a second end of second extension optical waveguide 110.

When one component is "connected" to another component, the connection is a physical association. For example, a first component can also be considered to be physically connected to a second component by being formed as part of the second component, an extension of the second component, or both. As another example, the first component can be considered to be physically connected to the second component by at least one of being secured to the second component, bonded to the second component, mounted to the second component, welded to the second component, fastened to the second component, or connected to the second component in some other suitable manner. The first component also can be connected to the second component using a third component.

Figure 18:
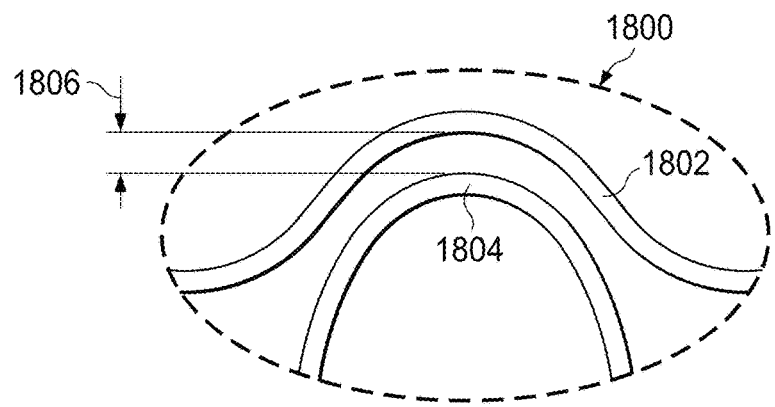
FIG. 18 is an illustration of a wavelength selective coupler in the form of a pulley coupler in accordance with an illustrative embodiment.

With reference now to FIG. 18, an illustration of a wavelength selective coupler in the form of a pulley coupler is depicted in accordance with an illustrative embodiment. As depicted, pulley coupler 1800 is another example of a wavelength selective coupler that can be used to couple light between a main nonlinear optical waveguide and an extension optical waveguide in an optical waveguide structure.

As depicted, pulley coupler 1800 comprises optical waveguide 1802 and nonlinear optical waveguide 1804. As depicted, optical waveguide 1802 can be a part of an extension optical waveguide, and nonlinear optical waveguide 1804 can be a part of a main nonlinear optical waveguide or can be separate waveguides that are connected to the extension optical waveguide and the main nonlinear optical waveguide. Optical waveguide 1802 and nonlinear optical waveguide 1804 have a curved shape such that the wavelength selective coupler functions as pulley coupler 1800.

In this illustrative example, distance 1806 and dimensions of optical waveguide 1802 and nonlinear optical waveguide 1804 can be selected to selectively couple light of a particular wavelength between an extension optical waveguide and a main nonlinear optical waveguide. This coupling can be performed to increase the length of a loop in which the light of the selected wavelength travels.

For example, pump light at 1310 nm can be coupled selectively into a first extension optical from the main nonlinear optical waveguide using pulley coupler 1800. Pulley coupler 1800 can also be configured to couple idler light at 1550 nm into a second extension optical waveguide from a main nonlinear optical waveguide. In other words, one pulley coupler can have a different radius of curvature and different value for distance 1806 from the second pulley coupler used to couple light between a main nonlinear optical waveguide into extension optical waveguides. The configuration of the pulley couplers can be such that a signal light remains in main nonlinear optical waveguide.

The two different radii of curvature of the two waveguide core regions in a pulley coupler provide an additional degree-of-freedom that can enable pulley coupler 1800 to have wavelength selectivity that is stronger than obtained with couplers that have straight sections such as wavelength selective coupler 1700 in FIG. 17.

For example, in simulations, photons in a pump light at a wavelength of 1310 nm can be coupled from a main nonlinear optical waveguide to a first extension optical waveguide with 99 percent efficiency, and idler photons in idler light at a wavelength of 1550 nm can be coupled with an efficiency lower than 1 percent. In simulations, the photons in idler light at a wavelength of 1550 nm can be coupled with more than 99 percent efficiency while the photons in pump light at wavelength of 1310 nm couple from main nonlinear optical waveguide to a second extension optical waveguide with 23 percent efficiency in this example.

Figure 19:
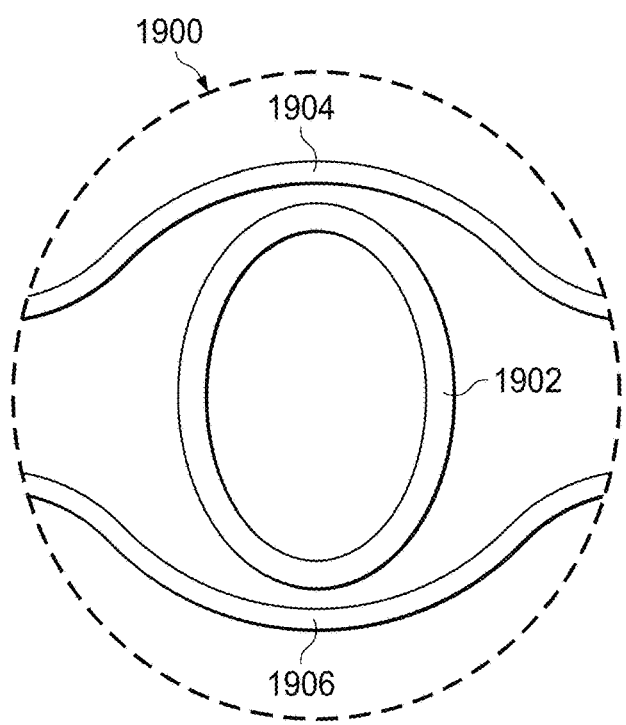
FIG. 19 is an illustration of a wavelength selective coupler in the form of a 4-port micro-ring resonator coupler in accordance with an illustrative embodiment.

In FIG. 19, an illustration of a wavelength selective coupler in the form of a 4-port micro-ring resonator coupler is depicted in accordance with an illustrative embodiment. In this illustrative example, 4-port micro-ring resonator coupler 1900 is another example of an implementation for a wavelength selective coupler that can be used to couple light between a main nonlinear optical waveguide and an extension optical waveguide in the different illustrative examples.

In this illustrative example, 4-port micro-ring resonator is comprised of two pulley couplers with an intervening ring resonator. As depicted in this example, 4-port micro-ring resonator coupler 1900 comprises micro-ring waveguide 1902, optical waveguide 1904, and optical waveguide 1906. In this illustrative example, dimensions of micro-ring waveguide 1902, optical waveguide 1904, and optical waveguide 1906 can be selected to provide a desired coupling light of particular wavelengths.

In one illustrative example, the two 4-port micro-ring resonator couplers in an optical waveguide structure such as optical waveguide structure 500 in FIG. 5 can be designed to couple light of different wavelengths. For example, the radius of a first micro-ring resonator in a first 4-port micro-ring resonator coupler implemented using 4-port micro-ring resonator coupler 1900 for coupling the pump photons in pump light is 29.8 µm, and the radius of a second micro-ring resonator in a second 4-port micro-ring resonator coupler implemented using 4-port micro-ring resonator coupler 1900 for coupling the photons in idler light is 25.0 µm. With this configuration, the first 4-port micro-ring resonator coupler can couple photons in pump light at a wavelength of 1310 nm from a main nonlinear optical waveguide 502 to a first extension optical waveguide 504 with 100 percent efficiency. The coupling of photons for the idler light, having a wavelength of 1550 nm, and the photons for the signal light, having a wavelength of 1130 nm, is lower than −20 dB, which is only 1 percent coupling efficiency. The signal and idler photons are retained in the main nonlinear optical waveguide 502.

Additionally, with this configuration, the second 4-port micro-ring resonator coupler can couple photons for the signal light with a wavelength of 1550 nm from main nonlinear optical waveguide 502 to a second extension optical waveguide 506 with a greater than 99 percent efficiency. The photons for the signal light at a wavelength of 1130 nm and the photons for the pump light at a wavelength of 1310 nm can be coupled at a level that is lower than −20 dB. This second 4-port micro-ring resonator retains the signal and pump photons in the main nonlinear optical waveguide 502.

Figure 20:
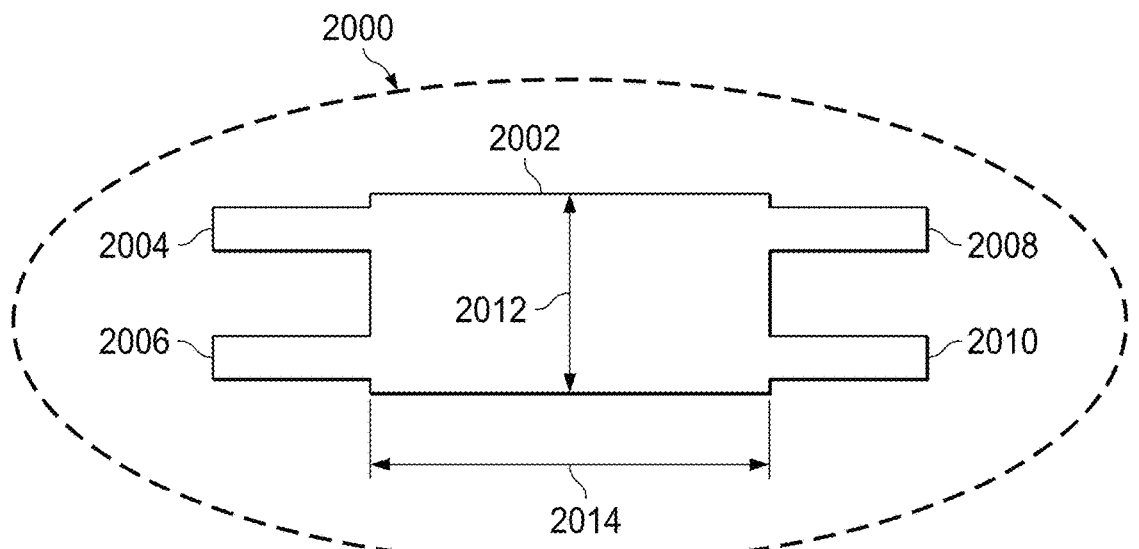
FIG. 20 is an illustration of a wavelength selective coupler in the form of a multimode interference coupler in accordance with an illustrative embodiment.

With reference next to FIG. 20, an illustration of a wavelength selective coupler in the form of a multimode interference coupler is depicted in accordance with an illustrative embodiment. As depicted, multimode interference (MMI) coupler 2000 is an example of an implementation for a wavelength selective coupler that can be used to couple light between a main nonlinear optical waveguide and an extension optical waveguide in the different illustrative examples.

As depicted, multimode interference coupler 2000 has region 2002. Multimode interference coupler 2000 also has first input 2004, second input 2006, first output 2008, and second output 2010.

In this illustrative example, first input 2004 can be connected to a first end of an extension optical waveguide. First output 2008 can be connected to a second end of the extension optical waveguide. Second input 2006 can be connected to a first end of a main nonlinear extension optical waveguide, and second output 2010 can be connected to a second end of the main nonlinear optical waveguide.

The dimensions of multimode interference coupler 2000 can be selected to provide a desired selectivity of light of different wavelengths that are coupled between an extension optical waveguide and a main nonlinear optical waveguide. For example, width 2012 and length 2014 can be selected to enable selectively coupling light of a particular wavelength between a main nonlinear optical waveguide and an extension optical waveguide.

Figure 21:
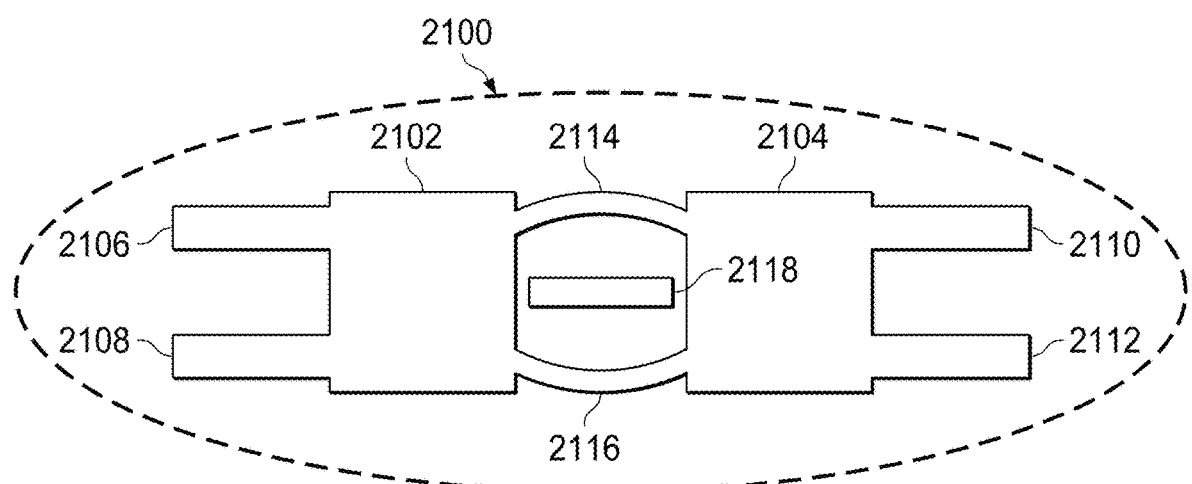
FIG. 21 is an illustration of a wavelength selective coupler in the form of a Mach Zehnder interferometer comprising two multimode interference couplers connected to each other through two optical waveguide segments in accordance with an illustrative embodiment.

Turning to FIG. 21, an illustration of a wavelength selective coupler in the form of a Mach Zehnder interferometer comprising two multimode interference couplers connected to each other through two optical waveguide segments is depicted in accordance with an illustrative embodiment. One or both of the optical waveguide segments can be implemented as a phase shifter. In this illustrative example, Mach Zehnder interferometer 2100 is an example of an implementation a wavelength selective optical coupler that can be used to couple light between a main nonlinear optical waveguide and an extension optical waveguide in the different illustrative examples.

In this particular example, Mach Zehnder interferometer 2100 comprises first region 2102 and a second region 2104. First input 2106 and second input 2108 are inputs to first region 2102. First output 2110 and second output 2112 are outputs from second region 2104. Mach Zehnder interferometer 2100 includes first optical waveguide 2114 and second optical waveguide 2116. These optical waveguides connect first region 2102 and second region 2104 in Mach Zehnder interferometer 2100 to each other. In this illustrative example, Mach Zehnder interferometer 2100 also includes phase shifter 2118. In this illustrative example, a phase shifter 2118 is a voltage-controlled optical phase shifter which has one or more tuning electrodes. Phase shifter 2118 can shift the phases of light. This phase shifting can be used to change the phase walk-off for different wavelengths of light passing through multimode interference coupler 2000.

In this illustrative example, first input 2106 can be connected to a first end of an extension optical waveguide. First output 2110 can be connected to a second end of the extension optical waveguide. Second input 2108 can be connected to a first end of a main nonlinear extension optical waveguide, and second output 2112 can be connected to a second end of the main nonlinear optical waveguide.

Figure 22:
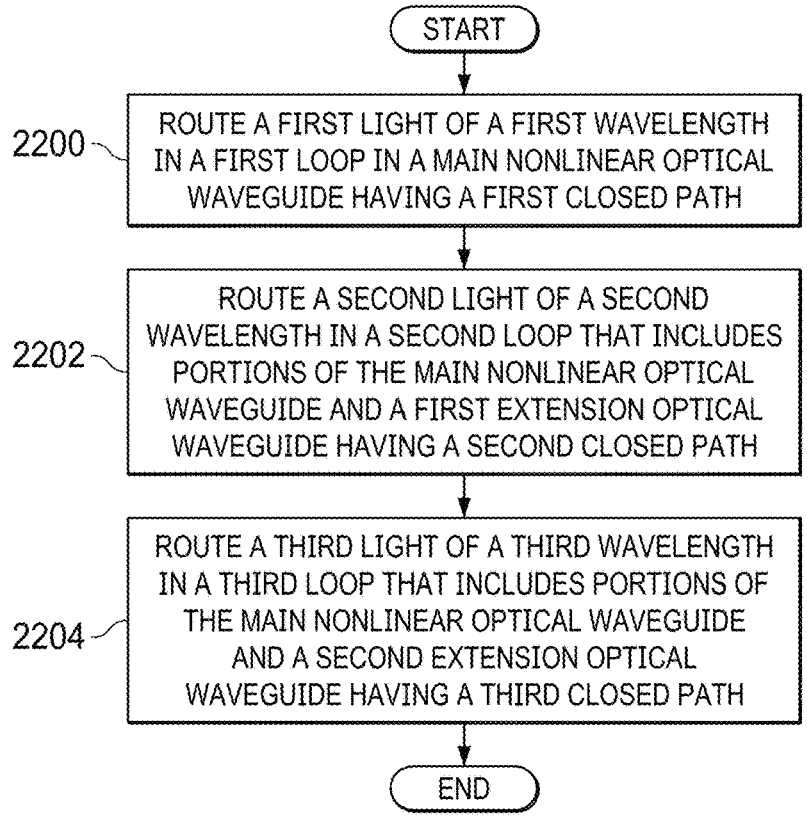
FIG. 22 is an illustration of a flowchart of a process for a nonlinear process in accordance with an illustrative embodiment.

Turning next to FIG. 22, an illustration of a flowchart of a process for a nonlinear process is depicted in accordance with an illustrative embodiment. The process in FIG. 22 can be implemented in physical components such as optical waveguide structure 100 in FIG. 1.

The process begins by routing a first light of a first wavelength in a first loop in a main nonlinear optical waveguide having a first closed path (operation 2200). In operation 2200, the first loop can have a first length that is resonant for the first light of the first wavelength.

The process routes a second light of a second wavelength in a second loop that includes portions of the main nonlinear optical waveguide and a first extension optical waveguide having a second closed path (operation 2202). In operation 2202, the second loop can have a second length that is resonant for the second light of the second wavelength.

The process routes a third light of a third wavelength in a third loop that includes portions of the main nonlinear optical waveguide and a second extension optical waveguide having a third closed path (operation 2204). The process terminates thereafter. In operation 2204, the third loop can have a third length that is resonant for the third light of the third wavelength. Furthermore, the first loop can have a first length, the second loop can have a second length, and the third loop can have a third length for which round trip phase matching is present for a nonlinear optical process that occurs in the main nonlinear optical waveguide. In this illustrative example, round trip phase matching applies jointly to all three wavelengths and all three loops in the optical waveguide structure.

Figure 23:
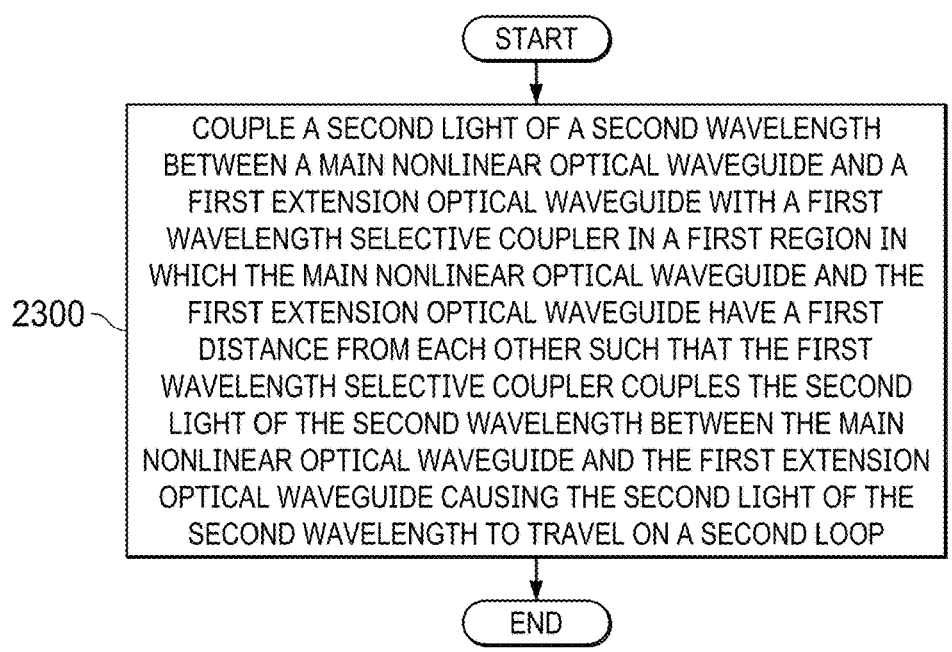
FIG. 23 is an illustration of a flowchart of a process for coupling the second light in accordance with an illustrative embodiment.

Turning next to FIG. 23, an illustration of a flowchart of a process for coupling a second light is depicted in accordance with an illustrative embodiment. The operation illustrated in this figure is an additional operation that can performed with the operations in FIG. 22.

The process begins by coupling a second light of a second wavelength between a main nonlinear optical waveguide and a first extension optical waveguide with a first wavelength selective coupler in a first region in which the main nonlinear optical waveguide and the first extension optical waveguide have a first distance from each other such that the first wavelength selective coupler couples the second light of the second wavelength between the main nonlinear optical waveguide and the first extension optical waveguide causing the second light of the second wavelength to travel in a second loop (operation 2300). The process terminates thereafter.

Figure 24:
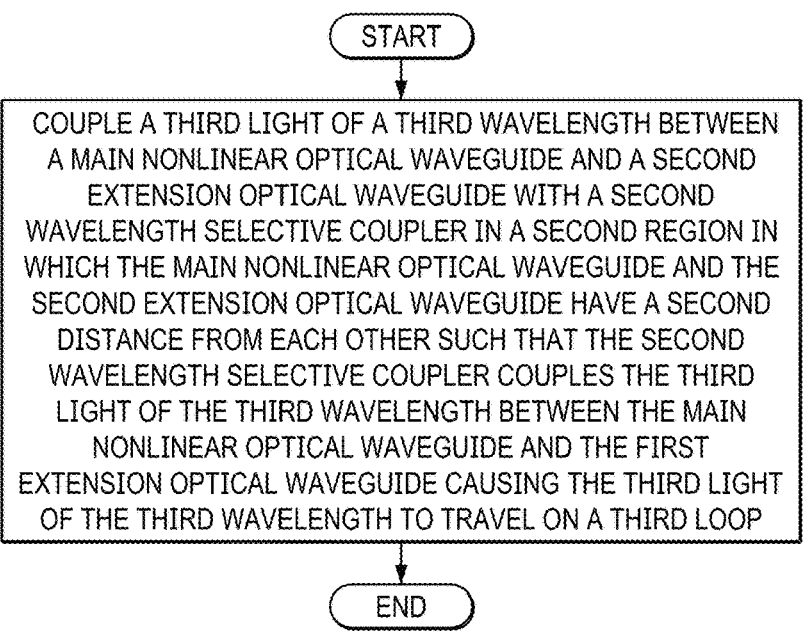
FIG. 24 is an illustration of a flowchart of a process for coupling the second light in accordance with an illustrative embodiment.

With reference now to FIG. 24, an illustration of a flowchart of a process for coupling a second light is depicted in accordance with an illustrative embodiment. The operation illustrated in this figure is an additional operation that can performed with the operations in FIG. 22.

The process begins by coupling a third light of a third wavelength between a main nonlinear optical waveguide and a second extension optical waveguide with a second wavelength selective coupler in a second region in which the main nonlinear optical waveguide and the second extension optical waveguide have a second distance from each other such that the second wavelength selective coupler couples the third light of the third wavelength between the main nonlinear optical waveguide and the first extension optical waveguide causing the third light of the third wavelength to travel in a third loop (operation 2400). The process terminates thereafter.

Figure 25:
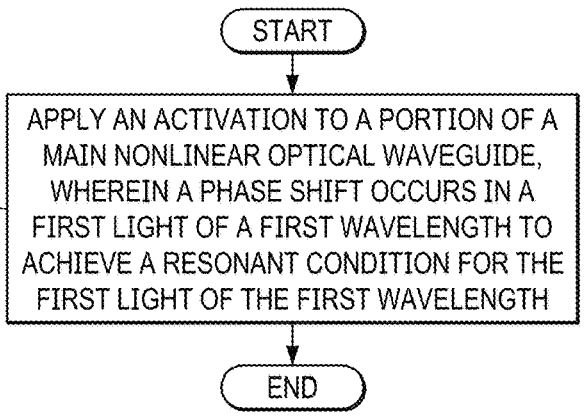
FIG. 25 is an illustration of a flowchart of a process for applying activations to adjust a phase shift in a first light in accordance with an illustrative embodiment.

In FIG. 25, an illustration of a flowchart of a process for applying activations to adjust a phase shift in a first light is depicted in accordance with an illustrative embodiment. The operation illustrated in this figure is an additional operation that can be performed with the operations in FIG. 22.

The process begins by applying an activation to a portion of a main nonlinear optical waveguide, wherein a phase shifts occurs in a first light of a first wavelength to achieve a resonant condition for the first light of the first wavelength (operation 2500). The process terminates thereafter.

Figure 26:
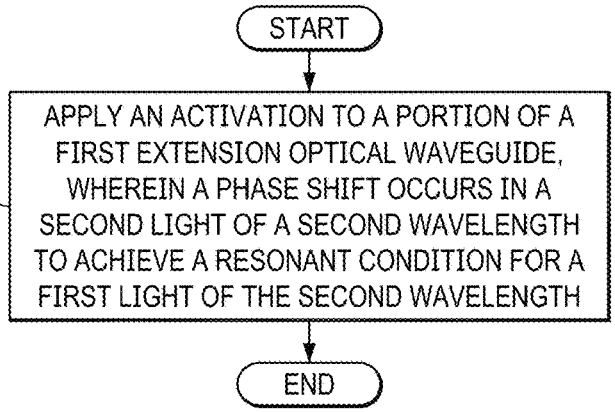
FIG. 26 is an illustration of a flowchart of a process for applying an activation to adjust a phase shift in a second light in accordance with an illustrative embodiment.

Turning now to FIG. 26, an illustration of a flowchart of a process for applying an activation to adjust a phase shift in a second light is depicted in accordance with an illustrative embodiment. The operation illustrated in this figure is an additional operation that can performed with the operations in FIG. 22.

The process begins by applying an activation to a portion of a first extension optical waveguide, wherein a phase shifts occurs in a second light of a second wavelength to achieve a resonant condition for a first light of the second wavelength (operation 2600). The process terminates thereafter.

Figure 27:
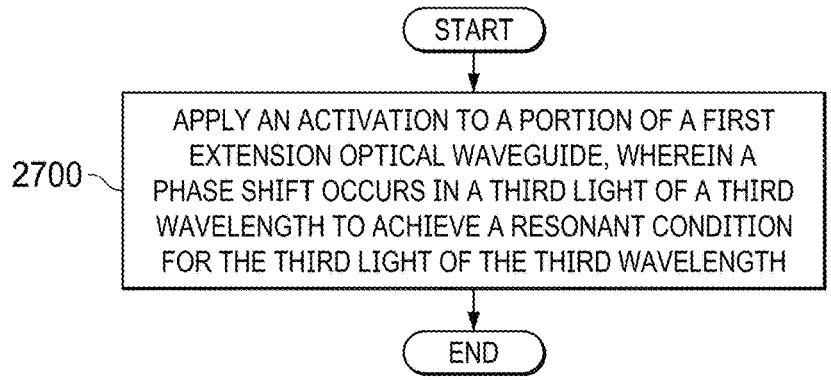
FIG. 27 is an illustration of a flowchart of a process for applying an activation to adjust a phase shift in a third light in accordance with an illustrative embodiment.

Turning next to FIG. 27, an illustration of a flowchart of a process for applying an activation to adjust a phase shift in a third light is depicted in accordance with an illustrative embodiment. The operation illustrated in this figure is an additional operation that can performed with the operations in FIG. 22.

The process begins by applying an activation to a portion of a first extension optical waveguide, wherein a phase shifts occurs in a third light of a third wavelength to achieve a resonant condition for the third light of the third wavelength (operation 2700). The process terminates thereafter.

Figure 28:
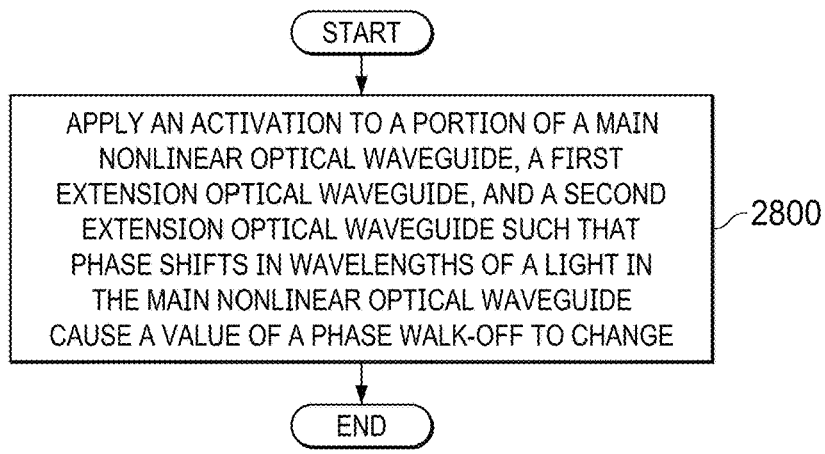
FIG. 28 is an illustration of a flowchart of a process for applying an activation to adjust a phase shift in light in accordance with an illustrative embodiment.

With reference now to FIG. 28, an illustration of a flowchart of a process for applying an activation to adjust a phase shift in light is depicted in accordance with an illustrative embodiment. The operation illustrated in this figure is an additional operation that can performed with the operations in FIG. 22.

The process begins by applying an activation to a portion of a main nonlinear optical waveguide, a first extension optical waveguide, and a second extension optical waveguide such that phase shifts in wavelengths of a light in the main nonlinear optical waveguide cause a value of a phase walk-off to change (operation 2800). The process terminates thereafter. In operation 2800, the activation causes the phase walk-off to change to being as close to zero degrees as possible.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 29:
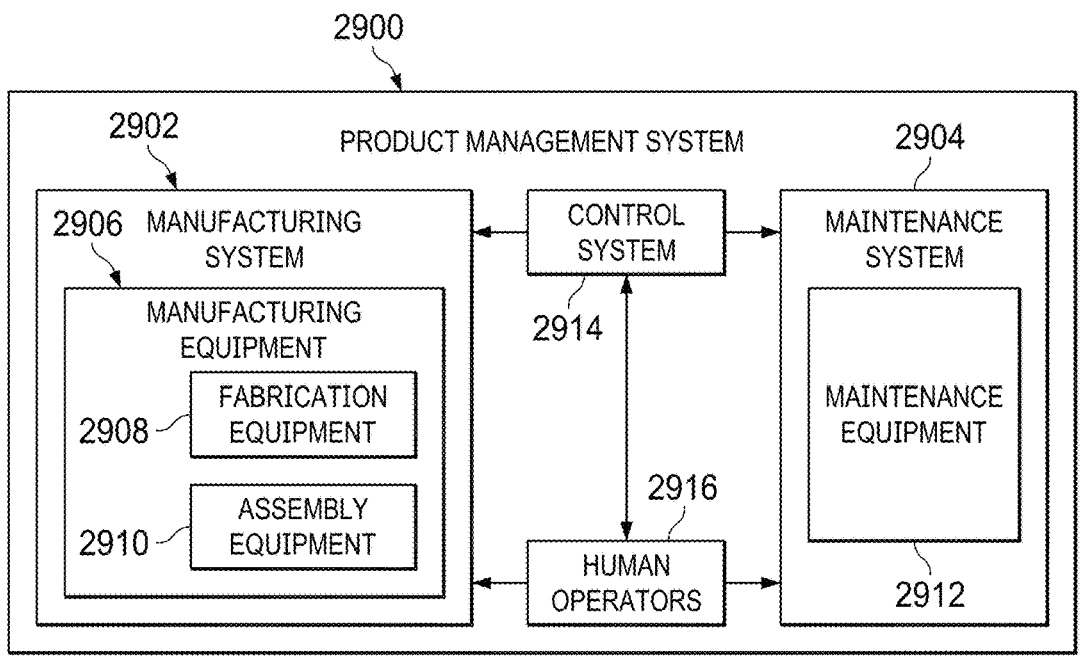
FIG. 29 is an illustration of a block diagram of a product management system in accordance with an illustrative embodiment.

Turning now to FIG. 29, an illustration of a block diagram of a product management system is depicted in accordance with an illustrative embodiment. Product management system 2900 is a physical hardware system. In this illustrative example, product management system 2900 includes at least one of manufacturing system 2902 or maintenance system 2904.

Manufacturing system 2902 is configured to manufacture products. As depicted, manufacturing system 2902 includes manufacturing equipment 2906.

Manufacturing equipment 2906 includes at least one of fabrication equipment 2908 or assembly equipment 2910.

Fabrication equipment 2908 is equipment that used to fabricate the nonlinear optical waveguide structure. Multiple copies or multiple versions of nonlinear optical waveguide structures can be fabricated on a substrate wafer.

The substrate wafer can comprise a material such as silicon or lithium niobate or quartz or sapphire or silicon carbide. Fabrication equipment 2908 can be used to fabricate at least one of optical waveguide structures, nonlinear optical waveguides, laser transmitters, ultraviolet transmission systems, point-to-point communication devices, laser infrared countermeasure sources, through water optical communication devices, or other suitable devices, antennas, or other suitable types of parts. For example, fabrication equipment 2908 can include machines and tools.

With respect to fabricating semiconductor components and optical waveguide components, fabrication equipment 2908 can comprise at least one of an epitaxial reactor, an oxidation system, a diffusion system, an etching system, a cleaning system, a bonding machine, a dicing machine, a wafer saw, an ion implantation system, a physical vapor deposition system, a chemical vapor deposition system, a photolithography system, an electron-beam lithography system, a plasma etcher, a die attachment machine, a wire bonder, a die overcoat system, molding equipment, a hermetic sealer, an electrical tester, a burn-in oven, a retention bake oven, a UV erase system, or other suitable types of equipment that can be used to manufacture semiconductor structures.

Assembly equipment 2910 is equipment used to assemble parts to form a product such as a chip, an integrated circuit, a computer, an aircraft, or some other product. Assembly equipment 2910 also can include machines and tools. These machines and tools may be at least one of a robotic arm, a spinner system, a sprayer system, and elevator system, a rail-based system, or a robot.

In this illustrative example, maintenance system 2904 includes maintenance equipment 2912. Maintenance equipment 2912 can include any equipment needed to perform maintenance on and evaluation of a product. Maintenance equipment 2912 may include tools for performing different operations on parts on a product. These operations can include at least one of disassembling parts, refurbishing parts, inspecting parts, reworking parts, manufacturing replacement parts, or other operations for performing maintenance on the product. These operations can be for routine maintenance, inspections, upgrades, refurbishment, or other types of maintenance operations.

In the illustrative example, maintenance equipment 2912 may include optical inspection devices, x-ray imaging systems, surface-profile measurement systems, drills, vacuum leak checkers, and other suitable devices. In some cases, maintenance equipment 2912 can include fabrication equipment 2908, assembly equipment 2910, or both to produce and assemble parts that needed for maintenance.

Product management system 2900 also includes control system 2914. Control system 2914 is a hardware system and may also include software or other types of components. Control system 2914 is configured to control the operation of at least one of manufacturing system 2902 or maintenance system 2904. In particular, control system 2914 can control the operation of at least one of fabrication equipment 2908, assembly equipment 2910, or maintenance equipment 2912.

The hardware in control system 2914 can be implemented using hardware that may include computers, circuits, networks, and other types of equipment. The control may take the form of direct control of manufacturing equipment 2906. For example, robots, computer-controlled machines, and other equipment can be controlled by control system 2914. In other illustrative examples, control system 2914 can manage operations performed by human operators 2916 in manufacturing or performing maintenance on a product. For example, control system 2914 can assign tasks, provide instructions, display models, or perform other operations to manage operations performed by human operators 2916. In these illustrative examples, the different processes for fabricating semiconductor structures, optical structures, nonlinear optical waveguides, laser transmitters, photon generators, photon transmitters, photon detectors, ultraviolet transmission systems, point-to-point communication devices, laser infrared countermeasure sources, through water optical communication devices, or other suitable devices can be manufactured using processes implemented in control system 2914.

In the different illustrative examples, human operators 2916 can operate or interact with at least one of manufacturing equipment 2906, maintenance equipment 2912, or control system 2914.

This interaction can occur to manufacture semiconductor structures and other components for products such as semiconductor devices or components for use in products such as aircraft, spacecraft, communications systems, computation systems, and sensor systems.

Further, control system 2914 can be used to adjust manufacturing of nonlinear optical waveguides, optical waveguides, optical couplers, terminations, and other components dynamically during the manufacturing process. For example, many points in the process of fabricating the optical waveguide structure including the nonlinear optical waveguide as well as other components are present at which adjustments can be made to control characteristics of components in an optical waveguide structure. These points are points during the application process in which changes can be made to adjust the performance or characteristics of the different structures being fabricated.

Some features of the illustrative examples are described in the following clauses. These clauses are examples of features not intended to limit other illustrative examples.

Clause 1

An optical waveguide structure comprising:
 a main nonlinear optical waveguide, wherein a first light of a first wavelength travels in a first loop that extends through the main nonlinear optical waveguide;
 a first extension optical waveguide;
 a second extension optical waveguide;
 a first wavelength selective coupler that couples the main nonlinear optical waveguide and the first extension optical waveguide to each other such that a second light of a second wavelength is coupled between the main nonlinear optical waveguide and the first extension optical waveguide, wherein the second light of the second wavelength travels in a second loop that extends through the main nonlinear optical waveguide and the first extension optical waveguide in which the second loop has a second length for the second light of the second wavelength; and a second wavelength selective coupler that couples the main nonlinear optical waveguide and the second extension optical waveguide to each other such a third light of a third wavelength is coupled between the main nonlinear optical waveguide and the second extension optical waveguide, wherein the third light of the third wavelength travels in a third loop that extends through the main nonlinear optical waveguide and the second extension optical waveguide in which the third loop has a third length for the third light of the third wavelength.

Clause 2:

The optical waveguide structure according to clause 1, wherein a first length of the first loop is selected such that at least one of a resonance matching is present for the first light of the first wavelength or round-trip phase matching is present for the first light of the first wavelength.

Clause 3:

The optical waveguide structure according to one of clauses 1 or 2, wherein the second length of the second loop is selected such that at least one of a resonance matching is present for the second light of the second wavelength or round-trip phase matching is present for the second light of the second wavelength.

Clause 4:

The optical waveguide structure according to one of clauses 1, 2, or 3, wherein third length of the third loop is selected such that at least one of a resonance matching is present for the third light of the third wavelength or round-trip phase matching is present for the third light of the third second wavelength.

Clause 5:

The optical waveguide structure according to one of clauses 1, 2, 3, or 4 further comprising:

a set of phase shifters located adjacent to a set of optical waveguides comprising at least one of the main nonlinear optical waveguide, the first extension optical waveguide, or the second extension optical waveguide in the set of optical waveguides, wherein a set of tuning electrodes applies a set of activations such that the set of activations changes a phase of at least one of the first light of the first wavelength, the second light of the second wavelength, or the third light of the third wavelength traveling in the set of optical waveguides to which the set of activations is applied.

Clause 6:

The optical waveguide structure according to one of clauses 1, 2, 3, 4, or 5, wherein the set of phase shifters comprises at least one of a first tuning electrode located adjacent to a first portion of the main nonlinear optical waveguide; a second tuning electrode located adjacent to a second portion of the first extension optical waveguide; or a third tuning electrode located adjacent to a third portion of the second extension optical waveguide, wherein at least one of the first tuning electrode, the second tuning electrode, or the third tuning electrode apply the set of activations to adjust phases of at least one of the first light of the first wavelength, the second light of the second wavelength, or the third light of the third wavelength traveling in a set of loops through the set of optical waveguides.

Clause 7:

The optical waveguide structure according to one of clauses 1, 2, 3, 4, 5, or 6, wherein the set of activations is selected from at least one of a voltage, a thermal energy, or a strain.

Clause 8:

The optical waveguide structure according to one of clauses 1, 2, 3, 4, 5, 6, or 7 further comprising:

an output optical waveguide that couples light out of one of the main nonlinear optical waveguide, the first extension optical waveguide, and the second extension optical waveguide.

Clause 9

The optical waveguide structure according to clause 8 further comprising:

an output optical coupler for the output optical waveguide, wherein the output optical coupler has a configuration that results in a desired Q factor for the second loop and the second wavelength selective coupler has the configuration that results in the desired Q factor for the third loop.

Clause 10:

The optical waveguide structure according to one of clauses 1, 2, 3, 4, 5, 6, 7, 8, or 9 further comprising:

an input optical waveguide that couples input light into one of the main nonlinear optical waveguide, the first extension optical waveguide, and the second extension optical waveguide.

Clause 11:

The optical waveguide structure according to one of clauses 1, 2, 3, 4, 5, 6, 7, 8, 9, or 10, wherein the first loop, the second loop, and the third loop are loops that have lengths selected to cause roundtrip phase matching in which a generation of photons for at least one of the first light, the second light, or the third light continues along a set of loops selected from at least one of the first loop, the second loop, or the third loop as travel time increases for the first light, the second light, and the third light in the set of loops.

Clause 12:

The optical waveguide structure according to one of clauses 1, 2, 3, 4, 5, 6, 7, 8, 9, 10, or 11, wherein the first loop, the second loop, and the third loop have different lengths from each other.

Clause 13:

The optical waveguide structure according to clause 12, wherein a spontaneous four wave mixing occurs in the main nonlinear optical waveguide in which a pair of output photons is generated from a pair of input photons, wherein the pair of output photons have different wavelengths from each other and have the different wavelengths from the pair of input photons.

Clause 14:

The optical waveguide structure according to clause, wherein a spontaneous parametric down conversion occurs in the main nonlinear optical waveguide in which the pair of output photons is generated from an input photon, wherein the pair of output photons have the different wavelengths from each other and have the different wavelengths from the input photon.

Clause 15:

The optical waveguide structure according to one of clauses 1, 2, 3, 4, 5, 6, 7, 8, 9, 10, 11, 12, 13, or 14, wherein the first wavelength selective coupler is in a first location where a first portion of the main nonlinear optical waveguide and a second portion of the first extension optical waveguide are located and wherein the second wavelength selective coupler is in a second location where a third portion of the main nonlinear optical waveguide and a fourth portion of the second extension optical waveguide are located.

Clause 16:

The optical waveguide structure according to one of clauses 1, 2, 3, 4, 5, 6, 7, 8, 9, 10, 11, 12, 13, 14, or 15, wherein the main nonlinear optical waveguide has a cross-section with a dimension selected to achieve a resonance condition for the first light of the first wavelength traveling in the main nonlinear optical waveguide; wherein the first extension optical waveguide has a first cross-section with a first dimension selected to achieve the resonance condition for the second light of the second wavelength traveling in the first extension optical waveguide; and wherein the second extension optical waveguide has a second cross-section with a second dimension selected to achieve the resonance condition for the third light of the third wavelength traveling in the second extension optical waveguide.

Clause 17:

The optical waveguide structure according to one of clauses 1, 2, 3, 4, 5, 6, 7, 8, 9, 10, 11, 12, 13, 14, 15, or 16, wherein the first wavelength selective coupler and the second wavelength selective coupler are selected from at least one of a two-waveguide coupler, a multi-mode interference coupler, a pulley coupler, a Mach-Zehnder interferometer, or a 4-port micro-optical waveguide resonator coupler.

Clause 18:

An optical waveguide structure comprising:
a main nonlinear optical waveguide, wherein a first light of a first wavelength travels in a first loop that extends through the main nonlinear optical waveguide in which the first loop has a first length for the first light of the first wavelength;
an extension nonlinear optical waveguide; and
a wavelength selective coupler that couples a second light of a second wavelength between the main nonlinear optical waveguide and the extension nonlinear optical waveguide, wherein the second light of the second wavelength travels in a second loop that extends through the main nonlinear optical waveguide and the extension nonlinear optical waveguide in which the second loop has a second length for the second light of the second wavelength.

Clause 19:

The optical waveguide structure according to clause 18, wherein the first length of the first loop is selected such that at least one of a resonance matching is present for the first light of the first wavelength or round-trip phase matching is present for the first light of the first wavelength.

Clause 20:

The optical waveguide structure according to one of clauses 18 or 19, wherein the second length of the second loop is selected such that at least one of a resonance matching is present for the second light of the second wavelength or round-trip phase matching is present for the second light of the second wavelength.

Clause 21:

The optical waveguide structure according to one of clauses 18, 19, or 20, wherein the extension nonlinear optical waveguide is a first extension optical waveguide and wherein the wavelength selective coupler is a first wavelength selective coupler and further comprising:
a second extension optical waveguide;
and
a second wavelength selective coupler that couples a third light of a third wavelength between the main nonlinear optical waveguide and the second extension optical waveguide, wherein the third light of the third wavelength travels in a third loop that extends through the main nonlinear optical waveguide and the second extension optical waveguide in which the third loop has a third length for the third light of the third wavelength.

Clause 22:

The optical waveguide structure according to clause 21, wherein the third length of the third loop is selected such that at least one of a resonance matching is present for the third light of the third wavelength or round-trip phase matching is present for the third light of the third wavelength.

Clause 23:

The optical waveguide structure according to one of clauses 21 or 22, wherein the first loop, the second loop, and the third loop are loops that have lengths selected to cause roundtrip phase matching in which a generation of photons for at least one of the first light, the second light, or the third light continues in a set of loops selected from at least one of the first loop, the second loop, or the third loop as travel time increases for the first light, the second light, and the third light along the set of loops.

Clause 24:

The optical waveguide structure according to one of clauses 18, 19, 20, 21, 22, or 23 further comprising:
a tuning electrode located adjacent to a portion of the main nonlinear optical waveguide, wherein the tuning electrode applies a voltage such that a phase shifts in the first light of the first wavelength to achieve a resonant condition for the first light of the first wavelength of.

Clause 25:

The optical waveguide structure according to according to one of clauses 21, 22, 23, or 24 comprising:
a tuning electrode located adjacent to a portion of the first extension optical waveguide, wherein the tuning electrode applies a voltage such that a phase shifts in the second light of the second wavelength to achieve a resonant condition for the second light of the second wavelength.

Clause 26:

The optical waveguide structure according to according to one of clauses 21, 22, 23, 24, or 25 further comprising:
a tuning electrode located adjacent to a portion of the second extension optical waveguide, wherein the tuning electrode applies a voltage such that a phase shifts in the third light of the third wavelength to achieve a resonant condition for the third light of the third wavelength.

Clause 27:

The optical waveguide structure according to according to one of clauses 21, 22, 23, 24, 25, or 26 further comprising at least one of a first tuning electrode located adjacent to a first portion of the main nonlinear optical waveguide; a second tuning electrode located adjacent to a second portion of the first extension optical waveguide; or a third tuning electrode located adjacent to a third portion of the second extension optical waveguide, wherein at least one of the first tuning electrode, the second tuning electrode, or the third tuning electrode apply a set of activations to adjust a set of phase shifts in to achieve a phase matching condition.

Clause 28:

The optical waveguide structure according to according to one of clauses 21, 22, 23, 24, 25, 26, or 27 further comprising:
an output optical waveguide that couples light out of one of the main nonlinear optical waveguide, the first extension optical waveguide, and the second extension optical waveguide.

Clause 29:

The optical waveguide structure according to according to one of clauses 18, 19, 20, 21, 22, 23, 24, 25, 26, 27, or 28 further comprising:
an input optical waveguide that couples input light into one of the main nonlinear optical waveguide.

Clause 30:

The optical waveguide structure according to according to one of clauses 21, 22, 23, 24, 25, 26, 27, 28, or 29, wherein the first loop, the second loop, and the third loop have different lengths from each other.

Clause 31:

A method for a non-linear optical process comprising:
routing a first light of a first wavelength in a first loop in a main nonlinear optical waveguide, wherein the first loop has a first length for the first light of the first wavelength;
routing a second light of a second wavelength in a second loop that includes portions of the main nonlinear optical waveguide and a first extension optical waveguide, wherein the second loop has a second length for the second light of the second wavelength; and
routing a third light of a third wavelength in a third loop that includes the portions of the main nonlinear optical waveguide and a second extension optical waveguide, wherein the third loop has a third length for the third light of the third wavelength.

Clause 32:

The method according to clause 31 further comprising:
coupling the second light of the second wavelength between the main nonlinear optical waveguide and the first extension optical waveguide with a first wavelength selective coupler that couples the second light of the second wavelength of between the main nonlinear optical waveguide and the first extension optical waveguide causing the second light of the second wavelength of to travel in the second loop.

Clause 33:

The method according one of clauses 31 or 32, wherein the first length of the first loop is selected such that at least one of a resonance matching is present for the first light of the first wavelength or round-trip phase matching is present for the first light of the first wavelength.

Clause 34:

The method according to one of clauses 31, 32, or 33, wherein the second length of the second loop is selected such that at least one of a resonance matching is present for the second light of the second wavelength or round-trip phase matching is present for the second light of the second wavelength.

Clause 35:

The method according to one of clauses 31, 32, 33, or 34 further comprising:
coupling the third light of the third wavelength between the main nonlinear optical waveguide and the second extension optical waveguide with a second wavelength selective coupler that couples the third light of the third wavelength between the main nonlinear optical waveguide and the second extension optical waveguide causing the third light of the third wavelength to travel in the third loop.

Clause 36:

The method according to clause 35, wherein third length of the third loop is selected such that at least one of a resonance matching is present for the third light of the third wavelength or round-trip phase matching is present for the third light of the third wavelength.

Clause 37:

The method according to one of clauses 31, 32, 33, 34, 35, or 36 further comprising:
applying an activation to a portion of the main nonlinear optical waveguide, wherein a phase shifts occurs in the first light of the first wavelength to achieve a resonant condition for the first light of the first wavelength.

Clause 38:

The method according to one of clauses 31, 32, 33, 34, 35, 36, or 37 further comprising:
applying an activation to a portion of the first extension optical waveguide, wherein a phase shifts occurs in the second light of the second wavelength to achieve a resonant condition for the second light of the second wavelength.

Clause 39:

The method according to one of clauses 31, 32, 33, 34, 35, 36, 37, or 38 further comprising:
applying an activation to a portion of the second extension optical waveguide, wherein a phase shifts occurs in the third light of the third wavelength to achieve a resonant condition for the third light of the third wavelength.

Clause 40:

The method according to one of clauses 31, 32, 33, 34, 35, 36, 37, 38, or 39 further comprising:
applying an activation to a portion of the main nonlinear optical waveguide, the first extension optical waveguide, and the second extension optical waveguide such that phase shifts in wavelengths of a light in the main nonlinear optical waveguide causing a value of a phase walk-off to change.

Thus, the illustrative examples provide a method and structure for nonlinear optical processes. In one illustrative example, an optical waveguide structure can have a main nonlinear optical waveguide, a first extension optical waveguide, a second extension optical waveguide, a first wavelength selective coupler, and a second wavelength selective coupler. A first light of a first wavelength travels in a first loop that extends through the main nonlinear optical waveguide and the wavelength selective coupler, in which the first loop has a first length for the first light of the first wavelength. The wavelength selective coupler couples a second light of a second wavelength between the main nonlinear optical waveguide and the extension nonlinear optical waveguide. The second light of the second wavelength travels in a second loop that extends through the main nonlinear optical waveguide, the wavelength selective coupler and the extension nonlinear optical waveguide, in which the second loop has a second length for the second light of the second wavelength.

The second wavelength selective coupler couples the main nonlinear optical waveguide and the second extension optical waveguide to each other such that the third light of the third wavelength is coupled between the main nonlinear optical waveguide and the second extension optical waveguide. The third light of the third wavelength travels in a third loop within the main nonlinear optical waveguide and the second extension optical waveguide in which the third loop.

Thus, the optical waveguide structures described in the different illustrative examples can be used for various purposes. For example, the optical waveguide structures can be used as components for quantum communications. For example, these waveguide structures can operate as entangled photon sources for use in components in devices such as quantum repeater systems. These quantum repeater systems can be used to teleport quantum states across different network nodes. As another example, the optical waveguide structures in the illustrative examples can be used in systems such as quantum emitters, bell-state entanglement measurement devices, single-photon detectors, or other suitable systems that may employ a quantum repeater or other device capable of operating as a source of photons.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An optical waveguide structure comprising:
   a main nonlinear optical waveguide, wherein a first light of a first wavelength travels in a first loop that extends through the main nonlinear optical waveguide;
   a first extension optical waveguide;
   a second extension optical waveguide;
   a first wavelength selective coupler that couples the main nonlinear optical waveguide and the first extension optical waveguide to each other such that a second light of a second wavelength is coupled between the main nonlinear optical waveguide and the first extension optical waveguide, wherein the second light of the second wavelength travels in a second loop that extends through the main nonlinear optical waveguide and the first extension optical waveguide in which the second loop has a second length for the second light of the second wavelength; and
   a second wavelength selective coupler that couples the main nonlinear optical waveguide and the second extension optical waveguide to each other such a third light of a third wavelength is coupled between the main nonlinear optical waveguide and the second extension optical waveguide, wherein the third light of the third wavelength travels in a third loop that extends through the main nonlinear optical waveguide and the second extension optical waveguide in which the third loop has a third length for the third light of the third wavelength.

2. The optical waveguide structure of claim 1, wherein a first length of the first loop is selected such that at least one of a resonance matching is present for the first light of the first wavelength or round-trip phase matching is present for the first light of the first wavelength.

3. The optical waveguide structure of claim 1, wherein the second length of the second loop is selected such that at least one of a resonance matching is present for the second light of the second wavelength or round-trip phase matching is present for the second light of the second wavelength.

4. The optical waveguide structure of claim 1, wherein the third length of the third loop is selected such that at least one of a resonance matching is present for the third light of the third wavelength or round-trip phase matching is present for the third light of the third wavelength.

5. The optical waveguide structure of claim 1 further comprising:
   a set of phase shifters located adjacent to a set of optical waveguides comprising at least one of the main nonlinear optical waveguide, the first extension optical waveguide, or the second extension optical waveguide in the set of optical waveguides, wherein a set of tuning electrodes applies a set of activations such that the set of activations changes a phase of at least one of the first light of the first wavelength, the second light of the second wavelength, or the third light of the third wavelength traveling in the set of optical waveguides to which the set of activations is applied.

6. The optical waveguide structure of claim 5, wherein the set of phase shifters comprises at least one of a first tuning electrode located adjacent to a first portion of the main nonlinear optical waveguide; a second tuning electrode located adjacent to a second portion of the first extension optical waveguide; or a third tuning electrode located adjacent to a third portion of the second extension optical waveguide, wherein at least one of the first tuning electrode, the second tuning electrode, or the third tuning electrode apply the set of activations to adjust phases of at least one of the first light of the first wavelength, the second light of the second wavelength, or the third light of the third wavelength traveling in a set of loops through the set of optical waveguides.

7. The optical waveguide structure of claim 5, wherein the set of activations is selected from at least one of a voltage, a thermal energy, or a strain.

8. The optical waveguide structure of claim 1 further comprising:
   an output optical waveguide that couples light out of one of the main nonlinear optical waveguide, the first extension optical waveguide, and the second extension optical waveguide.

9. The optical waveguide structure of claim 8 further comprising:
   an output optical coupler for the output optical waveguide, wherein the output optical coupler has a configuration that results in a desired Q factor for the second loop and the second wavelength selective coupler has the configuration that results in the desired Q factor for the third loop.

10. The optical waveguide structure of claim 1 further comprising:
    an input optical waveguide that couples input light into one of the main nonlinear optical waveguide, the first extension optical waveguide, and the second extension optical waveguide.

11. The optical waveguide structure of claim 1, wherein the first loop, the second loop, and the third loop are loops that have lengths selected to cause roundtrip phase matching in which a generation of photons for at least one of the first light, the second light, or the third light continues along a set of loops selected from at least one of the first loop, the second loop, or the third loop as travel time increases for the first light, the second light, and the third light in the set of loops.

12. The optical waveguide structure of claim 1, wherein the first loop, the second loop, and the third loop have different lengths from each other.

13. The optical waveguide structure of claim 12, wherein a spontaneous four wave mixing occurs in the main nonlinear optical waveguide in which a pair of output photons is generated from a pair of input photons, wherein the pair of output photons have different wavelengths from each other and have the different wavelengths from the pair of input photons.

14. The optical waveguide structure of claim 12, wherein a spontaneous parametric down conversion occurs in the main nonlinear optical waveguide in which the pair of output photons is generated from an input photon, wherein the pair of output photons have the different wavelengths from each other and have the different wavelengths from the input photon.

15. The optical waveguide structure of claim 1, wherein the first wavelength selective coupler is in a first location where a first portion of the main nonlinear optical waveguide and a second portion of the first extension optical waveguide are located and wherein the second wavelength selective coupler is in a second location where a third portion of the main nonlinear optical waveguide and a fourth portion of the second extension optical waveguide are located.

16. The optical waveguide structure of claim 1, wherein the main nonlinear optical waveguide has a cross-section with a dimension selected to achieve a resonance condition for the first light of the first wavelength traveling in the main nonlinear optical waveguide; wherein the first extension optical waveguide has a first cross-section with a first dimension selected to achieve the resonance condition for the second light of the second wavelength traveling in the first extension optical waveguide; and wherein the second extension optical waveguide has a second cross-section with a second dimension selected to achieve the resonance condition for the third light of the third wavelength traveling in the second extension optical waveguide.

17. The optical waveguide structure of claim 1, wherein the first wavelength selective coupler and the second wavelength selective coupler are selected from at least one of a two-waveguide coupler, a multi-mode interference coupler, a pulley coupler, a Mach-Zehnder interferometer, or a 4-port micro-optical waveguide resonator coupler.

18. An optical waveguide structure comprising:
a main nonlinear optical waveguide, wherein a first light of a first wavelength travels in a first loop that extends through the main nonlinear optical waveguide in which the first loop has a first length for the first light of the first wavelength;
an extension nonlinear optical waveguide; and
a wavelength selective coupler that couples a second light of a second wavelength between the main nonlinear optical waveguide and the extension nonlinear optical waveguide, wherein the second light of the second wavelength travels in a second loop that extends through the main nonlinear optical waveguide and the extension nonlinear optical waveguide in which the second loop has a second length for the second light of the second wavelength.

19. The optical waveguide structure of claim 18, wherein the first length of the first loop is selected such that at least one of a resonance matching is present for the first light of the first wavelength or round-trip phase matching is present for the first light of the first wavelength.

20. The optical waveguide structure of claim 18, wherein the second length of the second loop is selected such that at least one of a resonance matching is present for the second light of the second wavelength or round-trip phase matching is present for the second light of the second wavelength.

21. The optical waveguide structure of claim 18, wherein the extension nonlinear optical waveguide is a first extension optical waveguide and wherein the wavelength selective coupler is a first wavelength selective coupler and further comprising:
a second extension optical waveguide; and
a second wavelength selective coupler that couples a third light of a third wavelength between the main nonlinear optical waveguide and the second extension optical waveguide, wherein the third light of the third wavelength travels in a third loop that extends through the main nonlinear optical waveguide and the second extension optical waveguide in which the third loop has a third length for the third light of the third wavelength.

22. The optical waveguide structure of claim 21, wherein the third length of the third loop is selected such that at least one of a resonance matching is present for the third light of the third wavelength or round-trip phase matching is present for the third light of the third wavelength.

23. The optical waveguide structure of claim 21, wherein the first loop, the second loop, and the third loop are loops that have lengths selected to cause roundtrip phase matching in which a generation of photons for at least one of the first light, the second light, or the third light continues in a set of loops selected from at least one of the first loop, the second loop, or the third loop as travel time increases for the first light, the second light, and the third light along the set of loops.

24. The optical waveguide structure of claim 21 further comprising:
a tuning electrode located adjacent to a portion of the first extension optical waveguide, wherein the tuning electrode applies a voltage such that a phase shifts in the second light of the second wavelength to achieve a resonant condition for the second light of the second wavelength.

25. The optical waveguide structure of claim 21 further comprising:
a tuning electrode located adjacent to a portion of the second extension optical waveguide, wherein the tuning electrode applies a voltage such that a phase shifts in the third light of the third wavelength to achieve a resonant condition for the third light of the third wavelength.

26. The optical waveguide structure of claim 21 further comprising at least one of a first tuning electrode located adjacent to a first portion of the main nonlinear optical waveguide; a second tuning electrode located adjacent to a second portion of the first extension optical waveguide; or a third tuning electrode located adjacent to a third portion of the second extension optical waveguide, wherein at least one of the first tuning electrode, the second tuning electrode, or the third tuning electrode apply a set of activations to adjust a set of phase shifts in to achieve a phase matching condition.

27. The optical waveguide structure of claim 21 further comprising:
an output optical waveguide that couples light out of one of the main nonlinear optical waveguide, the first extension optical waveguide, and the second extension optical waveguide.

28. The optical waveguide structure of claim 21, wherein the first loop, the second loop, and the third loop have different lengths from each other.

29. The optical waveguide structure of claim 18 further comprising:
a tuning electrode located adjacent to a portion of the main nonlinear optical waveguide, wherein the tuning electrode applies a voltage such that a phase shifts in the first light of the first wavelength to achieve a resonant condition for the first light of the first wavelength of.

30. The optical waveguide structure of claim 18 further comprising:
an input optical waveguide that couples input light into one of the main nonlinear optical waveguide.

31. A method for a non-linear optical process comprising:
routing a first light of a first wavelength in a first loop in a main nonlinear optical waveguide, wherein the first loop has a first length for the first light of the first wavelength;
routing a second light of a second wavelength in a second loop that includes portions of the main nonlinear optical waveguide and a first extension optical waveguide, wherein the second loop has a second length for the second light of the second wavelength; and
routing a third light of a third wavelength in a third loop that includes the portions of the main nonlinear optical waveguide and a second extension optical waveguide, wherein the third loop has a third length for the third light of the third wavelength.

32. The method of claim 31 further comprising:
coupling the second light of the second wavelength between the main nonlinear optical waveguide and the first extension optical waveguide with a first wavelength selective coupler that couples the second light of the second wavelength of between the main nonlinear optical waveguide and the first extension optical waveguide causing the second light of the second wavelength of to travel in the second loop.

33. The method of claim 31, wherein the first length of the first loop is selected such that at least one of a resonance matching is present for the first light of the first wavelength or round-trip phase matching is present for the first light of the first wavelength.

34. The method of claim 31, wherein the second length of the second loop is selected such that at least one of a resonance matching is present for the second light of the second wavelength or round-trip phase matching is present for the second light of the second wavelength.

35. The method of claim 31 further comprising:
coupling the third light of the third wavelength between the main nonlinear optical waveguide and the second extension optical waveguide with a second wavelength selective coupler that couples the third light of the third wavelength between the main nonlinear optical waveguide and the second extension optical waveguide causing the third light of the third wavelength to travel in the third loop.

36. The method of claim 35, wherein the third length of the third loop is selected such that at least one of a resonance matching is present for the third light of the third wavelength or round-trip phase matching is present for the third light of the third wavelength.

37. The method of claim 31 further comprising:
applying an activation to a portion of the main nonlinear optical waveguide, wherein a phase shifts occurs in the first light of the first wavelength to achieve a resonant condition for the first light of the first wavelength.

38. The method of claim 31 further comprising:
applying an activation to a portion of the first extension optical waveguide, wherein a phase shifts occurs in the second light of the second wavelength to achieve a resonant condition for the second light of the second wavelength.

39. The method of claim 31 further comprising:
applying an activation to a portion of the second extension optical waveguide, wherein a phase shifts occurs in the third light of the third wavelength to achieve a resonant condition for the third light of the third wavelength.

40. The method of claim 31 further comprising:
applying an activation to a portion of the main nonlinear optical waveguide, the first extension optical waveguide, and the second extension optical waveguide such that phase shifts in wavelengths of a light in the main nonlinear optical waveguide causing a value of a phase walk-off to change.

* * * * *